(12) United States Patent
Tsubata

(10) Patent No.: US 8,941,569 B2
(45) Date of Patent: Jan. 27, 2015

(54) LIQUID CRYSTAL DISPLAY DEVICE, TELEVISION RECEIVER AND DISPLAY METHOD EMPLOYED IN LIQUID CRYSTAL DISPLAY DEVICE

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 347 days.

(21) Appl. No.: 13/522,320

(22) PCT Filed: Nov. 9, 2010

(86) PCT No.: PCT/JP2010/069956
§ 371 (c)(1),
(2), (4) Date: Jul. 14, 2012

(87) PCT Pub. No.: WO2011/104947
PCT Pub. Date: Sep. 1, 2011

(65) Prior Publication Data
US 2012/0287349 A1 Nov. 15, 2012

(30) Foreign Application Priority Data

Feb. 24, 2010 (JP) ................................ 2010-039285

(51) Int. Cl.
G09G 3/36 (2006.01)
H04N 5/66 (2006.01)
G02F 1/1343 (2006.01)

(52) U.S. Cl.
CPC ............... *G09G 3/3637* (2013.01); *H04N 5/66* (2013.01); *G02F 2001/134345* (2013.01); *G09G 2320/046* (2013.01); *G09G 2320/068* (2013.01)
USPC .......................................................... 345/87

(58) Field of Classification Search
None
See application file for complete search history.

(56) References Cited

U.S. PATENT DOCUMENTS

| 5,847,688 | A | 12/1998 | Ohi et al. |
| 6,756,953 | B1 | 6/2004 | Tokioka et al. |
| 2007/0195041 | A1 | 8/2007 | Lee |
| 2008/0297676 | A1 | 12/2008 | Kimura |
| 2009/0135323 | A1 | 5/2009 | Yang et al. |
| 2010/0013803 | A1 * | 1/2010 | Noguchi et al. ............. 345/204 |
| 2010/0328198 | A1 | 12/2010 | Tsubata |
| 2011/0267554 | A1 * | 11/2011 | Yang et al. ..................... 349/41 |

FOREIGN PATENT DOCUMENTS

| JP | 7121144 A | 5/1995 |
| JP | 2001281628 A | 10/2001 |
| JP | 2007226196 A | 9/2007 |

(Continued)

OTHER PUBLICATIONS

International Search Report and Written Opinion for PCT/JP2010/069956, dated Feb. 8, 2011.

*Primary Examiner* — Joseph Haley
(74) *Attorney, Agent, or Firm* — Lowe Hauptman & Ham, LLP

(57) ABSTRACT

Provided is a liquid crystal display device including: pixels that are provided in a row direction and a column direction in which data signal lines extend, the pixels each including a plurality of pixel electrodes, in a pixel, in an nth frame, a pixel electrode being electrically connected to a data signal line, and in the frame, the plurality of pixel electrodes being electrically connected to each other and being electrically disconnected from the data signal line. This allows an improvement in viewing angle characteristic of a liquid crystal display device.

14 Claims, 35 Drawing Sheets

(56) References Cited

FOREIGN PATENT DOCUMENTS

| JP | 2008287032A A | 11/2008 |
| JP | 2009128900 A | 6/2009 |
| JP | 2010039205 A | 2/2010 |
| WO | 2009107271 A1 | 9/2009 |

* cited by examiner

FIG. 14

| | (a) F1 | | (b) F2 | | (c) F3 | | (d) F4 | |
|---|---|---|---|---|---|---|---|---|
| | 17c BRIGHT | 17C DARK | 17c INTER-MEDIATE | 17C INTER-MEDIATE | 17c BRIGHT | 17C DARK | 17c INTER-MEDIATE | 17C INTER-MEDIATE |
| | 17d DARK | 17D BRIGHT | 17d INTER-MEDIATE | 17D INTER-MEDIATE | 17d DARK | 17D BRIGHT | 17d INTER-MEDIATE | 17D INTER-MEDIATE |
| | 17a BRIGHT | 17A DARK | 17a INTER-MEDIATE | 17A INTER-MEDIATE | 17a BRIGHT | 17A DARK | 17a INTER-MEDIATE | 17A INTER-MEDIATE |
| | 17b DARK | 17B BRIGHT | 17b INTER-MEDIATE | 17B INTER-MEDIATE | 17b DARK | 17B BRIGHT | 17b INTER-MEDIATE | 17B INTER-MEDIATE |
| | 17e BRIGHT | 17E DARK | 17e INTER-MEDIATE | 17E INTER-MEDIATE | 17e BRIGHT | 17E DARK | 17e INTER-MEDIATE | 17E INTER-MEDIATE |
| | 17f DARK | 17F BRIGHT | 17f INTER-MEDIATE | 17F INTER-MEDIATE | 17f DARK | 17F BRIGHT | 17f INTER-MEDIATE | 17F INTER-MEDIATE |

LIQUID CRYSTAL DISPLAY DEVICE, TELEVISION RECEIVER AND DISPLAY METHOD EMPLOYED IN LIQUID CRYSTAL DISPLAY DEVICE

RELATED APPLICATIONS

The present application is National Phase of International Application Number PCT/JP2010/069956, filed Nov. 9, 2010, and claims priority from Japanese Application Number 2010-039285, filed Feb. 24, 2010.

TECHNICAL FIELD

The present invention relates to a display device which displays a halftone by temporally changing a pixel luminance.

BACKGROUND ART

A technique has been proposed for improving a viewing angle characteristic of a liquid crystal display device which displays a halftone by temporally changing a pixel luminance. For example, Patent literature 1 (see FIG. 38) discloses the following method. According to the method, it is assumed that four frames constitute one period in a liquid crystal display device in which display units each constituted by an R pixel, a G pixel, and a B pixel that are provided in a row direction are provided in a matrix pattern. A pixel belonging to a jth display unit in an ith row or a (j+1)th display unit in an (i+1)th row carries out a bright display in a first frame F1, a bright display in a second frame F2 following the first frame F1, a dark display in a third frame F3 following the second frame F2, and a dark display in a fourth frame F4 following the third frame F3. Meanwhile, a pixel belonging to the (j+1)th display unit in the ith row or the jth display unit in the (i+1)th row carries out a dark display in the first frame F1, a dark display in the second frame F2, a bright display in the third frame F3, and a bright display in the fourth frame F4.

CITATION LIST

Patent Literature

Patent Literature 1
Japanese Patent Application Publication, Tokukaihei, No. 7-121144 A (Publication Date: May 12, 1995)

SUMMARY OF INVENTION

Technical Problem

According to the arrangement of Patent Literature 1, two types of luminance displays which are (i) a bright display that is relatively high in luminance and (ii) a dark display that is relatively low in luminance are carried out every two frames with respect to an input tone (halftone). This can improve a viewing angle characteristic.

However, according to the arrangement of Patent Literature 1, it is impossible to carry out more than two types of luminance displays. This makes it difficult to further improve a viewing angle characteristic.

An object of the present invention is to further improve a viewing angle characteristic of a liquid crystal display device.

Solution to Problem

In order to attain the object, a liquid crystal display device of the present invention includes: pixels that are provided in a row direction and a column direction in which data signal lines extend, the pixels each including a plurality of pixel electrodes, in each of the pixels, in an nth frame, at least one of the plurality of pixel electrodes being electrically connected to a corresponding data signal line, and in an (n+1)th frame, the plurality of pixel electrodes being electrically connected to each other and being electrically disconnected from the corresponding data signal line.

According to the arrangement, for example, in a case where a halftone is displayed in two consecutive nth and (n+1)th frames, in the nth frame, a data signal electric potential is written to at least one of pixel electrodes, and in the (n+1)th frame, the pixel electrodes are short-circuited to each other and are electrically disconnected from a data signal line. This causes the pixel electrodes to be floating.

Therefore, for example, in a case where one pixel includes two pixel electrodes and the two pixel electrodes are connected to each other via a capacitor, in the nth frame, writing of a data signal electric potential to one of the two pixel electrodes allows the one pixel to be formed of a bright subpixel and a dark subpixel. Further, in the (n+1)th frame, a short circuit between the pixel electrodes allows the one pixel to be formed of two intermediate subpixels which are different in luminance from the bright subpixel and the dark subpixel of the nth frame. According to this, an input tone (halftone) can be displayed by three types of changes in luminance (γ characteristics). Therefore, the arrangement allows a further improvement in viewing angle characteristic as compared to a conventional arrangement.

The liquid crystal display device of the present invention can be arranged such that: the each of the pixels is constituted by a plurality of subpixels, and the plurality of subpixels include respective pixel electrodes; and in the nth frame, the plurality of subpixels display respective different luminances, and in the (n+1)th frame, the plurality of subpixels display respective identical luminances.

The liquid crystal display device of the present invention can be arranged such that: first scanning signal lines and second scanning signal lines are provided so as to correspond to respective pixel rows; and in the each of the pixels, in the nth frame, the at least one of the plurality of pixel electrodes is electrically connected to the corresponding data signal line in a case where a corresponding first scanning signal line is selected, and in the (n+1)th frame, the plurality of pixel electrodes are electrically connected to each other in a case where a corresponding second scanning signal line is selected.

The liquid crystal display device of the present invention can be arranged such that: first scanning signal lines and second scanning signal lines are provided so as to correspond to respective pixel rows; in the each of the pixels, (i) a first transistor connected to each of the corresponding data signal line and a corresponding first scanning signal line, (ii) a second transistor connected to a corresponding second scanning signal line, and (iii) a first pixel electrode and a second pixel electrode are provided; the first pixel electrode is electrically connected to the corresponding data signal line via the first transistor; and the second pixel electrode is connected to the first pixel electrode via a capacitor, and is electrically connected to the first pixel electrode via the second transistor.

The liquid crystal display device of the present invention can be arranged such that: in the nth frame, the corresponding first scanning signal line is selected; and in the (n+1)th frame, the corresponding second scanning signal line is selected.

The liquid crystal display device of the present invention can be arranged such that: the pixels are provided in the row direction and the column direction, the pixels each including a first pixel electrode and a second pixel electrode which are connected via a capacitor; first data signal lines and second data signal lines are provided so as to correspond to respective pixel columns, and first scanning signal lines and second scanning signal lines are provided so as to correspond to respective pixel rows; in the each of the pixels, (i) a first transistor connected to a corresponding first scanning signal line and (ii) a second transistor connected to a corresponding second scanning signal line are provided; the first pixel electrode is connected to the second pixel electrode via the capacitor, and is electrically connected to the second pixel electrode via the second transistor; and in one of two pixels of the pixels, the two pixels being adjacent to each other in the column direction, the first pixel electrode is electrically connected to a corresponding first data signal line via the first transistor, and in the other of the two pixels, the first pixel electrode is electrically connected to a corresponding second data signal line via the first transistor.

The liquid crystal display device of the present invention can be arranged such that in the nth frame, each set of two of the first scanning signal lines, the two being adjacent to each other in the column direction, is sequentially selected, and in the (n+1)th frame, each set of two of the second scanning signal lines, the two being adjacent to each other in the column direction, is sequentially selected.

The liquid crystal display device of the present invention can be arranged such that data signals whose polarities are reverse to each other are supplied to the corresponding first data signal line and the corresponding second data signal line, respectively.

The liquid crystal display device of the present invention can be arranged such that: the pixels are provided in the row direction and the column direction, the pixels each including a first pixel electrode and a second pixel electrode; first data signal lines and second data signal lines are provided so as to correspond to respective pixel columns, and first scanning signal lines and second scanning signal lines are provided so as to correspond to respective pixel rows; in the each of the pixels, (i) a first transistor and a second transistor each connected to a corresponding first scanning signal line and (ii) a third transistor connected to a corresponding second scanning signal line are provided; the first pixel electrode is electrically connected to the corresponding first data signal line via the first transistor, and the second pixel electrode is electrically connected to the second pixel electrode via the second transistor; and the first pixel electrode and the second pixel electrode are electrically connected to each other via the third transistor.

The liquid crystal display device of the present invention can be arranged such that in the each of the pixels, in the nth frame, the corresponding first scanning signal line is selected, and in the (n+1)th frame, the corresponding second scanning signal line is selected.

The liquid crystal display device of the present invention can be arranged such that data signals whose polarities are identical and which are different from each other in electric potential are supplied to the corresponding first data signal line and the corresponding second data signal line, respectively.

The liquid crystal display device of the present invention can be arranged such that a polarity of a data signal to be supplied to an identical data signal line is reversed every two frames.

A television receiver of the present invention includes: a liquid crystal display device mentioned above; and a tuner section for receiving television broadcast.

In order to attain the object, a method of the present invention for displaying a liquid crystal display device including: pixels that are provided in a row direction and a column direction in which data signal lines extend, the pixels each being constituted by a plurality of subpixels including respective pixel electrodes, the method includes the step of: in each of the pixels, in an nth frame, causing the plurality of subpixels to be different from each other in display luminance by supplying data signal electric potentials to the respective pixel electrodes included in the respective plurality of subpixels, and in an (n+1)th frame, causing the plurality of subpixels to be substantially equal to each other in display luminance by electrically connecting the pixel electrodes included in the respective plurality of subpixels.

Advantageous Effects of Invention

As described earlier, the liquid crystal display device of the present invention allows the plurality of subpixels to display respective different luminances in the nth frame and allows the plurality of subpixels to be substantially equal in luminance in the (n+1)th frame. According to this, an input tone (halftone) can be displayed by three types of changes in luminance (γ characteristics). Therefore, the arrangement allows a further improvement in viewing angle characteristic as compared to a conventional arrangement.

BRIEF DESCRIPTION OF DRAWINGS

FIG. 2 is a plan view illustrating an arrangement (Specific Example 1-1) of the liquid crystal panel 5a.

FIG. 7 is a plan view illustrating another arrangement (First Modification) of the liquid crystal panel 5a.

FIG. 8 is a plan view illustrating another arrangement (Second Modification) of the liquid crystal panel 5a.

FIG. 9 is a timing chart showing a driving method for driving a liquid crystal display device including the liquid crystal panel 5a.

FIG. 11 is a timing chart showing another driving method for driving the liquid crystal display device including the liquid crystal panel 5a.

FIG. 12 is a plan view illustrating another arrangement (Specific Example 1-2) of the liquid crystal panel 5a.

FIG. 14 schematically illustrates display states of respective frames in a case where the driving method of FIG. 13 is used.

FIG. 15 is a circuit diagram illustrating another arrangement of the liquid crystal panel 5a.

FIG. 18 is a circuit diagram illustrating another arrangement of the liquid crystal panel 5a.

DESCRIPTION OF EMBODIMENTS

Examples of an embodiment in accordance with the present invention are described below with reference to the drawings. Note that for convenience, the following description assumes that a direction in which data signal lines extend is a column direction and a direction in which scanning signal lines extend is a row direction. Note, however, that it goes without saying that the scanning signal lines may extend in a transverse or longitudinal direction in a state in which a liquid crystal display device of the present invention (or a liquid crystal panel or an active matrix substrate used in the liquid crystal display device) is used (viewed). One pixel of an active matrix substrate corresponds to one pixel of a liquid crystal panel.

First Embodiment

Figure 1:
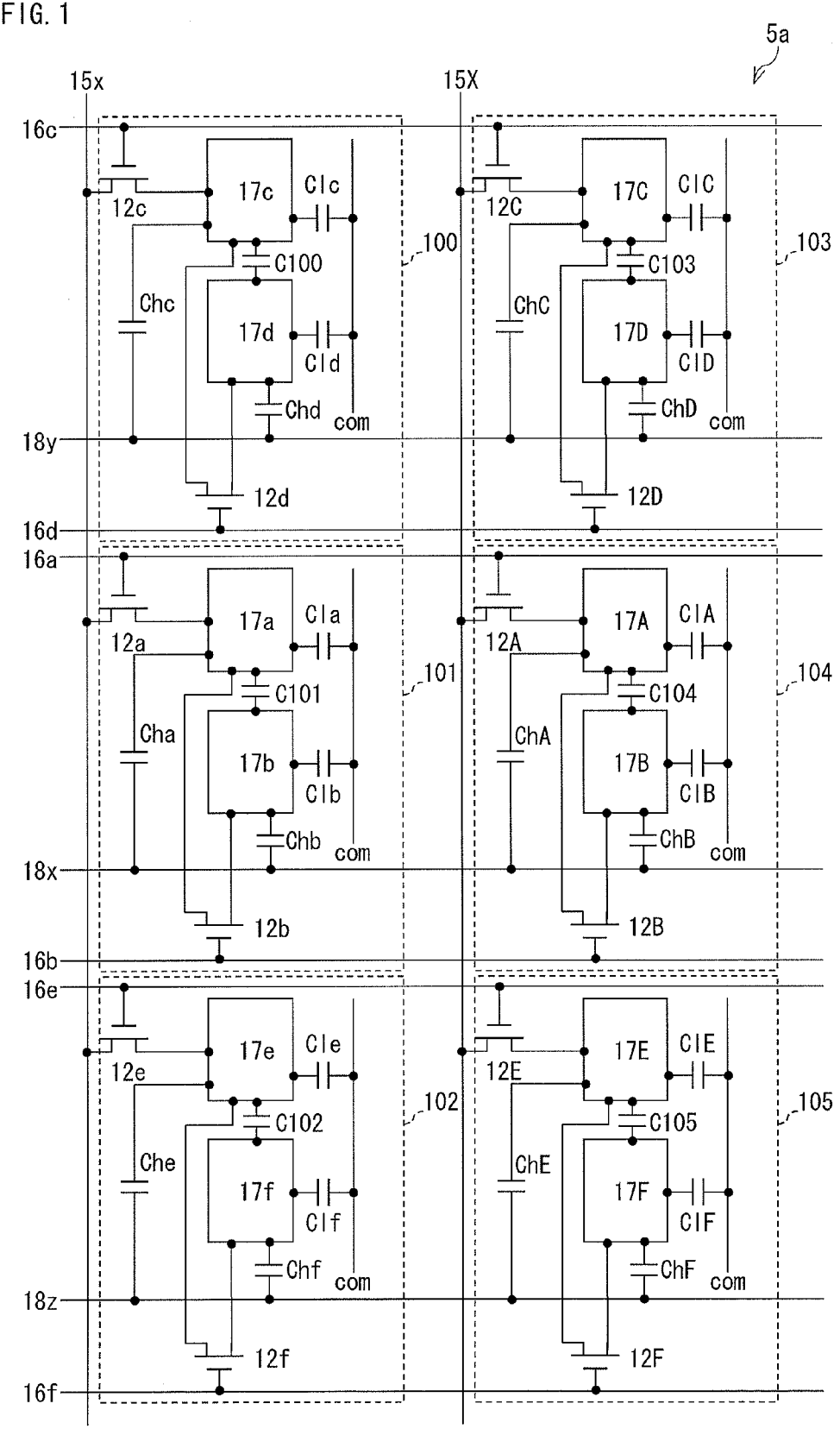
FIG. 1 is a circuit diagram illustrating an arrangement of a liquid crystal panel 5a in accordance with First Embodiment.

FIG. 1 is an equivalent circuit diagram illustrating a part of a liquid crystal panel of First Embodiment of the present invention. A liquid crystal panel 5a includes data signal lines 15 (15x and 15X) which extend in the column direction (a vertical direction in FIG. 1), scanning signal lines (16a through 16f) which extend in the row direction (a horizontal direction in FIG. 1), pixels (100 through 105) which are provided in the row direction and the column direction, retention capacitor lines (18x through 18z), and a common electrode (counter electrode) com, and the pixels are identical in structure (see FIG. 1). Note that a pixel column to which the pixels 100 through 102 belong and a pixel column to which the pixels 103 through 105 belong are adjacent to each other.

According to the liquid crystal panel 5a, one data signal line and two scanning signal lines are provided so as to correspond to one pixel. Two pixel electrodes 17c and 17d provided in the pixel 100, two pixel electrodes 17a and 17b provided in the pixel 101, and two pixel electrodes 17e and 17f provided in the pixel 102 are aligned in a column. Two pixel electrodes 17C and 17D provided in the pixel 103, two pixel electrodes 17A and 17B provided in the pixel 104, and two pixel electrodes 17E and 17F provided in the pixel 105 are aligned in a column. The pixel electrodes 17c and 17C are adjacent to each other in the row direction. Same applies to each of the pixel electrodes 17d and 17D, the pixel electrodes 17a and 17A, the pixel electrodes 17b and 17B, the pixel electrodes 17e and 17E, and the pixel electrodes 17f and 17F.

Since the pixels are identical in structure, the following description mainly takes the pixel 101 as an example.

The pixel 101 is arranged as follows: The pixel electrodes 17a and 17b (first and second pixel electrodes) are connected via a coupling capacitor C101. The pixel electrode 17a is connected to the data signal line 15x via a transistor 12a (first transistor) which is connected to the scanning signal line 16a (first scanning signal line). The pixel electrode 17b is connected to the pixel electrode 17a via a transistor 12b (second transistor) which is connected to the scanning signal line 16b (second scanning signal line). A retention capacitor Cha is defined between the pixel electrode 17a and the retention capacitor line 18x. A retention capacitor Chb is defined between the pixel electrode 17b and the retention capacitor line 18x. A liquid crystal capacitor Cla is defined between the pixel electrode 17a and the common electrode com. A liquid crystal capacitor Clb is defined between the pixel electrode 17b and the common electrode com.

According to the arrangement, the pixel electrode 17b is capacitively coupled to the pixel electrode 17a to which a regular signal electric potential is written. Therefore, in a case where capacitances are Cla=Clb=Cl, Cha=Chb=Ch, and Co=Cl+Ch, C101 has a capacitance of Cα, and the pixel electrode 17a has an electric potential of Va after the transistor 12a has turned off, the pixel electrode 17b has an electric potential of Va×(Cα/(Cα+Co)) after the transistor 12a has turned off. A subpixel including the pixel electrode 17a becomes a bright subpixel (pixel relatively high in luminance: hereinafter referred to as "bright"), and a subpixel including the pixel electrode 17b becomes a dark subpixel (pixel relatively low in luminance: hereinafter referred to as "dark"). According to this, it is possible to make a pixel division type liquid crystal display device.

In a case where the scanning signal line 16a is not selected and the scanning signal line 16b is selected, the pixel electrodes 17a and 17b are electrically connected to each other via the transistor 12b, and both the pixel electrodes 17a and 17b are floating. Therefore, electric potentials of the respective pixel electrodes 17a and 17b are averaged to be substantially equal. Namely, in a case where the pixel electrode 17a included in the bright subpixel and the pixel electrode 17b included in the dark subpixel are connected (short-circuited), the pixel electrode 17a has a lower potential (effective voltage), whereas the pixel electrode 17b has a higher electric potential (effective voltage). This causes each of the subpixels to be an intermediate subpixel (an intermediate luminance between a bright luminance relatively high in luminance and a dark luminance relatively low in luminance: hereinafter referred to as "intermediate"). According to this, an input tone (halftone) can be displayed by three types of changes in luminance ($\gamma$ characteristics). This allows an improvement in viewing angle characteristic.

According to the pixel division type liquid crystal display device including the liquid crystal panel 5a, the pixel electrodes 17a and 17b are electrically connected to each other via the transistor 12b which is connected to the scanning signal line 16b. Therefore, identical signal electric potentials can be supplied to the respective pixel electrodes 17a and 17b directly from the data signal line 15x via the respective transistors 12a and 12b. Namely, in a case where the transistors 12a and 12b are turned on, it is possible to supply a signal electric potential from the data signal line 15x via no capacitor (C101) to the pixel electrode 17b (hereinafter referred to as a "capacitively coupled electrode") which is capacitively coupled to the pixel electrode 17a that is connected to the data signal line 15x via the transistor 12a. The transistors 12a and 12b which are connected to the respective pixel electrodes 17a and 17b are connected to the respective scanning signal lines 16a and 16b which are different from each other. Therefore, for example, identical electric potentials can be supplied to the respective pixel electrodes 17a and 17b at a timing which is different from a timing at which a regular signal electric potential is written to the pixel electrode 17a.

Accordingly, for example, in a case where a regular signal electric potential is written to the pixel electrode 17a, prior to the writing, the transistors 12a and 12b are turned on, so that a signal electric potential (e.g., a Vcom signal) is supplied from the data signal line 15x to each of the pixel electrodes 17a and 17b. The signal electric potential (Vcom) may be supplied in accordance with a charge sharing method, or may be supplied to all the data signal lines in a state in which all the transistors are turned on. According to this, the signal electric potential (Vcom) is written to the capacitively coupled pixel electrode 17b. This allows an electric charge accumulated in the pixel electrode to be discharged (refreshed). Therefore, it is possible to prevent image sticking of the subpixel including this pixel electrode. Note that it is unnecessary to arrange the present invention such that Vcom is written to the capacitively coupled electrode (17b) before a regular signal electric potential is written to the pixel electrode (17a). Such an arrangement is appropriately employed.

The following description discusses a specific example of the liquid crystal panel 5a constituting a liquid crystal display device of the present embodiment and a driving method for driving the liquid crystal panel 5a.

Specific Example 1-1 of Liquid Crystal Panel

Figure 2:
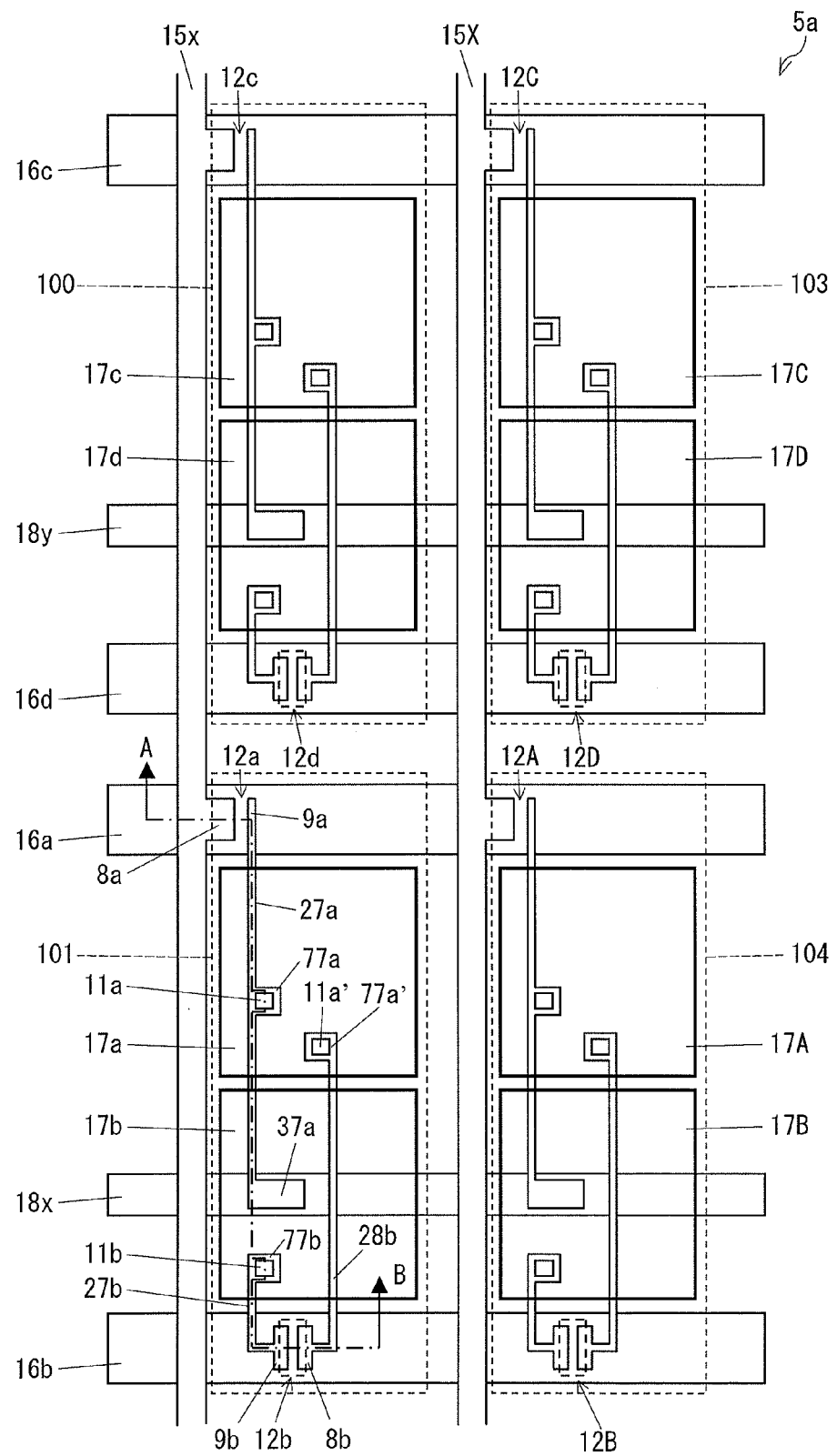

FIG. 2 illustrates Specific Example 1-1 of the liquid crystal panel 5a. According to the liquid crystal panel 5a of FIG. 2, the data signal line 15x is provided along the pixel 100 and the pixel 101, the data signal line 15X is provided along the pixel 103 and the pixel 104, the retention capacitor line 18y intersects the respective pixels 100 and 103, and the retention capacitor line 18x intersects the respective pixels 101 and 104.

Note here that the scanning signal line 16c is provided on one end side of the pixel 100, the scanning signal line 16d is provided on the other end side of the pixel 100, and the pixel electrodes 17c and 17d are provided in the column direction between the scanning signal lines 16c and 16d in plan view. Similarly, the scanning signal line 16c is provided on one end side of the pixel 103, the scanning signal line 16d is provided on the other end side of the pixel 103, and the pixel electrodes 17C and 17D are provided in the column direction between the scanning signal lines 16c and 16d in plan view.

Note also that the scanning signal line 16a is provided on one end side of the pixel 101, the scanning signal line 16b is provided on the other end side of the pixel 101, and the pixel electrodes 17a and 17b are provided in the column direction between the scanning signal lines 16a and 16b in plan view. Similarly, the scanning signal line 16a is provided on one end side of the pixel 104, the scanning signal line 16b is provided on the other end side of the pixel 104, and the pixel electrodes 17A and 17B are provided in the column direction between the scanning signal lines 16a and 16b in plan view.

According to the pixel 101, the transistor 12a has a source electrode 8a and a drain electrode 9a which are provided on the scanning signal line 16a, and the transistor 12b has a source electrode 8b and a drain electrode 9b which are provided on the scanning signal line 16b. The source electrode 8a is connected to the data signal line 15x. The drain electrode 9a is connected to a drain drawing line 27a. The drain drawing line 27a is connected to each of a contact electrode 77a and a coupling capacitor electrode 37a. The contact electrode 77a is connected to the pixel electrode 17a via a contact hole 11a, and the coupling capacitor electrode 37a overlaps the pixel electrode 17b via an interlayer insulating film. This defines the coupling capacitor C101 (see FIG. 1) between the pixel electrodes 17a and 17b.

The source electrode 8b of the transistor 12b is connected to a source drawing line 28b. The source drawing line 28b is connected to a contact electrode 77a'. The contact electrode 77a' is connected to the pixel electrode 17a via a contact hole 11a'. The drain electrode 9b is connected to a drain drawing line 27b. The drain drawing line 27b is connected to a contact electrode 77b. The contact electrode 77b is connected to the pixel electrode 17b via a contact hole 11b.

The coupling capacitor electrode 37a overlaps the retention capacitor line 18x via a gate insulating film. This defines the retention capacitor Cha (see FIG. 1) and defines the retention capacitor Chb (see FIG. 1) between the pixel electrode 17b and the retention capacitor line 18x. Note that an arrangement in which the retention capacitor Chb is defined in a state in which no retention capacitor electrode is provided prevents a problem of causing the coupling capacitor electrode 37a and a retention capacitor electrode to be short-circuited. This allows obtainment of an effect such that the pixel electrodes 17a and 17b are less likely to be short-circuited. Note that the other pixels are identical to the pixel 101 in arrangement (shape, provision, and connection of members).

According to the arrangement, in a case where the scanning signal line 16a is selected (and the scanning signal line 16b is not selected), the subpixel including the pixel electrode 17a becomes "bright", and the subpixel including the pixel electrode 17b becomes "dark". In a case where the scanning signal line 16b is selected (and the scanning signal line 16a is not selected), each of the subpixels becomes "intermediate".

Figure 3:
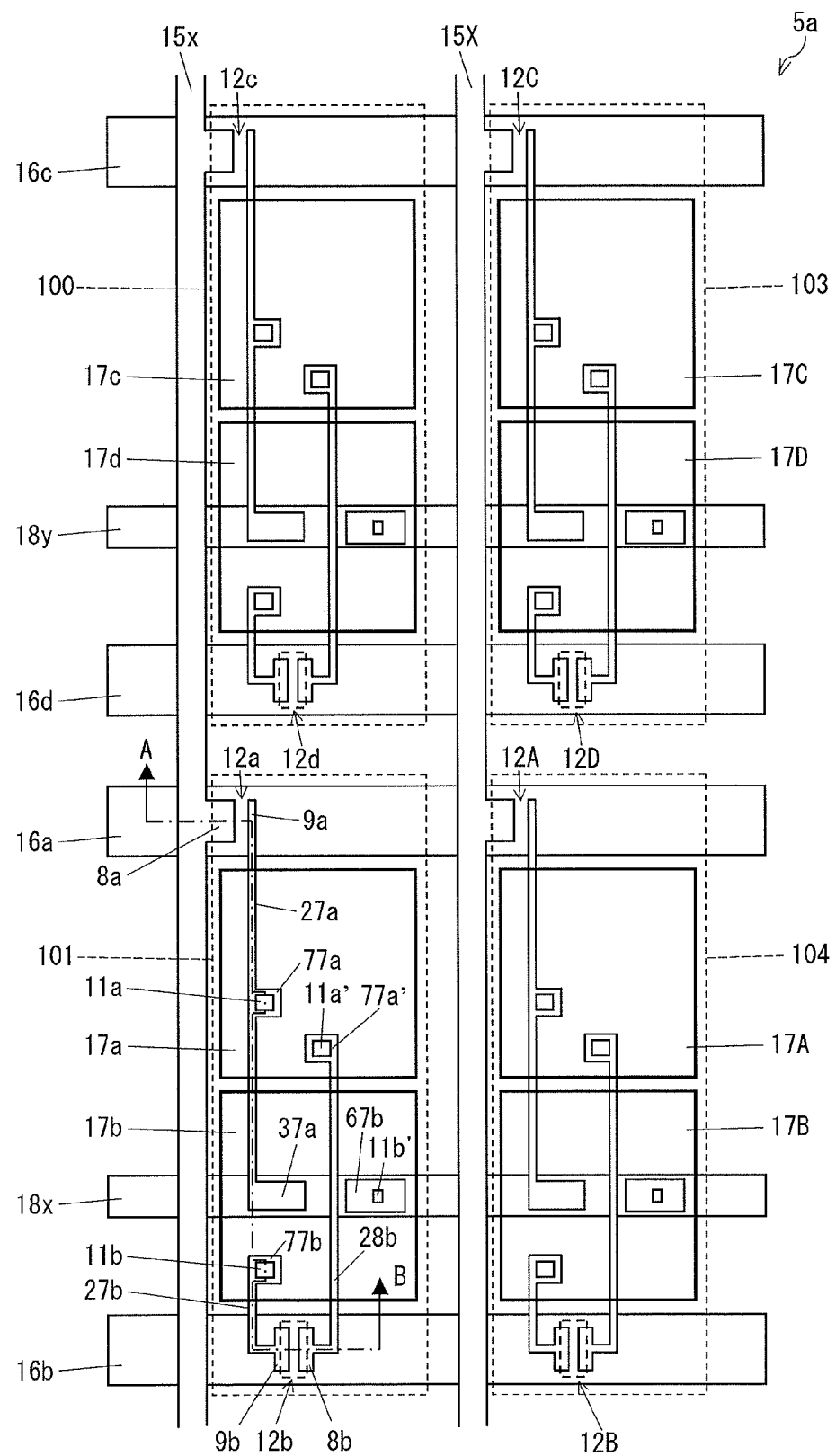
FIG. 3 is a plan view illustrating another arrangement of the liquid crystal panel 5a of FIG. 2.

Note that the retention capacitor Chb may be arranged as illustrated in FIG. 3. Namely, a retention capacitor electrode 67b which is provided in a layer in which the coupling capacitor electrode 37a is provided is connected to the pixel electrode 17b via a contact hole 11b', so that the retention capacitor Chb is defined (see FIG. 3). Such an arrangement allows an insulating film provided between the pixel electrode 17b and the retention capacitor line 18x to be reduced (thinner) as compared to an arrangement in which the retention capacitor Chb is defined between the pixel electrode 17b and the retention capacitor line 18x (see FIG. 2). This makes it possible to earn a retention capacitance. From the viewpoint of reliability, it is preferable that the retention capacitance be large. Further, since such an arrangement allows the insulating film which defines the retention capacitor to be thin, it is possible to (i) narrow a width of the retention capacitor line 18x without the need of changing the retention capacitance and (ii) obtain an effect of increasing an aperture ratio without the fear of causing a deterioration in reliability.

Figure 4:
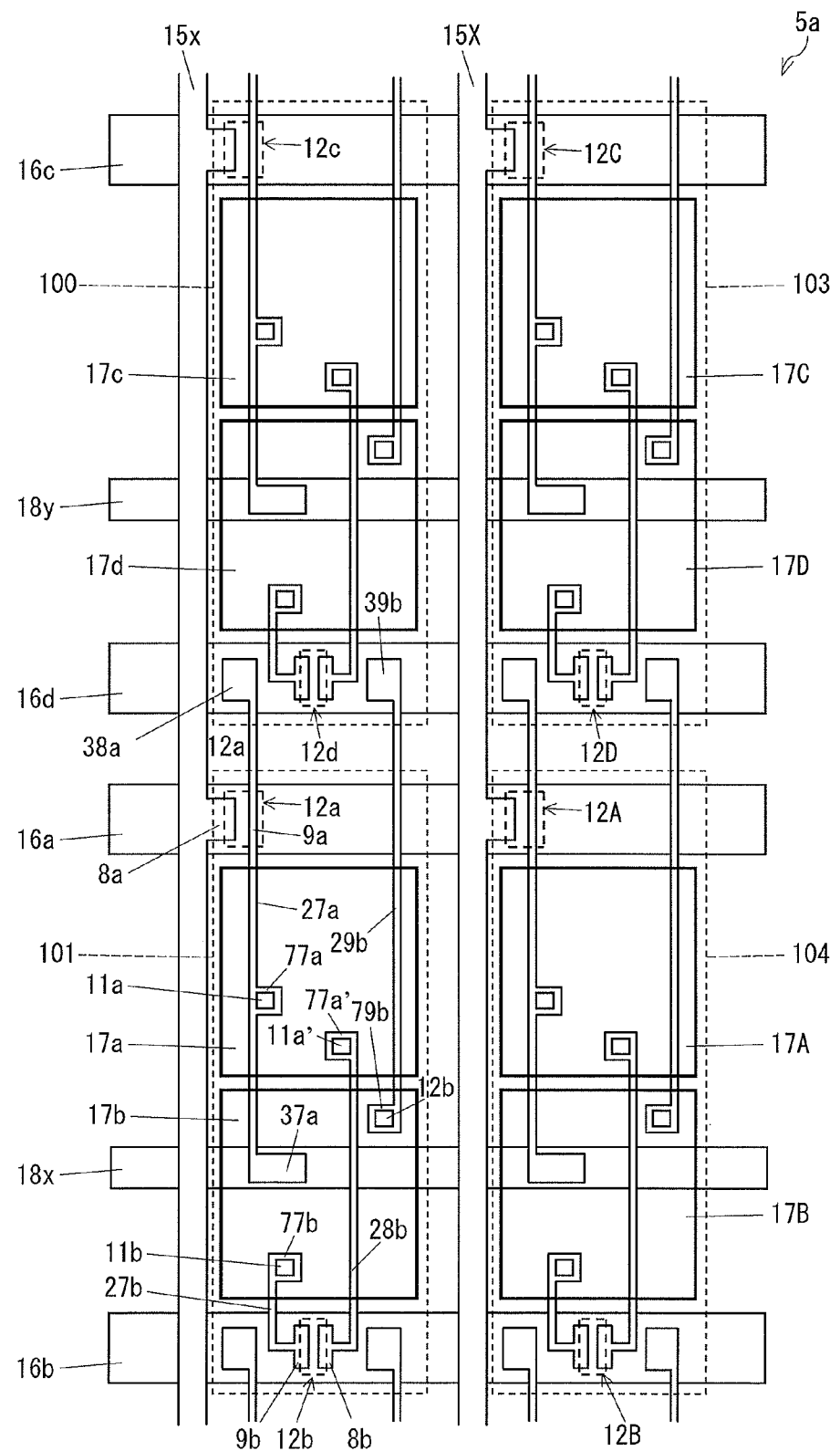
FIG. 4 is a plan view illustrating another arrangement of the liquid crystal panel 5a of FIG. 2.

The retention capacitor Cha and the retention capacitor Chb may be arranged as illustrated in FIG. 4. Namely, a retention capacitor electrode 38a which is provided in a layer in which the coupling capacitor electrode 37a is provided is connected to the drain drawing line 27a, and the retention capacitor electrode 38a overlaps the scanning signal line 16d via the gate insulating film. This defines the retention capacitor Cha. A retention capacitor electrode 39b which is provided in a layer in which the retention capacitor electrode 38a is provided overlaps the scanning signal line 16d via the gate insulating film. The retention capacitor electrode 39b is connected to a drain drawing line 29b. The drain drawing line 29b is connected to a contact electrode 79b. The contact electrode 79b is connected to the pixel electrode 17b via a contact hole 12b. This defines the retention capacitor Chb.

As described earlier, according to the liquid crystal panel 5a of FIG. 4, the retention capacitor Cha is obtained by adding (i) a retention capacitor defined in a part in which the coupling capacitor electrode 37a and the retention capacitor line 18x overlap each other and (ii) a retention capacitor defined in a part in which the retention capacitor electrode 38a and the scanning signal line 16d overlap each other. Therefore, the retention capacitor Cha of the liquid crystal panel of FIG. 4 can have a larger retention capacitance than the retention capacitor Cha of the liquid crystal panel of FIG. 2. Meanwhile, the retention capacitor Chb is obtained by adding (i) a retention capacitor defined in a part in which the retention capacitor line 18x and the pixel electrode 17b overlap each other and (ii) a retention capacitor defined in a part in which the retention capacitor electrode 39b and the scanning signal line 16d overlap each other. Therefore, the retention capacitor Chb of the liquid crystal panel of FIG. 4 can have a larger retention capacitance than the retention capacitor Chb of the liquid crystal panel of FIG. 2. Further, according to the liquid crystal panel 5a of the present invention, the retention capacitor Cha is defined between the retention capacitor electrode 38a and the scanning signal line 16d, and the retention capacitor Chb is defined between the retention capacitor electrode 38b and the scanning signal line 16d, the scanning signal line 16d being provided so as to discharge an electric charge and to correspond to a pixel at a previous stage (the pixel 100 in FIG. 4) which pixel has been scanned. This allows obtainment of an effect of preventing a change in retention capacitance. According to this, it is possible to achieve enhancement of a display quality. Note that the liquid crystal panel 5a of the present invention may be arranged such that overlapping of the retention capacitor electrode 38a and the scanning signal line 16c to which regular pixel data is to be written defines the retention capacitor Cha and overlapping of the retention capacitor electrode 39b and the scanning signal line 16c defines the retention capacitor Chb.

It goes without saying that these methods for defining retention capacitors are applicable to liquid crystal panels described later.

Figure 5:
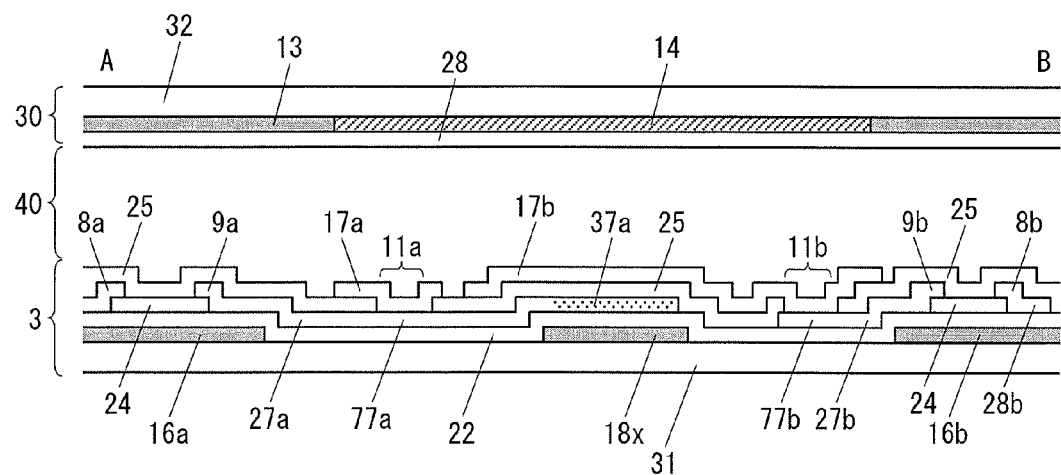
FIG. 5 is a cross-sectional view illustrating a specific example of a cross section taken from line A-B of FIG. 2.

FIG. 5 illustrates a cross section taken from line A-B of FIG. 2. The liquid crystal panel 5a includes an active matrix substrate 3, a color filter substrate 30 which faces the active matrix substrate 3, and a liquid crystal layer 40 which is provided between the active matrix substrate 3 and the color filter substrate 30.

According to the active matrix substrate 3, the scanning signal line 16a and the scanning signal line 16b, and the retention capacitor line 18x are provided on a glass substrate 31, and an inorganic gate insulating film 22 is provided so as to cover the scanning signal lines 16a 16b, and the retention capacitor line 18x. On the inorganic gate insulating film 22, semiconductor layers 24 (i layers and n+ layers), the source electrodes 8a and 8b which are in contact with the respective n+ layers, the drain electrodes 9a and 9b which are in contact with the respective n+ layers, the drain drawing lines 27a and 27b, the source drawing line 28b, the contact electrodes 77a and 77b (see FIG. 2), and the coupling capacitor electrode 37a are provided. An inorganic interlayer insulating film 25 is provided so as to cover the semiconductor layers 24, the source electrodes 8a and 8b, the drain electrodes 9a and 9b, the drain drawing lines 27a and 27b, the source drawing line 28b, the contact electrodes 77a and 77b, and the coupling capacitor electrode 37a. Note that the semiconductor layers 24 (typically channel sections of respective transistors) which overlap none of the source electrodes 8a and 8b, and the drain electrodes 9a and 9b are obtained by removing the respective n+ layers and have only the respective i layers. The pixel electrodes 17a and 17b are provided on the inorganic interlayer insulating film 25. An alignment film (not illustrated) is provided so as to cover the pixel electrodes 17a and 17b. Note here that the inorganic interlayer insulating film 25 is hollowed at the contact hole 11a and the contact hole 11b (see FIG. 2). This (i) connects the pixel electrode 17a and the contact electrode 77a and (ii) connects the pixel electrode 17b and the contact electrode 77b. The coupling capacitor electrode 37a which leads to the drain drawing line 27a overlaps the pixel electrode 17b via the inorganic interlayer insulating film 25. This defines the coupling capacitor C101 (see FIG. 1). The coupling capacitor electrode 37a overlaps the retention capacitor line 18x via the inorganic gate insulating film 22. This defines the retention capacitor Cha (see FIG. 1) and defines the retention capacitor Chb (see FIG. 1) between the pixel electrode 17b and the retention capacitor line 18x.

Though not illustrated, the source drawing line 28b is connected to the contact electrode 77a', and the inorganic interlayer insulating film 25 is hollowed at the contact hole 11a'. This connects the pixel electrode 17a and the contact electrode 77a'.

In contrast, according to the color filter substrate 30, a black matrix 13 and a colored layer 14 are provided on a glass substrate 32, a common electrode (com) is provided on the glass substrate 32, and an alignment film (not illustrated) is provided so as to cover the common electrode.

An example of a method for producing the active matrix substrate 3 of the present embodiment is described here.

First, (i) a metal film made of a material such as titanium, chromium, aluminum, molybdenum, tantalum, tungsten, or copper, (ii) an alloy film of such materials, or (iii) a film, in which (a) at least two metal films each made of the material are stacked, (b) at least two alloy films each made of the materials, or (c) at least one metal film made of the material and at least one alloy film made of the materials are stacked, is deposited on a transparent insulative substrate (the glass substrate 31 in FIG. 5) made of a material such as glass or plastic by a sputtering method or the like so as to have a thickness of 1000 Å to 3000 Å. Thereafter, the film (i), (ii), or (iii) thus deposited is patterned to have a required shape by a photo etching technique. This causes formations of, for example, scanning signal lines (serving as gate electrodes of respective transistors) and retention capacitor lines.

Next, a silicon nitride film (SiNx) which serves as the gate insulating film, a high-resistance semiconductor layer made of a material such as amorphous silicon or polysilicon, and a low-resistance semiconductor layer made of a material such as n+ amorphous silicon are sequentially deposited by a plasma CVD (Chemical Vapor Deposition) method or the like. The low-resistance semiconductor layer, the high-resistance semiconductor layer, and the gate insulating film are patterned by the photo etching technique. In this case, the gate insulating film is hollowed at the contact holes. Note that the silicon nitride film serving as the gate insulating film has a thickness of, for example, approximately 3000 Å to 5000 Å, an amorphous silicon film serving as the high-resistance semiconductor layer has a thickness of, approximately 1000 Å to 3000 Å, and an n+ amorphous silicon film serving as the low-resistance semiconductor layer has a thickness of, approximately 400 Å to 700 Å.

Subsequently, (i) a metal film made of a material such as titanium, chromium, aluminum, molybdenum, tantalum, tungsten, or copper, (ii) an alloy film of such materials, or (iii) a film, in which (a) at least two metal films each made of the material are stacked, (b) at least two alloy films each made of the materials, or (c) at least one metal film made of the material and at least one alloy film made of the materials are stacked, is deposited by the sputtering method or the like so as to have a thickness of 1000 Å to 3000 Å. Thereafter, the film (i), (ii), or (iii) thus deposited is patterned to have a required shape by the photo etching technique or the like. This causes formations of, for example, data signal lines, source electrodes, and drain electrodes.

Then, patterns of, for example, the data signal lines, the source electrodes, and the drain electrodes are masked with respect to the high-resistance semiconductor layer (i layer) such as an amorphous silicon film and the low-resistance semiconductor layer (n+ layer) such as an n+ amorphous silicon film, and the patterns thus masked are channel-etched by dry etching. Such a process optimizes a thickness of the i layer, so that each transistor (channel region) is formed. Note here that the semiconductor layer which is not masked is removed by etching and the i layer remains which has a thickness necessary for performance of the each transistor.

Thereafter, an inorganic insulating film made of a material such as silicon nitride or silicon oxide is deposited as an interlayer insulating film so as to cover, for example, the data signal lines, the source electrodes, and the drain electrodes. Note here that a silicon nitride film (passivation film) is deposited by the plasma CVD method or the like so as to have a thickness of approximately 2000 Å to 5000 Å.

Next, in accordance with where the contact holes are provided, holes are formed by etching the interlayer insulating film. Note here that a photosensitive resist is patterned by photolithography (exposure and development), so as to be etched.

Subsequently, for example, a transparent electroconductive film, which is made of a material such as ITO (Indium Tin Oxide), IZO (Indium Zinc Oxide), zinc oxide, or tin oxide and has a thickness of 1000 Å to 2000 Å, is deposited on the interlayer insulating film by the sputtering method or the like. Thereafter, the transparent electroconductive film is patterned by the photo etching technique or the like, so that first and second pixel electrodes in each pixel.

Then, an alignment film is provided so as to cover the first and second pixel electrodes by an ink jet method or the like.

The method for producing the active matrix substrate described above is also applicable to each of liquid crystal panels described later. For convenience, the following description omits an explanation of the method.

Figure 6:
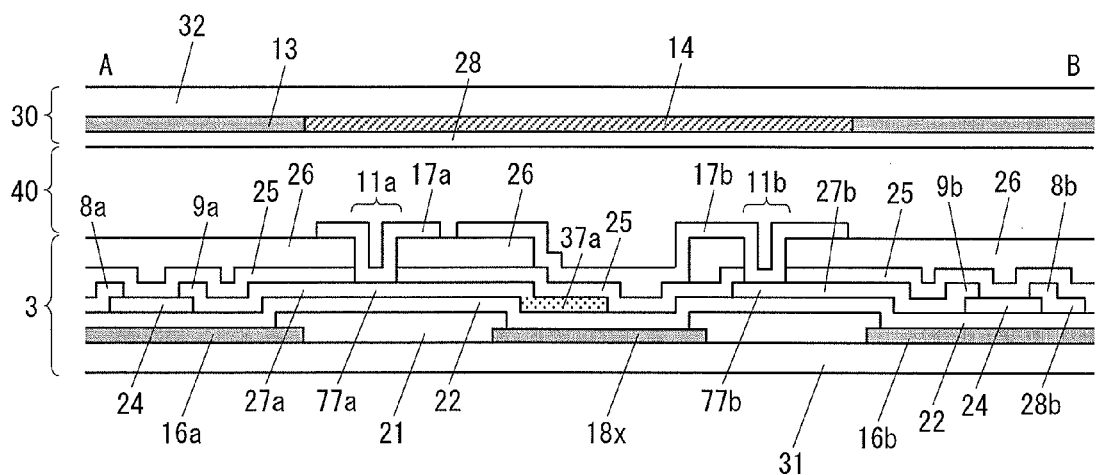
FIG. 6 is a cross-sectional view illustrating another specific example of the cross section taken from line A-B of FIG. 2.

The cross section illustrated in FIG. 5 and taken from line A-B of FIG. 2 may be arranged as illustrated in FIG. 6. Namely, a thick organic gate insulating film 21 and a thin inorganic gate insulating film 22 are deposited on the glass substrate 31, and a thin inorganic interlayer insulating film 25 and a thick organic interlayer insulating film 26 are deposited below the pixel electrodes. Such an arrangement yields an effect of reducing various parasitic capacitors and preventing wires from being short-circuited. Note that in this case, it is preferable to hollow a part of the organic gate insulating film 21 which part is located under the coupling capacitor electrode 37a and to hollow a part of the organic interlayer insulating film 26 which part is located over the coupling capacitor electrode 37a. Such an arrangement allows an increase in capacitance of the coupling capacitor C101 and the retention capacitors Cha and Chb.

The following description discusses an example of how to deposit the inorganic interlayer insulating film 25 and the organic interlayer insulating film 26, and the contact holes 11a and 11b of FIG. 6. Namely, after the transistors (TFTs) have been deposited, the inorganic interlayer insulating film 25 (passivation film), which has a thickness of approximately 3000 Å and is made of SiNx, is deposited by the CVD method by use of a mixed gas of $SiH_4$ gas, $NH_3$ gas, and $N_2$ gas so as to cover the entire substrate. Thereafter, the organic interlayer insulating film 26, which has a thickness of approximately 3 μm and is made of positive photosensitive acrylic resin, is deposited by a spin coat method or a die coat method. Subsequently, photolithography is carried out to form the hollowed part in the organic interlayer insulating film 26 and patterns of various contact holes. Then, while causing the organic interlayer insulating film 26 which has been patterned to serve as a mask, the inorganic interlayer insulating film 25 is dry-etched by use of a mixed gas of $CF_4$ gas and $O_2$ gas. Specifically, for example, the hollowed part in the organic interlayer insulating film 26 is subjected to half-exposure in the photolithography process so as to cause the organic interlayer insulating film 26 to remain thin at the end of a developing process, whereas the contact hole parts are subjected to full-exposure in the photolithography process so as to cause the organic interlayer insulating film 26 not to remain at the end of the developing process. Note here that, in a case where the dry etching is carried out with respect to the inorganic interlayer insulating film by use of the mixed gas of $CF_4$ gas and $O_2$ gas, (i) the remaining film (of the organic interlayer insulating film) is removed from the hollowed part in the organic interlayer insulating film 26 and (ii) the inorganic interlayer insulating film 25 which is provided under the organic interlayer insulating film 26 is removed from the contact hole parts. Note that the organic gate insulating film 21 and the organic interlayer insulating film 26 can be made of an SOG (spin-on glass) material, for example. Note also that the organic gate insulating film 21 and the organic interlayer insulating film 26 can contain at least one of acrylic resin, epoxy resin, polyimide resin, polyurethane resin, novolac resin, and siloxane resin.

Figure 7:
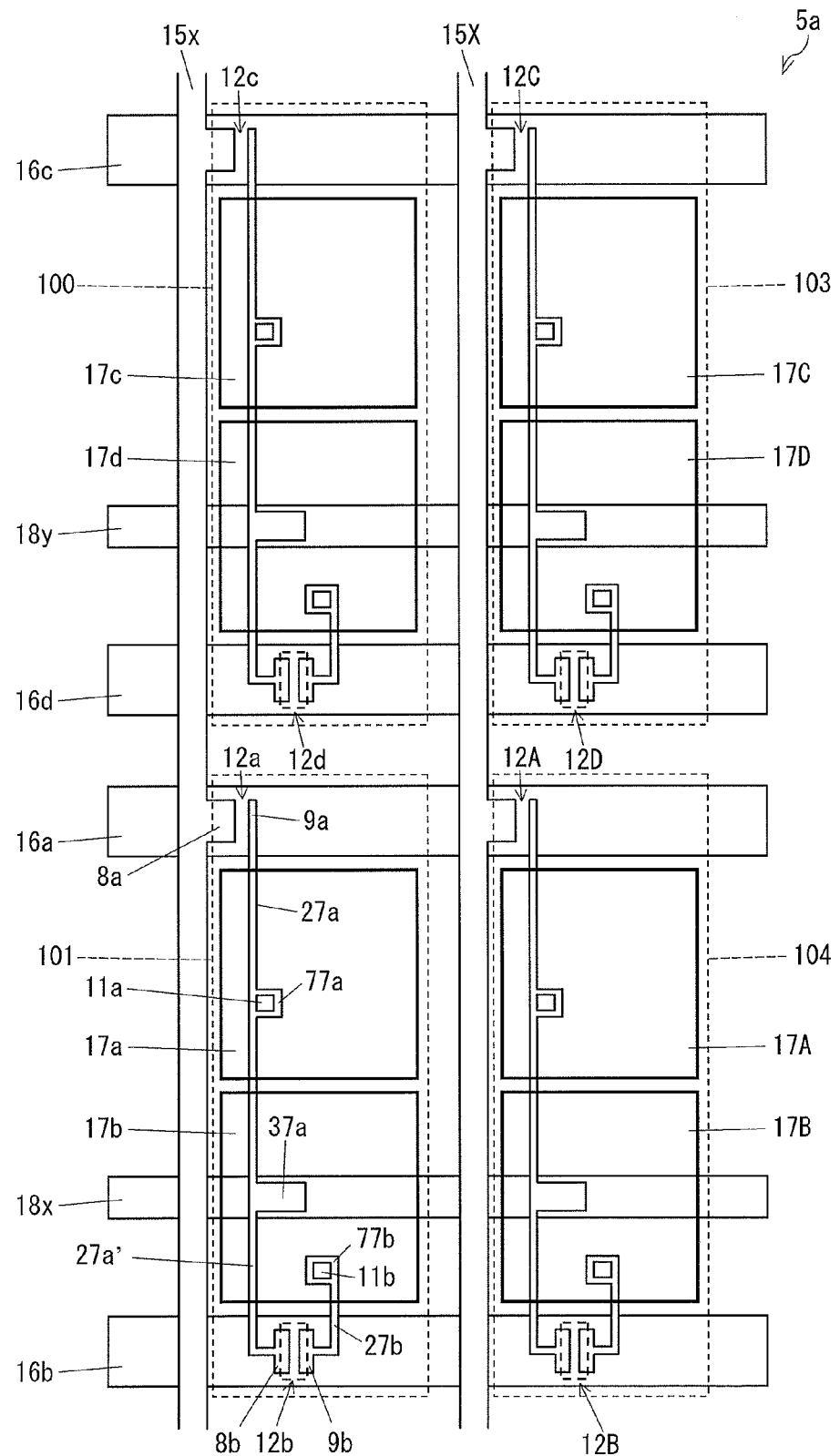

Note here that the liquid crystal panel 5*a* of Specific Example 1-1 (see FIG. 2) may be arranged as below. Namely, according to the liquid crystal panel 5*a* as First Modification (see FIG. 7), the coupling capacitor electrode 37*a* overlaps the pixel electrode 17*b* via the interlayer insulating film, and a coupling capacitor electrode extending section 27*a*' which is connected to the coupling capacitor electrode 37*a* is connected to the source electrode 8*b* of the transistor 12*b*. The drain drawing line 27*b* drawn out of the drain electrode 9*b* of the transistor 12*b* is connected to the contact electrode 77*b*, and the contact electrode 77*a* is connected to the pixel electrode 17*b* via the contact hole 11*b*.

Figure 8:
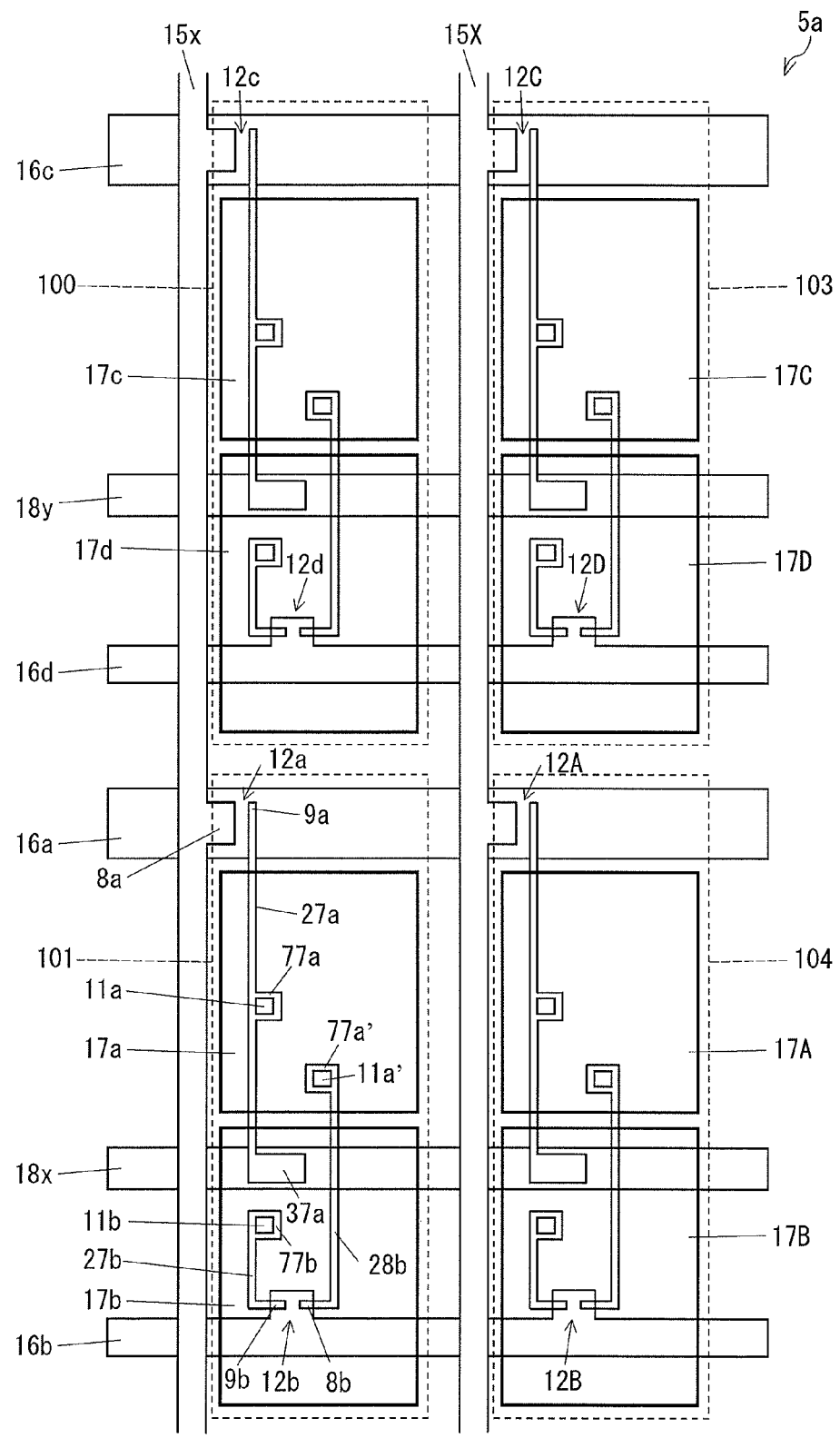

According to the liquid crystal panel 5*a* as Second Modification (see FIG. 8), the scanning signal line 16*b* is formed so as to have a branched part (have a gate branch structure), and the drain electrode and the source electrode of the transistor 12*b* are provided in the branched part. This (i) allows the scanning signal line 16*b* to have a smaller width and (ii) allows a reduction in parasitic capacitor defined between each of the source electrode 8*b* and the drain electrode 9*b* of the transistor 12*b* and the scanning signal line 16.

Note that each of these Modifications 1 and 2 is similarly applicable to each of specific examples of liquid crystal panels 5*a*, 5*b*, and 5*c* (described later).

(Driving Method for Driving Liquid Crystal Display Device)

Figure 9:
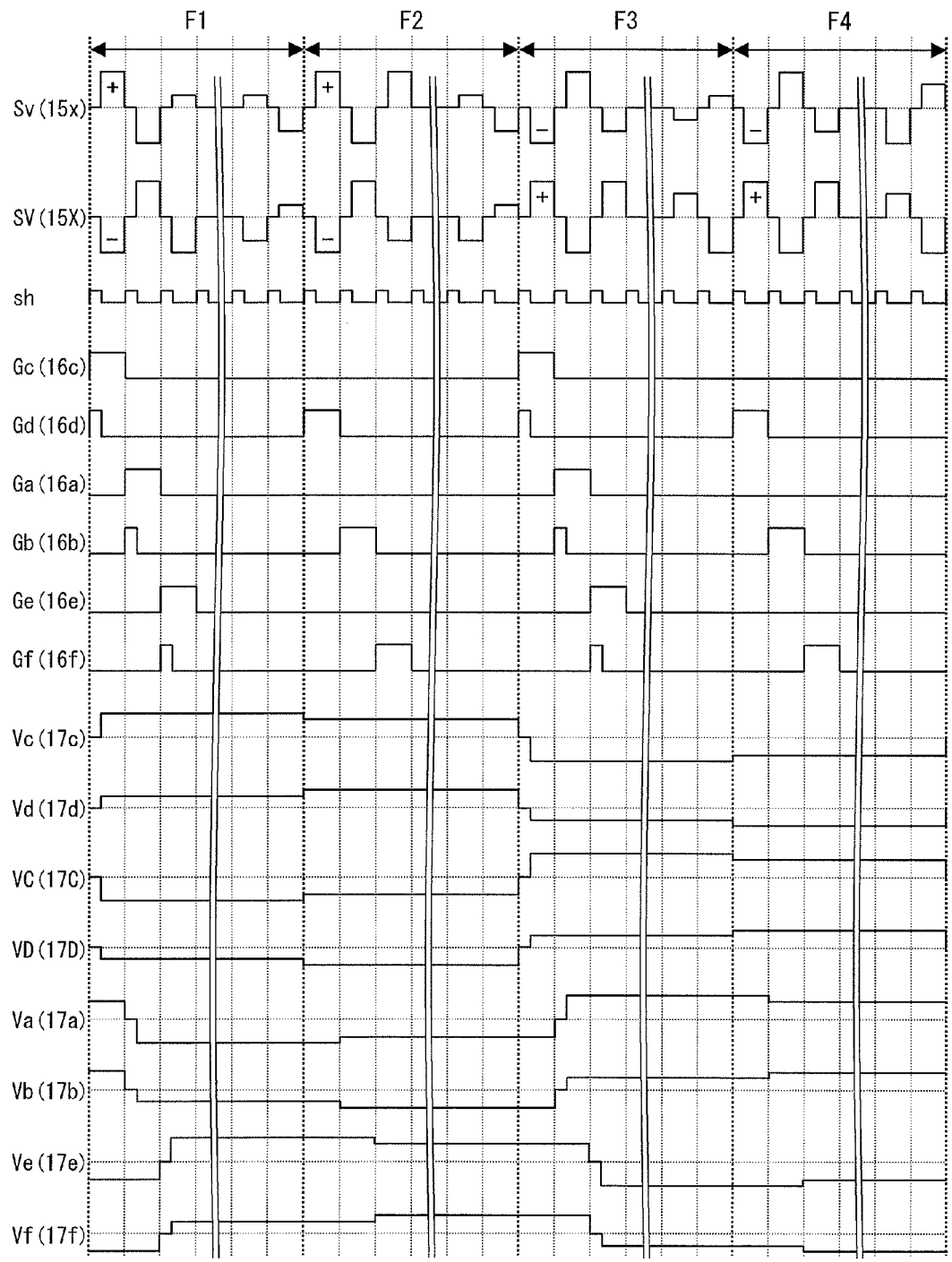

FIG. 9 is a timing chart showing a method for driving a liquid crystal display device of the present invention including the liquid crystal panel 5*a* (described above). Note that Sv and SV refer to signal electric potentials to be supplied to respective two adjacent data signal lines (e.g., 15*x* and 15X), Ga through Gf refer to gate on pulse signals to be supplied to respective scanning signal lines 16*a* through 16*f*, and Vc, Vd, VC, VD, Va, Vb, Ve, and Vf refer to electric potentials of respective pixel electrodes 17*c*, 17*d*, 17C, 17D, 17*a*, 17*b*, 17*e*, and 17*f*, and sh refers to a charge sharing signal. Note also that in a period in which the charge sharing signal is active ("H"), all the data signal lines are short-circuited to each other and identical electric potentials are supplied from an outside to all the respective data signal lines, so that charge sharing is carried out.

According to the driving method, a polarity of a signal electric potential to be supplied to a data signal line is reversed every one horizontal scanning period (1H), a polarity of a signal electric potential to be supplied in an identical horizontal scanning period of each frame is reversed every two frames, and signal electric potentials of reversed polarities are supplied to respective two adjacent data signal lines in the identical horizontal scanning period, so that charge sharing is carried out at the beginning of each horizontal scanning period (see FIG. 9).

Specifically, in case of consecutive frames F1 through F4, in the frame F1, each set of two upper and lower scanning signal lines corresponding to one pixel is sequentially selected (for example, (i) the scanning signal lines 16*c* and 16*d*, (ii) the scanning signal lines 16*a* and 16*b*, and (iii) the scanning signal lines 16*e* and 16*f* are sequentially selected (see FIG. 1)). To one (e.g., the data signal line 15*x*) of two adjacent data signal lines, a signal electric potential of a positive polarity is supplied in a first horizontal scanning period (for example, containing a writing period of the pixel electrodes 17*c* and 17*d*), a signal electric potential of a negative polarity is supplied in a second horizontal scanning period (for example, containing a writing period of the pixel electrodes 17*a* and 17*b*), and a signal electric potential of a positive polarity is supplied in a third horizontal scanning period (for example, containing a writing period of the pixel electrodes 17*e* and 17*f*). To the other (e.g., the data signal line 15X) of the two adjacent data signal lines, a signal electric potential of a negative polarity is supplied in the first horizontal scanning period (for example, containing a writing period of the pixel electrodes 17C and 17D), a signal electric potential of a positive polarity is supplied in the second horizontal scanning period (for example, containing a writing period of the pixel electrodes 17A and 17B), and a signal electric potential of a negative polarity is supplied in the third horizontal scanning period (for example, containing a writing period of the pixel electrodes 17E and 17F). Note that a charge sharing electric potential (Vcom) is supplied at the beginning of each of the horizontal scanning periods.

Note here that writing periods in which signal electric potentials are written to respective pixel electrodes provided in one pixel are set to be different from each other. Specifically, in FIG. 1, a period in which a signal electric potential of a positive polarity is written to the pixel electrode 17*c* in a case where the scanning signal line 16*c* is selected is longer than a period in which Vcom is written to the pixel electrode 17*d* in a case where the scanning signal line 16*d* is selected, and a period in which a signal electric potential of a negative polarity is written to the pixel electrode 17*a* in a case where the scanning signal line 16*a* is selected is longer than a period in which Vcom is written to the pixel electrode 17*b* in a case where the scanning signal line 16*b* is selected. Further, in one pixel, writing operations with respect to respective pixel electrodes are carried out within an identical horizontal scanning period, and the writing operation (active period) carried out in a shorter writing period finishes earlier than the writing operation (active period) carried out in a longer writing period. Specifically, a writing operation carried out with respect to the pixel electrode 17*d* finishes earlier than a writing operation carried out with respect to the pixel electrode 17*c*, a writing operation carried out with respect to the pixel electrode 17D finishes earlier than a writing operation carried out with respect to the pixel electrode 17C, and a writing operation carried out with respect to the pixel electrode 17*b* finishes earlier than a writing operation carried out with respect to the pixel electrode 17*a*.

As described earlier, a gate on pulse signal (second gate on pulse signal) that is supplied to a scanning signal line connected to a capacitively coupled pixel electrode is smaller in pulse width than a gate on pulse signal (first gate on pulse signal) that is supplied to a scanning signal line connected to a pixel electrode to which a regular signal electric potential is written. Further, the pulse width of the second gate on pulse signal is set so that the second gate on pulse signal becomes non-active before the first gate on pulse signal becomes non-active. According to this, a subpixel including the pixel electrode 17*c* (positive polarity) becomes "bright", a subpixel including the pixel electrode 17*d* (positive polarity) becomes "dark", a subpixel including the pixel electrode 17C (negative polarity) becomes "bright", a subpixel including the pixel electrode 17D (negative polarity) becomes "dark", a subpixel including the pixel electrode 17*a* (negative polarity) becomes "bright", and a subpixel including the pixel electrode 17*b* (negative polarity) becomes "dark".

In the frame F2, out of two upper and lower scanning signal lines corresponding to one pixel, a scanning signal line connected to a transistor for electrically connecting pixel electrodes of the one pixel is sequentially selected (for example, the scanning signal line 16*d*, the scanning signal line 16*b*, and the scanning signal line 16*f* are sequentially selected (see FIG. 1)). According to this, in a case where the scanning signal line 16d is selected, the pixel electrode 17c and the pixel electrode 17d of the pixel 100 are electrically connected, and the pixel electrode 17C and the pixel electrode 17D of the pixel 103 are electrically connected. In a case where the scanning signal line 16b is selected, the pixel electrode 17a and the pixel electrode 17b of the pixel 101 are electrically connected, and the pixel electrode 17A and the pixel electrode 17B of the pixel 104 are electrically connected. In a case where the scanning signal line 16f is selected, the pixel electrode 17e and the pixel electrode 17f of the pixel 102 are electrically connected, and the pixel electrode 17E and the pixel electrode 17F of the pixel 105 are electrically connected.

In the frame F2, neither of two pixel electrodes of each pixel is electrically connected to a data signal line, so that the two pixel electrodes are floating. This is because a scanning signal line (e.g., the scanning signal line 16c, 16a, or 16e (see FIG. 1)) connected to a transistor connected to a corresponding data signal line is not selected. As described earlier, since the two pixel electrodes which are electrically connected are floating, electric potentials of the respective two pixel electrodes change to be substantially equal to each other in the each pixel. Namely, in a case where the pixel electrode 17c of a bright subpixel (positive polarity) and the pixel electrode 17d of a dark subpixel (positive polarity) are connected (short-circuited), the pixel electrode 17c has a lower electric potential and the pixel electrode 17d has a higher electric potential, so that each of these subpixels (positive polarity) becomes "intermediate" (an intermediate luminance between a bright luminance which is relatively high in luminance and a dark luminance which is relatively low in luminance). Meanwhile, in a case where the pixel electrode 17C of a bright subpixel (negative polarity) and the pixel electrode 17D of a dark subpixel (negative polarity) are connected, the pixel electrode 17C has a lower electric potential (effective voltage) and the pixel electrode 17D has a higher electric potential (effective voltage), so that each of these subpixels (negative polarity) becomes "intermediate". Similarly, in a case where the pixel electrode 17a of a bright subpixel (negative polarity) and the pixel electrode 17b of a dark subpixel (negative polarity) are connected, the pixel electrode 17a has a lower electric potential (effective voltage) and the pixel electrode 17b has a higher electric potential (effective voltage), so that each of these subpixels (negative polarity) becomes "intermediate".

Positive and negative polarities of the frame F3 are reverse to those of the frame F1. Accordingly, the subpixel including the pixel electrode 17c (negative polarity) becomes "bright", the subpixel including the pixel electrode 17d (negative polarity) becomes "dark", the subpixel including the pixel electrode 17C (positive polarity) becomes "bright", the subpixel including the pixel electrode 17D (positive polarity) becomes "dark", the subpixel including the pixel electrode 17a (positive polarity) becomes "bright", and the subpixel including the pixel electrode 17b (positive polarity) becomes "dark".

Positive and negative polarities of the frame F4 are reverse to those of the frame F2. Accordingly, each of the subpixel including the pixel electrode 17c (negative polarity) and the subpixel including the pixel electrode 17d (negative polarity) becomes "intermediate", each of the subpixel including the pixel electrode 17C (positive polarity) and the subpixel including the pixel electrode 17D (positive polarity) becomes "intermediate", and each of the subpixel including the pixel electrode 17a (positive polarity) and the subpixel including the pixel electrode 17b (positive polarity) becomes "intermediate".

Figure 10:
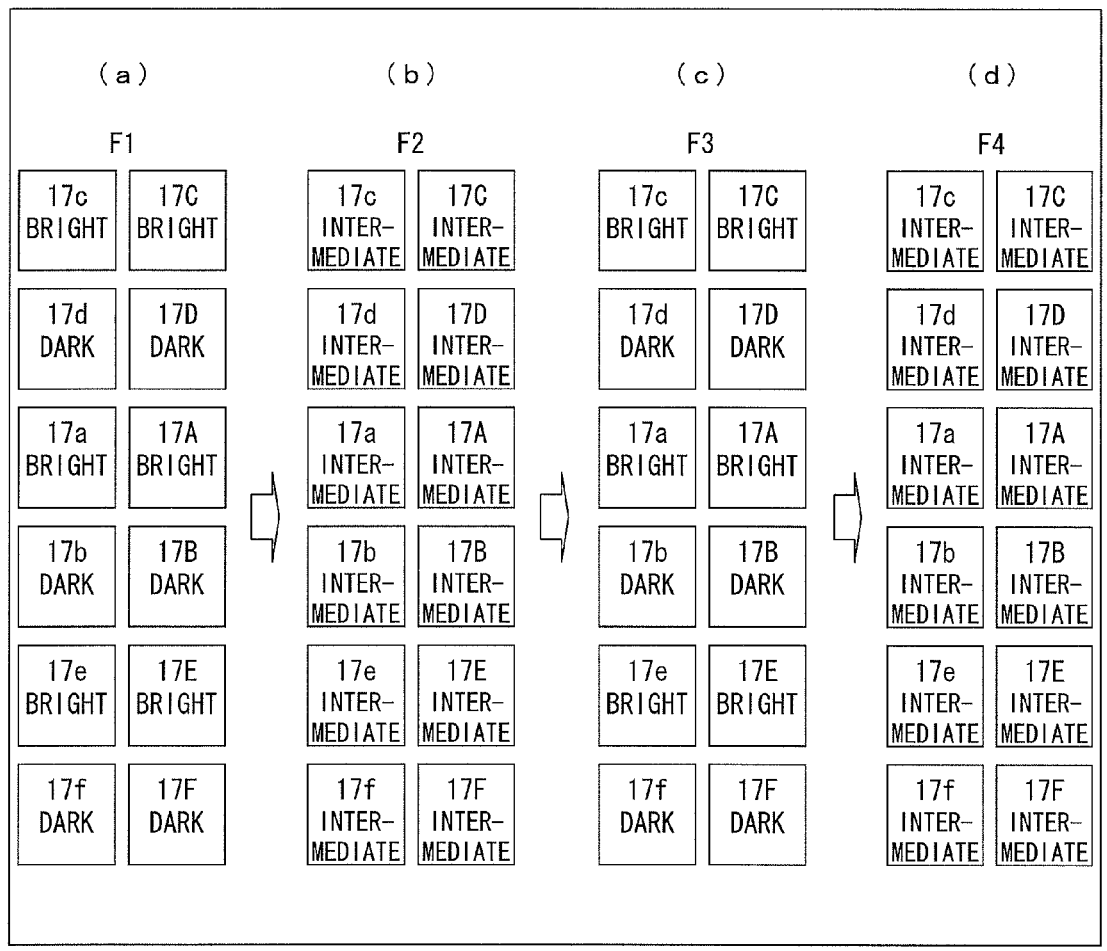
FIG. 10 schematically illustrates display states of respective frames in a case where the driving method of FIG. 9 is used.

In a case where the data signal lines 15x and 15X are driven in a liquid crystal display device including the liquid crystal panel 5a described above (see FIG. 9, for example), display states of the respective frames F1 through F4 are as illustrated in respective (a) through (d) of FIG. 10. An operation carried out in the frames F1 through F4 is repeated in subsequent frames.

As described earlier, the liquid crystal panel of the present invention is constituted by the pixel electrodes (17c, 17a, 17C, and 17A) each of which is connected to a corresponding one of the data signal lines (15x and 15X) via the respective first transistors (12c, 12a, 12C, and 12A in FIGS. 1 and 2) and the pixel electrodes (17d, 17b, 17D, and 17B) which are capacitively-coupled to the respective pixel electrodes (17c, 17a, 17C, and 17A). The pixel electrodes (17d, 17b, 17D, and 17B) are connected to each other via the respective second transistors (12d, 12b, 12D, and 12B in FIGS. 1 and 2). According to the driving method of the present invention, one pixel is formed of a bright subpixel and a dark subpixel in an odd-numbered frame (F1 or F3) by turning on a first transistor and supplying a data signal, whereas one pixel is formed of two intermediate subpixels in an even-numbered frame (F2 or F4) by turning on a second transistor and short-circuiting two pixel electrodes of each pixel. According to this, an input tone (halftone) is displayed by three types of changes in luminance (γ characteristics). This allows an improvement in viewing angle characteristic.

Note that according to the above description, processes are carried out in an odd-numbered frame and an even-numbered frame, respectively. Alternatively, one frame may be divided into a first half frame and a second half frame so that the process carried out in the odd-numbered frame is carried out in the first half frame and the process carried out in the even-numbered frame is carried out in the second half frame.

Note that according to the driving method of the present invention, a Vcom signal is supplied to all the pixel electrodes of one pixel at the beginning of each horizontal scanning period. Therefore, an electric potential of a pixel electrode can be reset to Vcom before a regular signal electric potential is written. According to this, an electric charge accumulated in the capacitively coupled pixel electrode can be discharged (refreshed). This can prevent (i) image sticking of a subpixel including a capacitively coupled pixel electrode and (ii) a deterioration in display quality.

Figure 11:
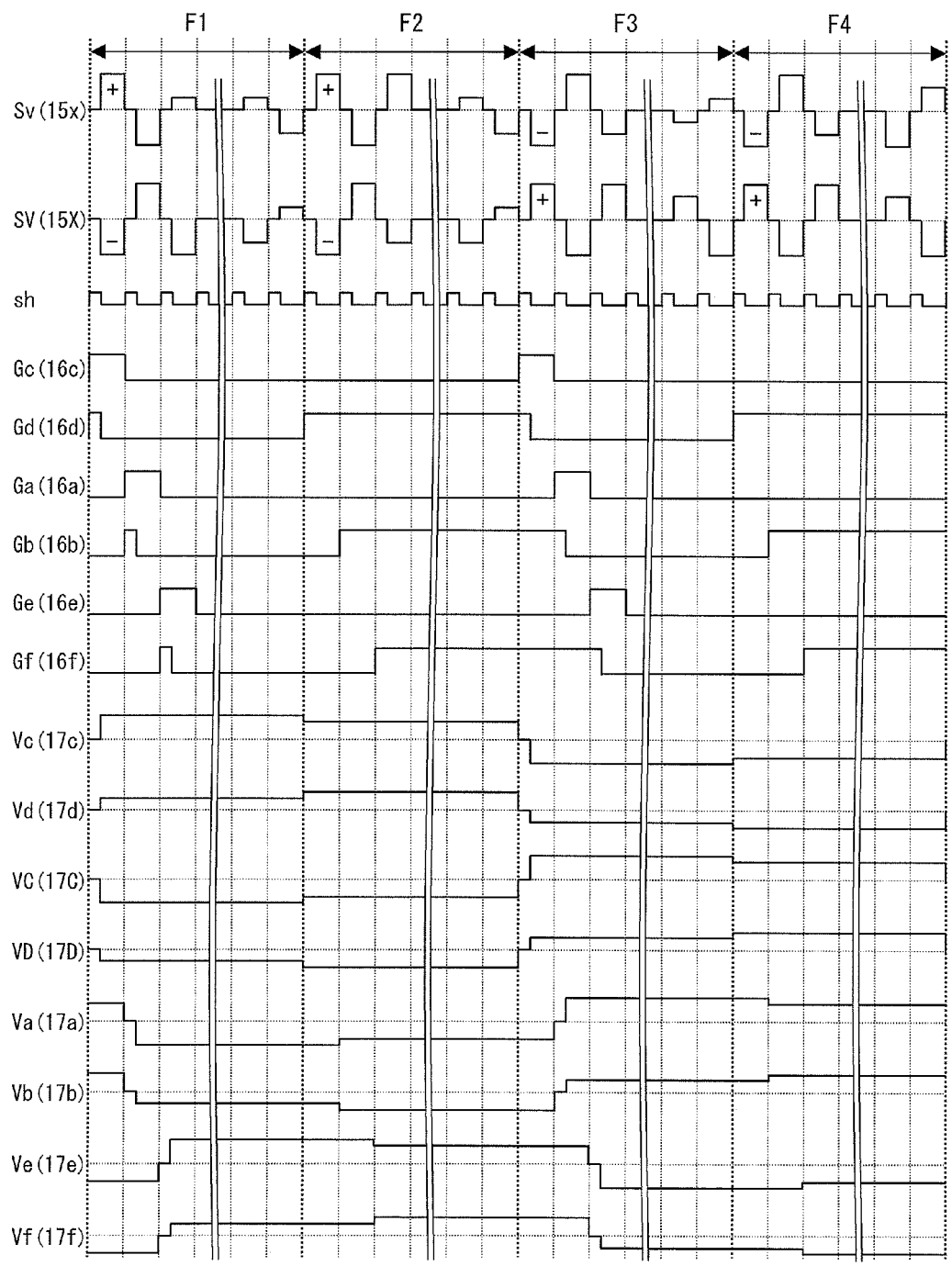

The driving method of FIG. 9 may be arranged as illustrated in FIG. 11. According to a driving method of FIG. 11, the scanning signal lines 16d, 16b, and 16f are selected in one frame. Specifically, the scanning signal line 16d is selected (active) in a first horizontal scanning period of the frame F2, and is not selected (non-active) while the scanning signal line 16c is being selected in a first horizontal scanning period of the frame F3. The scanning signal line 16b is selected (active) in a second horizontal scanning period of the frame F2, and is not selected (non-active) while the scanning signal line 16a is being selected in a second horizontal scanning period of the frame F3. The scanning signal line 16f is selected (active) in a third horizontal scanning period of the frame F2, and is not selected (non-active) while the scanning signal line 16e is being selected in a third horizontal scanning period of the frame F3. According to this, pixel electrodes can be short-circuited for a longer time in each pixel. This allows both electric potentials of the respective pixel electrodes to be more uniform.

Specific Example 1-2 of the Liquid Crystal Panel

Figure 12:
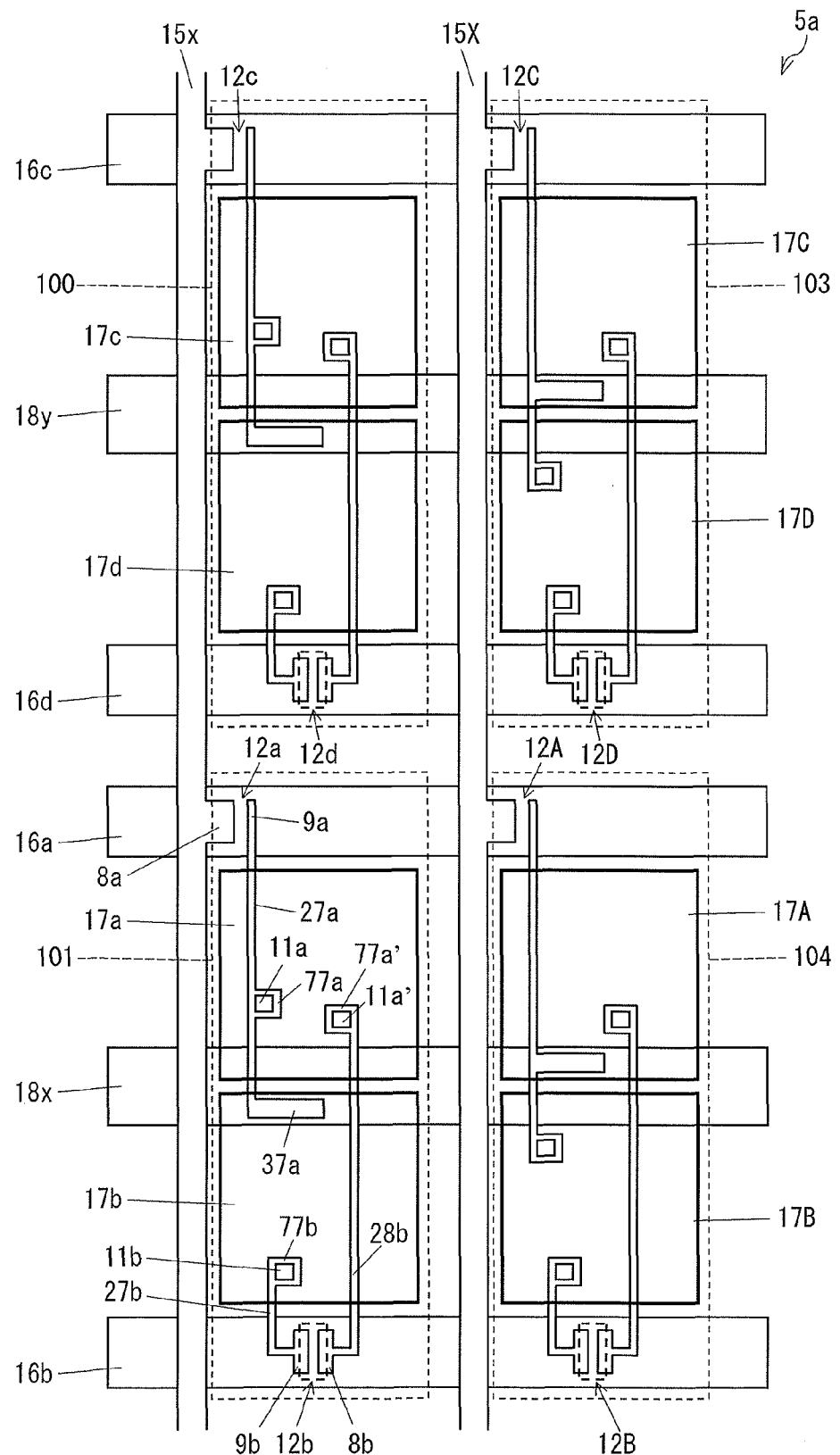

Note here that the liquid crystal panel 5a of FIG. 2 may be arranged as illustrated in FIG. 12. According to the liquid crystal panel 5a of FIG. 12, in the pixel 101 which is one of the pixels 101 and 104 that are adjacent to each other in the row direction, the pixel electrode 17a which is closer to the transistor 12a is connected to the transistor 12a. Meanwhile, in the pixel 104 which is the other of the pixels 101 and 104 that are adjacent to each other in the row direction, the pixel electrode 17B which is farther from the transistor 12A is connected to the transistor 12A.

Figure 13:
FIG. 13 is a timing chart showing a driving method for driving the liquid crystal display device including the liquid crystal panel 5a of FIG. 12.

FIG. 13 is a timing chart showing a driving method for driving the liquid crystal panel 5a of FIG. 12. A comparison of the timing charts of respective FIGS. 9 and 13 shows that "bright" and "dark" of the pixel electrodes 17C and 17D are reverse to each other. Namely, in FIG. 13, the subpixel including the pixel electrode 17C (negative polarity) becomes "dark", and the subpixel including the pixel electrode 17D (negative polarity) becomes "bright". According to this, display states of the respective frames F1 through F4 are as illustrated in respective (a) through (d) of FIG. 14. An operation carried out in the frames F1 through F4 is repeated in subsequent frames. The liquid crystal panel of FIG. 12 prevents bright subpixels or dark subpixels from being juxtaposed to each other in the row direction. Therefore, uneven stripes in the row direction can be reduced.

Specific Example 1-3 of the Liquid Crystal Panel

Figure 15:
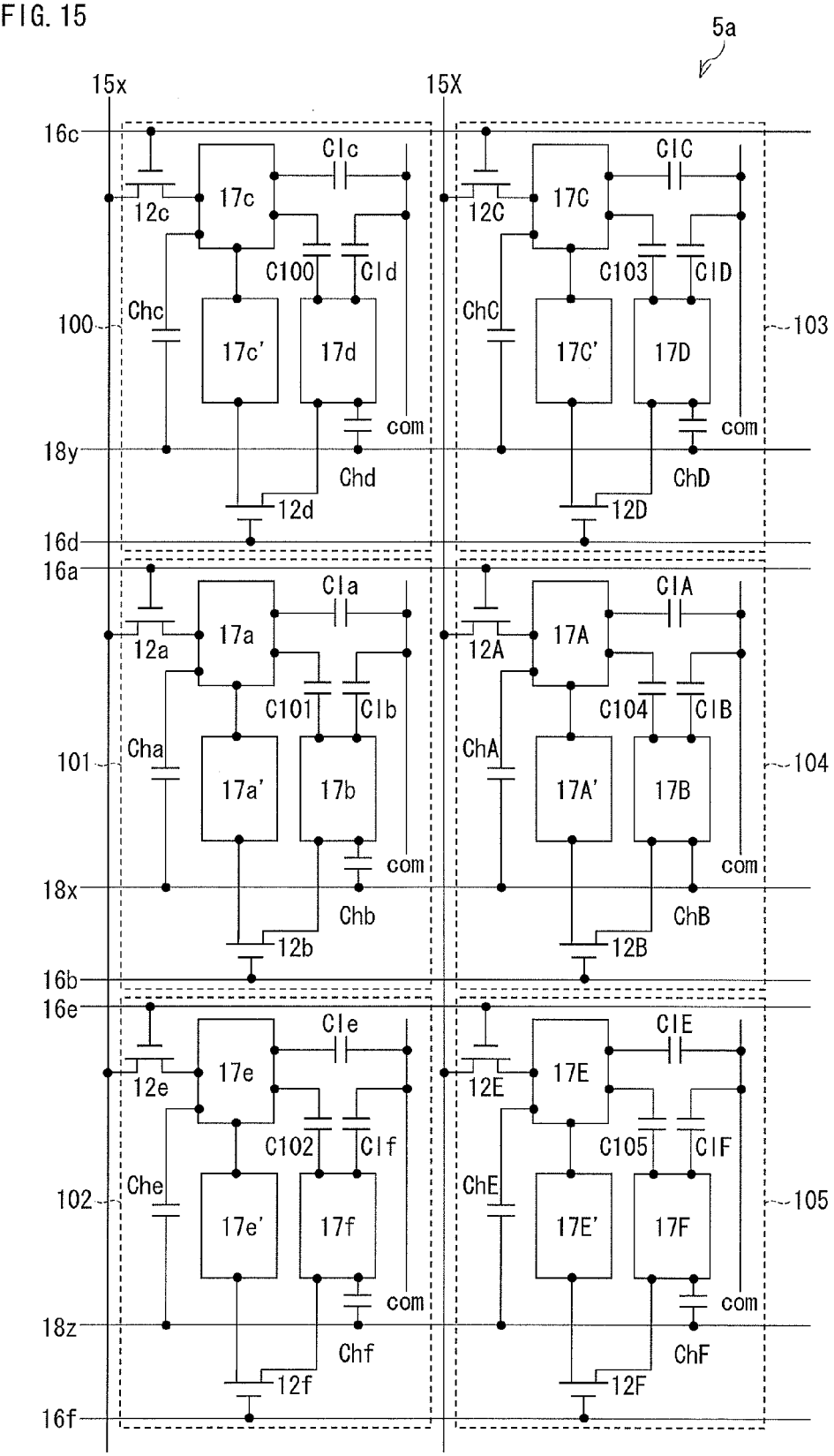
Figure 16:
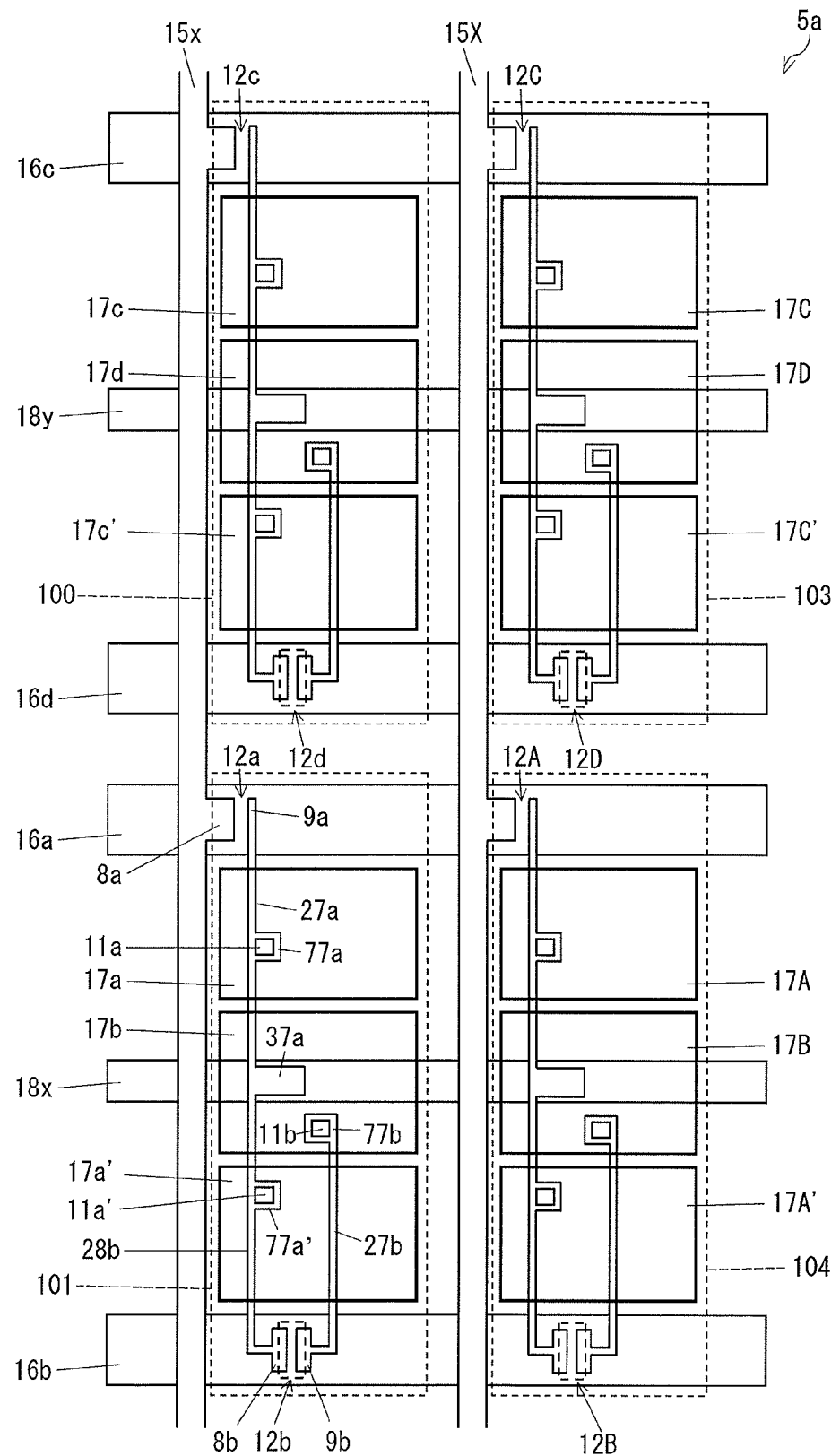
FIG. 16 is a plan view illustrating an arrangement (Specific Example 1-3) of the liquid crystal panel 5a of FIG. 15.

FIG. 15 is an equivalent circuit diagram which corresponds to Specific Example 1-3 of the liquid crystal panel 5a, and FIG. 16 illustrates Specific Example 1-3 of the liquid crystal panel 5a.

The pixels are identical in structure (see FIG. 15). One data signal line and two scanning signal lines are provided so as to correspond to one pixel. Three pixel electrodes 17c, 17d, and 17c' which are provided in the pixel 100 (FIG. 15 shows how the pixel electrodes 17c and 17c' are electrically connected), three pixel electrodes 17a, 17b, and 17a' which are provided in the pixel 101, and three pixel electrodes 17e, 17f, and 17e' which are provided in the pixel 102 are provided. Three pixel electrodes 17C, 17D, and 17C' which are provided in the pixel 103, three pixel electrodes 17A, 17B, and 17A' which are provided in the pixel 104, and three pixel electrodes 17E, 17F, and 17E' which are provided in the pixel 105 are provided.

The following description takes the pixel 101 as an example. The pixel 101 is arranged as follows: The pixel electrodes 17a and 17b are connected via the coupling capacitor C101. The pixel electrode 17a is connected to the data signal line 15x via the transistor 12a which is connected to the scanning signal line 16a. The pixel electrode 17b is connected to each of the pixel electrodes 17a and 17a' via the transistor 12b which is connected to the scanning signal line 16b. The retention capacitor Cha is defined between each of the pixel electrodes 17a and 17a' and the retention capacitor line 18x. The retention capacitor Chb is defined between the pixel electrode 17b and the retention capacitor line 18x. The liquid crystal capacitor Cla is defined between each of the pixel electrodes 17a and 17a' and the common electrode com. The liquid crystal capacitor Clb is defined between the pixel electrode 17b and the common electrode corn.

According to the liquid crystal panel 5a of FIG. 16, as in the case of the liquid crystal panel of FIG. 2, the data signal line 15x is provided along the pixel 100 and the pixel 101, the data signal line 15X is provided along the pixel 103 and the pixel 104, the retention capacitor line 18y intersects the respective pixels 100 and 103, and the retention capacitor line 18x intersects the respective pixels 101 and 104.

Note here that the scanning signal line 16c is provided on one end side of the pixel 100, the scanning signal line 16d is provided on the other end side of the pixel 100, and the pixel electrodes 17c, 17d, and 17c' are provided in the column direction between the scanning signal lines 16c and 16d in plan view. Similarly, the scanning signal line 16c is provided on one end side of the pixel 103, the scanning signal line 16d is provided on the other end side of the pixel 103, and the pixel electrodes 17C, 17D, and 17C' are provided in the column direction between the scanning signal lines 16c and 16d in plan view.

Note also that the scanning signal line 16a is provided on one end side of the pixel 101, the scanning signal line 16b is provided on the other end side of the pixel 101, and the pixel electrodes 17a, 17b, and 17a' are provided in the column direction between the scanning signal lines 16a and 16b in plan view. Similarly, the scanning signal line 16a is provided on one end side of the pixel 104, the scanning signal line 16b is provided on the other end side of the pixel 104, and the pixel electrodes 17A, 17B, and 17A' are provided in the column direction between the scanning signal lines 16a and 16b in plan view.

According to the pixel 101, the transistor 12a has the source electrode 8a and the drain electrode 9a which are provided on the scanning signal line 16a, and the transistor 12b has the source electrode 8b and the drain electrode 9b which are provided on the scanning signal line 16b. The source electrode 8a is connected to the data signal line 15x. The drain electrode 9a is connected to the drain drawing line 27a. The drain drawing line 27a is connected to each of the contact electrode 77a and the coupling capacitor electrode 37a. The contact electrode 77a is connected to the pixel electrode 17a via the contact hole 11a, and the coupling capacitor electrode 37a overlaps the pixel electrode 17b via the interlayer insulating film. This defines the coupling capacitor C101 (see FIG. 15) between the pixel electrodes 17a and 17b.

The source electrode 8b of the transistor 12b is connected to the source drawing line 28b. The source drawing line 28b is connected to each of the contact electrode 77a' and the coupling capacitor electrode 37a. The contact electrode 77a' is connected to the pixel electrode 17a' (third pixel electrode) via the contact hole 11a'. The drain electrode 9b is connected to the drain drawing line 27b. The drain drawing line 27b is connected to the contact electrode 77b. The contact electrode 77b is connected to the pixel electrode 17b via the contact hole 11b.

The coupling capacitor electrode 37a overlaps the retention capacitor line 18x via the gate insulating film. This defines the retention capacitor Cha (see FIG. 15) and defines the retention capacitor Chb (see FIG. 15) between the pixel electrode 17b and the retention capacitor line 18x. Note that the other pixels are identical to the pixel 101 in arrangement (shape, provision, and connection of members).

According to the arrangement, in a case where the scanning signal line 16a is selected (and the scanning signal line 16b is not selected), the subpixels including the respective pixel electrodes 17a and 17a' become "bright", and the subpixel including the pixel electrode 17b becomes "dark". In a case where the scanning signal line 16b is selected (and the scanning signal line 16a is not selected), each of the subpixels becomes "intermediate". Further, the arrangement makes it possible to obtain an effect of preventing an electric charge from jumping from the scanning signal lines 16a and 16b to the pixel electrode 17b which is floating.

Figure 17:
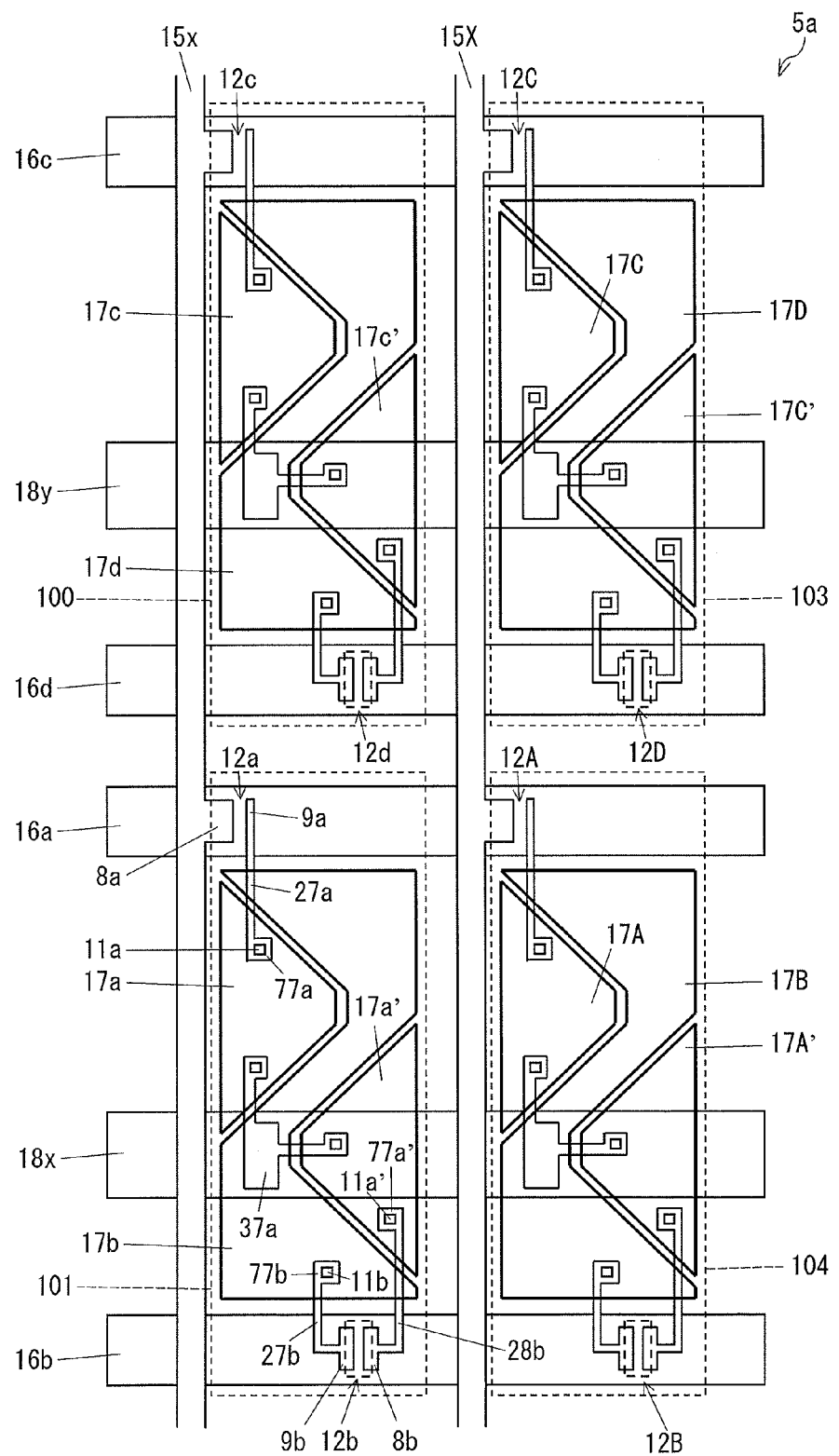
FIG. 17 is a plan view illustrating another arrangement of the liquid crystal panel 5a of FIG. 15.

Note here that the liquid crystal panel 5a illustrated in Specific Example 1-3 may be arranged as illustrated in FIG. 17. Namely, the pixel electrodes of the liquid crystal panel 5a illustrated in FIG. 17 differ in shape from those of the liquid crystal display panel 5a illustrated in FIG. 16. Specifically, in a case where the pixel 101 is taken as an example, the pixel electrodes 17a, 17b, and 17a' are provided so that a part of the pixel electrode 17a is in proximity to the scanning signal line 16a, a part of the pixel electrode 17a' is in proximity to the scanning signal line 16b, one end of the pixel electrode 17b is in proximity to the scanning signal line 16a, and the other end of the pixel electrode 17b is in proximity to the scanning signal line 16b. In other words, at least parts of the respective pixel electrodes 17a and 17a' are provided in proximity to the respective scanning signal lines 16a and 16b, and the pixel electrode 17b is provided so as to extend in the column direction and to connect the scanning signal lines 16a and 16b. Note that in FIG. 17, members given respective reference numerals identical to those given to the respective members illustrated in FIG. 16 have respective identical functions, and a description of those members is omitted here.

According to the arrangement, in a case where the scanning signal line 16a is selected (and the scanning signal line 16b is not selected), the subpixels including the respective pixel electrodes 17a and 17' become "bright", and the subpixel including the pixel electrode 17b becomes "dark". In a case where the scanning signal line 16b is selected (and the scanning signal line 16a is not selected), each of the subpixels becomes "intermediate". Further, the arrangement illustrated in FIG. 17 allows fewer drawing lines from the respective transistors 12a and 12b as compared to the arrangement illustrated in FIG. 16. Similarly, the arrangement illustrated in FIG. 17 allows fewer drawing lines at the coupling capacitor electrode 37a as compared to the arrangement illustrated in FIG. 16. This is because the pixel electrodes 17a and 17a' can be connected so as to be close to each other via the coupling capacitor electrode 37a. This allows a disconnection of the drawing lines to be less likely to occur and yields an effect of increasing an aperture ratio.

Specific Example 1-4 of the Liquid Crystal Panel

Figure 18:
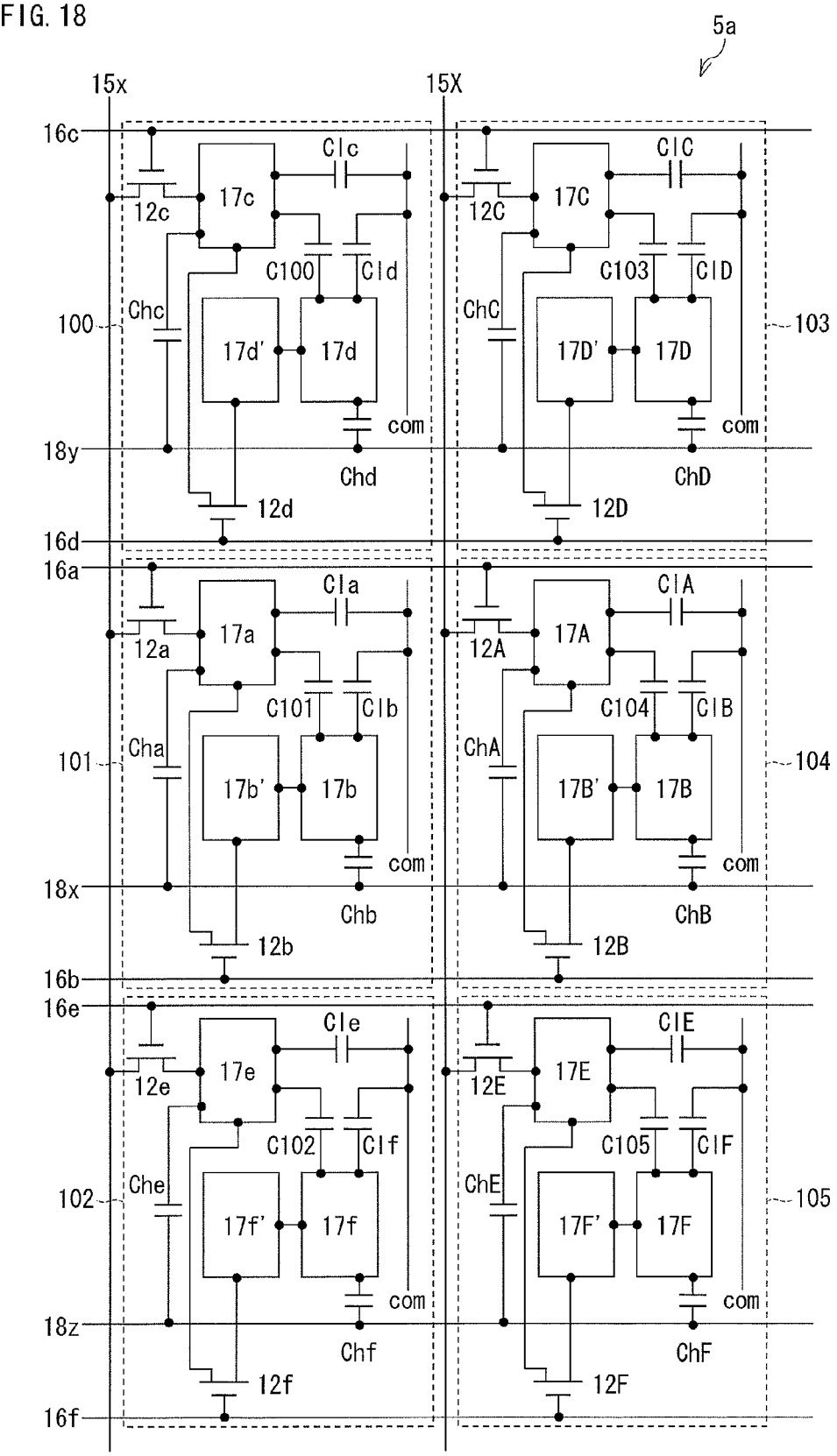
Figure 19:
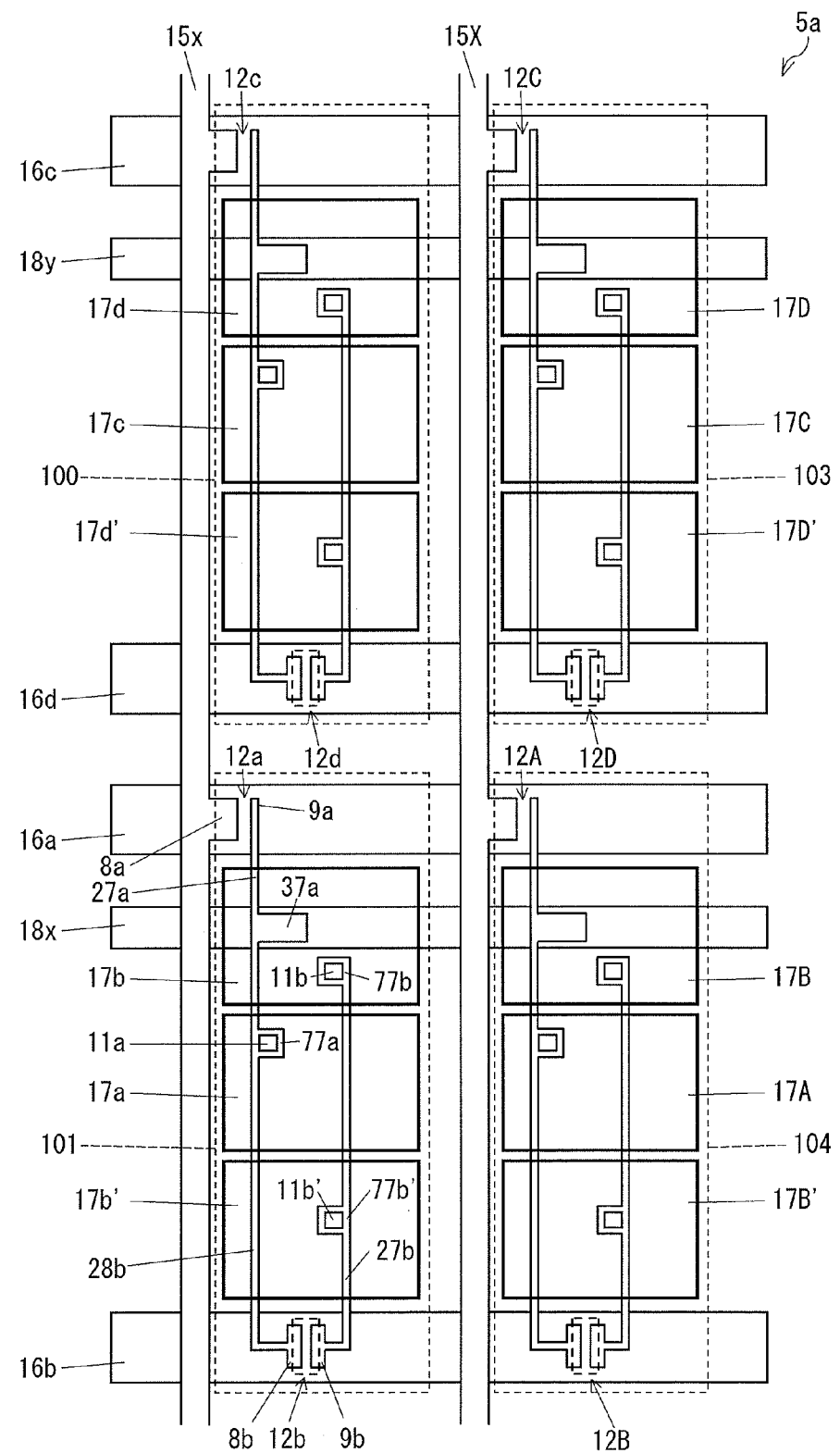
FIG. 19 is a plan view illustrating an arrangement (Specific Example 1-4) of the liquid crystal panel 5a of FIG. 18.

FIG. 18 is an equivalent circuit diagram which corresponds to Specific Example 1-4 of the liquid crystal panel 5a, and FIG. 19 illustrates Specific Example 1-4 of the liquid crystal panel 5a.

The pixels are identical in structure (see FIG. 18). One data signal line and two scanning signal lines are provided so as to correspond to one pixel. Three pixel electrodes 17d, 17c, and 17d' which are provided in the pixel 100 (FIG. 18 shows how the pixel electrodes 17d and 17d' are electrically connected), three pixel electrodes 17b, 17a, and 17b' which are provided in the pixel 101, and three pixel electrodes 17f, 17e, and 17f' which are provided in the pixel 102 are provided. Three pixel electrodes 17D, 17C, and 17D' which are provided in the pixel 103, three pixel electrodes 17B, 17A, and 17B' which are provided in the pixel 104, and three pixel electrodes 17F, 17E, and 17F' which are provided in the pixel 105 are provided.

The following description takes the pixel 101 as an example. The pixel 101 is arranged as follows: The pixel electrodes 17a and 17b are connected via the coupling capacitor C101. The pixel electrode 17a is connected to the data signal line 15x via the transistor 12a which is connected to the scanning signal line 16a. Each of the pixel electrodes 17b and 17b' which are electrically connected is capacitively-coupled to the pixel electrode 17a, and is connected to the pixel electrode 17a via the transistor 12b which is connected to the scanning signal line 16b. The retention capacitor Cha is defined between the pixel electrode 17a and the retention capacitor line 18x. The retention capacitor Chb is defined between each of the pixel electrodes 17b and 17b' and the retention capacitor line 18x. The liquid crystal capacitor Cla is defined between the pixel electrode 17a and the common electrode com. The liquid crystal capacitor Clb is defined between each the pixel electrodes 17b and 17b' and the common electrode com.

According to the liquid crystal panel 5a of FIG. 19, as in the case of the liquid crystal panel of FIG. 2, the data signal line 15x is provided along the pixel 100 and the pixel 101, the data signal line 15X is provided along the pixel 103 and the pixel 104, the retention capacitor line 18y intersects the respective pixels 100 and 103, and the retention capacitor line 18x intersects the respective pixels 101 and 104.

Note here that the scanning signal line 16c is provided on one end side of the pixel 100, the scanning signal line 16d is provided on the other end side of the pixel 100, and the pixel electrodes 17d, 17c, and 17d' are provided in the column direction between the scanning signal lines 16c and 16d in plan view. Similarly, the scanning signal line 16c is provided on one end side of the pixel 103, the scanning signal line 16d is provided on the other end side of the pixel 103, and the pixel electrodes 17D, 17C, and 17D' are provided in the column direction between the scanning signal lines 16c and 16d in plan view. The pixel electrodes 17d and 17D are adjacent to each other in the row direction. Same applies to each of the pixel electrodes 17c and 17C and the pixel electrodes 17d' and 17D'.

Note also that the scanning signal line 16a is provided on one end side of the pixel 101, the scanning signal line 16b is provided on the other end side of the pixel 101, and the pixel electrodes 17b, 17a, and 17b' are provided in the column direction between the scanning signal lines 16a and 16b in plan view. Similarly, the scanning signal line 16a is provided on one end side of the pixel 104, the scanning signal line 16b is provided on the other end side of the pixel 104, and the pixel electrodes 17B, 17A, and 17B' are provided in the column direction between the scanning signal lines 16a and 16b in plan view. The pixel electrodes 17b and 17B are adjacent to each other in the row direction, the pixel electrodes 17a and 17A are adjacent to each other in the row direction, and the pixel electrodes 17b' and 17B' are adjacent to each other in the row direction.

According to the pixel 101, the transistor 12a has the source electrode 8a and the drain electrode 9a which are provided on the scanning signal line 16a, and the transistor 12b has the source electrode 8b and the drain electrode 9b which are provided on the scanning signal line 16b. The source electrode 8a is connected to the data signal line 15x. The drain electrode 9a is connected to the drain drawing line 27a. The drain drawing line 27a is connected to each of the coupling capacitor electrode 37a and the contact electrode 77a. The contact electrode 77a is connected to the pixel electrode 17a via the contact hole 11a, and the coupling capacitor electrode 37a overlaps the pixel electrode 17b via the interlayer insulating film. This defines the coupling capacitor C101 (see FIG. 18) between the pixel electrodes 17a and 17b.

The source electrode 8b of the transistor 12b is connected to the source drawing line 28b. The source drawing line 28b is connected to the contact electrode 77a. The drain electrode 9b is connected to the drain drawing line 27b. The drain drawing line 27b is connected to the contact electrode 77b. The contact electrode 77b is connected to the pixel electrode 17b via the contact hole 11b. The drain drawing line 27b is further connected to a contact electrode 77b', and the contact electrode 77b' is connected to the pixel electrode 17b' via the contact hole 11b'. The coupling capacitor electrode 37a overlaps the retention capacitor line 18x via the gate insulating film. This defines the retention capacitor Cha (see FIG. 18) and defines the retention capacitor Chb (see FIG. 18) between the pixel electrode 17b and the retention capacitor line 18x. Note that the other pixels are identical to the pixel 101 in arrangement (shape, provision, and connection of members).

According to the arrangement, in a case where the scanning signal line 16a is selected (and the scanning signal line 16b is not selected), the subpixel including the pixel electrode 17a becomes "bright", and the subpixels including the respective pixel electrodes 17b and 17b' become "dark". In a case where the scanning signal line 16b is selected (and the scanning signal line 16a is not selected), each of the subpixels becomes "intermediate". Further, the arrangement in which no bright pixels belonging to different pixels are adjacent to each other in the row direction enables a natural display as compared to an arrangement in which bright subpixels belonging to different pixels are adjacent to each other in the column direction.

Figure 20:
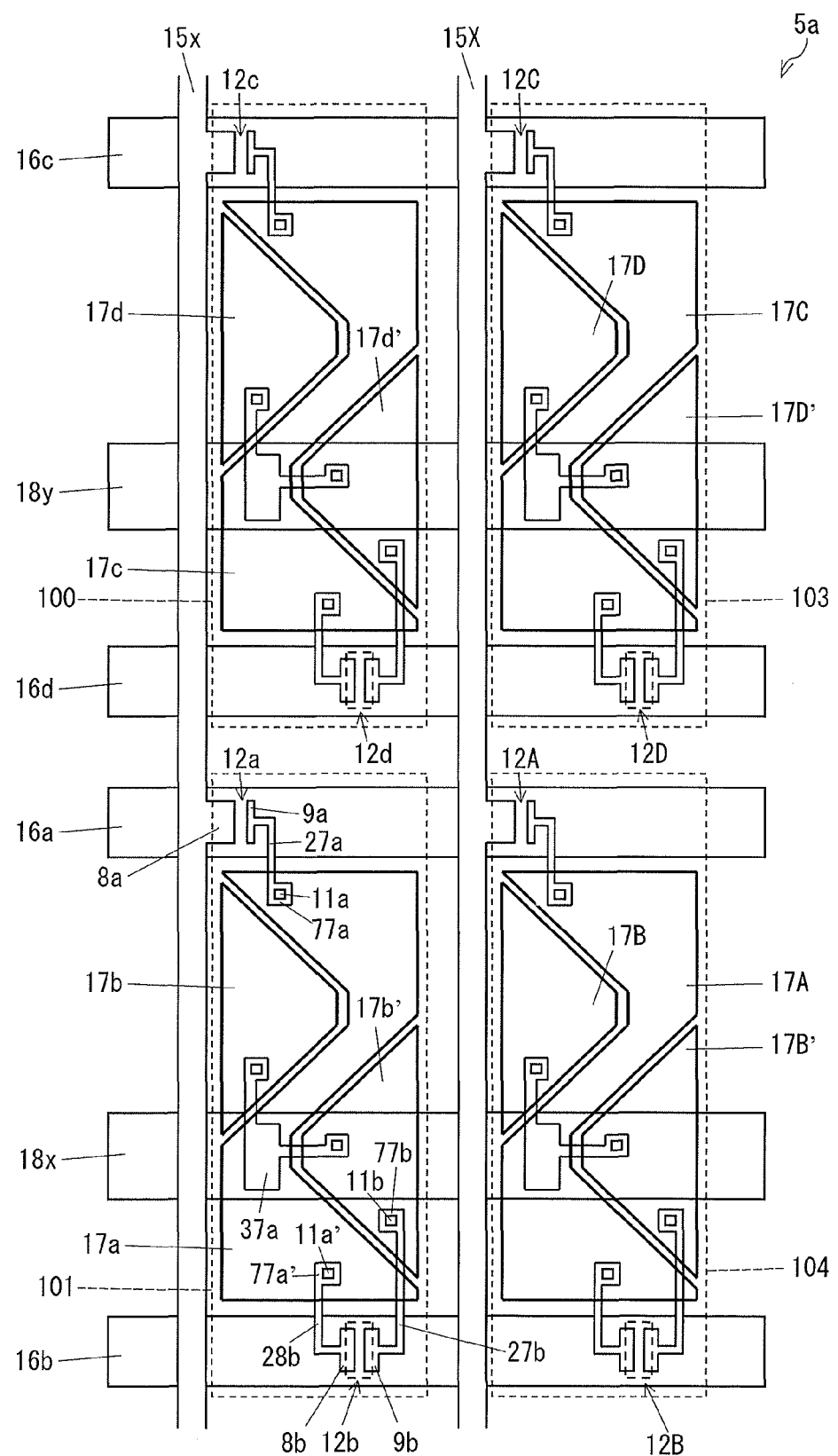
FIG. 20 is a plan view illustrating another arrangement of the liquid crystal panel 5a of FIG. 18.

Note that the liquid crystal panel 5a illustrated in Specific Example 1-4 may be arranged as illustrated in FIG. 20. Namely, as in the case of the liquid crystal panel 5a illustrated in FIG. 17, the pixel electrodes of the liquid crystal panel 5a illustrated in FIG. 20 differ in shape from those of the liquid crystal display panel 5a illustrated in FIG. 19. Specifically, in a case where the pixel 101 is taken as an example, the pixel electrodes 17b, 17a, and 17b' are provided so that a part of the pixel electrode 17b is in proximity to the scanning signal line 16a, a part of the pixel electrode 17b' is in proximity to the scanning signal line 16b, one end of the pixel electrode 17a is in proximity to the scanning signal line 16a, and the other end of the pixel electrode 17a is in proximity to the scanning signal line 16b. In other words, at least parts of the respective pixel electrodes 17b and 17b' are provided in proximity to the respective scanning signal lines 16a and 16b, and the pixel electrode 17a is provided so as to extend in the column direction and to connect the scanning signal lines 16a and 16b. Note that in FIG. 20, members given respective reference numerals identical to those given to the respective members illustrated in FIG. 19 have respective identical functions, and a description of those members is omitted here.

According to the arrangement, in a case where the scanning signal line 16a is selected (and the scanning signal line 16b is not selected), the subpixel including the pixel electrode 17a becomes "bright", and the subpixels including the respective pixel electrodes 17b and 17b' become "dark". In a case where the scanning signal line 16b is selected (and the scanning signal line 16a is not selected), each of the subpixels becomes "intermediate". As in the case of the arrangement illustrated in FIG. 15, the arrangement illustrated in FIG. 20 allows a disconnection of the drawing lines to be less likely to occur and yields an effect of increasing an aperture ratio.

Second Embodiment

Figure 21:
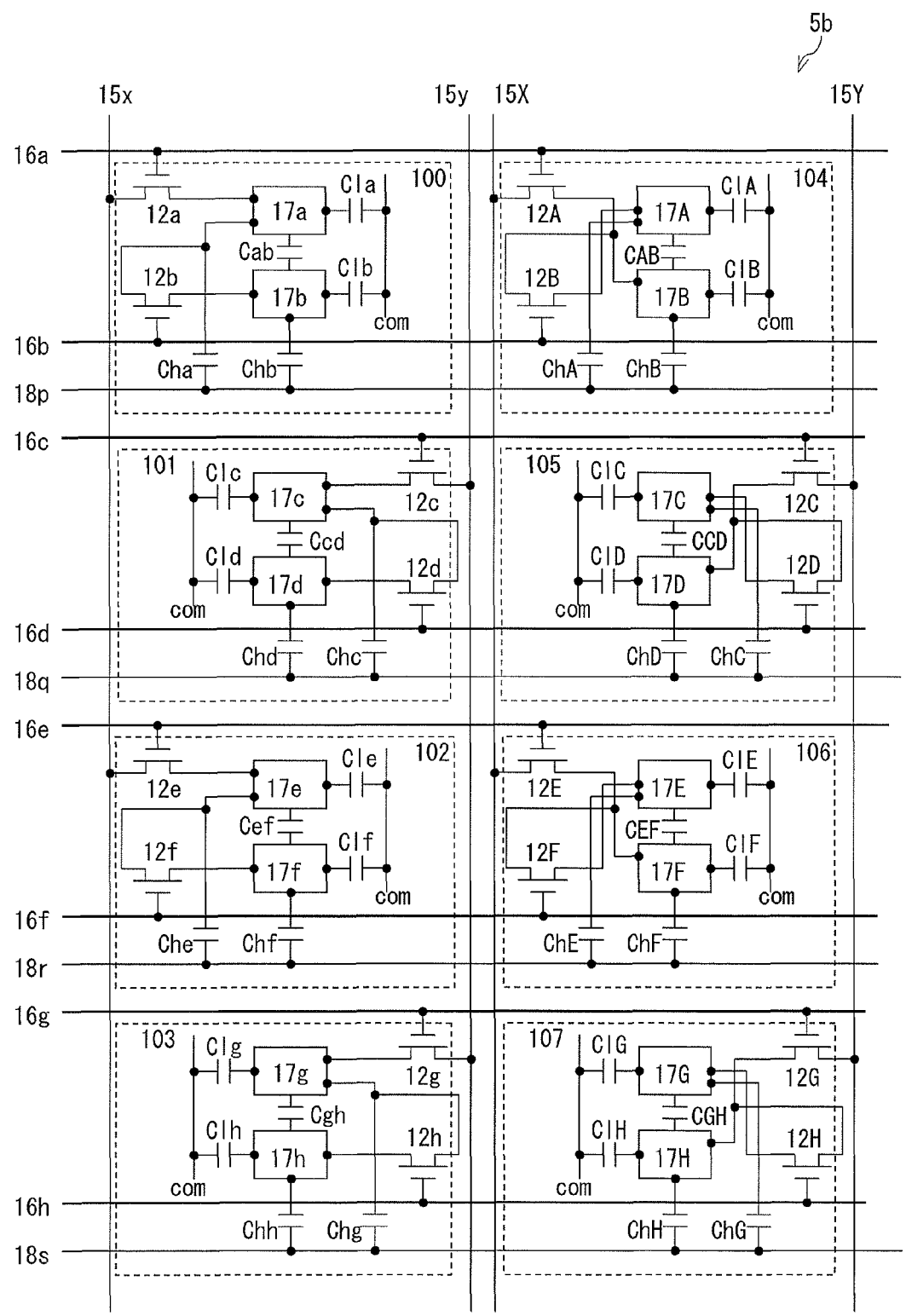
FIG. 21 is a circuit diagram illustrating an arrangement of a liquid crystal panel 5b in accordance with Second Embodiment.

FIG. 21 illustrates an arrangement of a liquid crystal panel 5b of Second Embodiment. The liquid crystal panel 5b is different from the liquid crystal panel 5a (see FIG. 1) in that two data signal lines are provided so as to correspond to one pixel column and pixels which are adjacent to each other in the column direction are connected to respective different data signal lines. The liquid crystal panel 5b and the liquid crystal panel 5a are identical except for this point.

Figure 22:
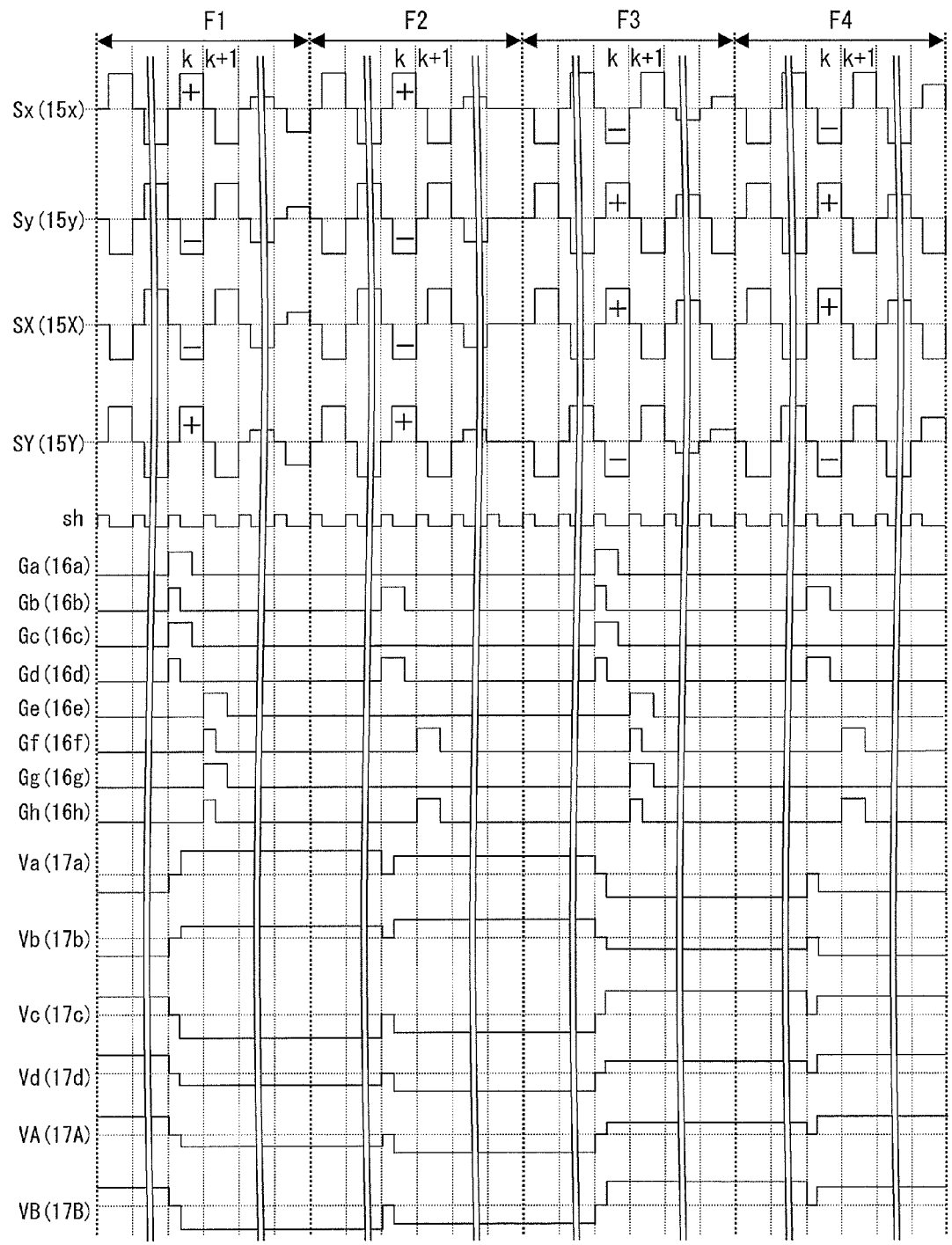
FIG. 22 is a timing chart showing a driving method for driving a liquid crystal display device including the liquid crystal panel 5b.

FIG. 22 is a timing chart showing a method for driving a liquid crystal display device of the present invention including the liquid crystal panel 5b of FIG. 21. Note that Sx, Sy, SX, and SY refer to signal electric potentials to be supplied to respective four adjacent data signal lines (e.g., 15x, 15y, 15X, and 15Y), Ga through Gh refer to gate on pulse signals to be supplied to respective scanning signal lines 16a through 16h, and Va, Vb, Vc, Vd, VA, and VB, refer to electric potentials of respective pixel electrodes 17a, 17b, 17c, 17d, 17A, and 17B, and sh refers to a charge sharing signal. Note also that in a period in which the charge sharing signal is active ("H"), all the data signal lines are short-circuited to each other and identical electric potentials are supplied from an outside to all the respective data signal lines, so that charge sharing is carried out.

According to the driving method, four scanning signal lines are concurrently selected, so that a polarity of a data signal to be supplied to a data signal line is reversed every two frame periods (see FIG. 22). In addition, in an identical horizontal scanning period (H), data signals of reversed polarities are supplied to respective two data signal lines (15x and 15y or 15X and 15Y) which correspond to an identical pixel column, and data signals of identical polarities are supplied to respective two adjacent data signal lines (15y and 15X), so that charge sharing is carried out at the beginning of each horizontal scanning period.

Specifically, in case of consecutive frames F1 through F4, in the frame F1, each set of four scanning signal lines corresponding to two pixels is sequentially selected (for example, (i) the scanning signal lines 16a, 16b, 16c, and 16d, and (ii) the scanning signal lines 16e, 16f, 16g, and 16h are sequentially selected (see FIG. 21)). In a kth horizontal scanning period (for example, containing a writing period of the pixel electrodes 17a, 17b, 17c, and 17d), a signal electric potential of a positive polarity is supplied to one (a first data signal line, e.g., the data signal line 15x) of two adjacent data signal lines, and a signal electric potential of a negative polarity is supplied to the other (a second data signal line, e.g., the data signal line 15y) of the two adjacent data signal lines. Meanwhile, in a (k+1)th horizontal scanning period (for example, containing a writing period of the pixel electrodes 17e, 17f, 17g, and 17h), a signal electric potential of a negative polarity is supplied to one (e.g., the data signal line 15x) of two adjacent data signal lines, and a signal electric potential of a positive polarity is supplied to the other (e.g., the data signal line 15y) of the two adjacent data signal lines. Note that a charge sharing electric potential (Vcom) is supplied at the beginning of each of the horizontal scanning periods.

Note that writing periods in which signal electric potentials are written to respective pixel electrodes provided in one pixel are set to be different from each other (see FIG. 22). According to this, a subpixel including the pixel electrode 17a (positive polarity) becomes "bright", a subpixel including the pixel electrode 17b (positive polarity) becomes "dark", a subpixel including the pixel electrode 17c (negative polarity) becomes "bright", a subpixel including the pixel electrode 17d (negative polarity) becomes "dark", a subpixel including the pixel electrode 17A (negative polarity) becomes "dark", and a subpixel including the pixel electrode 17B (negative polarity) becomes "bright". Note that, in a case where charge sharing is not carried out at the beginning of each of the horizontal scanning periods, each set of two scanning signal lines (first scanning signal lines) corresponding to two pixels is sequentially selected (for example, (i) the scanning signal lines 16a and 16c, and (ii) the scanning signal lines 16e and 16g are sequentially selected (see FIG. 21)). Same applies to a subsequent operation.

In the frame F2, out of two upper and lower scanning signal lines corresponding to one pixel, a scanning signal line (second scanning signal line) connected to a transistor for electrically connecting pixel electrodes of the one pixel is sequentially selected every two pixels (for example, (i) the scanning signal lines 16*b* and 16*d*, and (ii) the scanning signal lines 16*f* and 16*h* are sequentially selected (see FIG. 21)). According to this, in a case where the scanning signal lines 16*b* and 16*d* are selected, the pixel electrode 17*a* and the pixel electrode 17*b* of a pixel 100 are electrically connected, the pixel electrode 17*c* and the pixel electrode 17*d* of a pixel 101 are electrically connected, the pixel electrode 17A and the pixel electrode 17B of a pixel 104 are electrically connected, and the pixel electrode 17C and the pixel electrode 17D of a pixel 105 are electrically connected. In a case where the scanning signal lines 16*f* and 16*h* are selected, the pixel electrode 17*e* and the pixel electrode 17*f* of a pixel 102 are electrically connected, the pixel electrode 17*g* and the pixel electrode 17*h* of a pixel 103 are electrically connected, the pixel electrode 17E and the pixel electrode 17F of a pixel 106 are electrically connected, and the pixel electrode 17G and the pixel electrode 17H of a pixel 107 are electrically connected.

In the frame F2, neither of two pixel electrodes of each pixel is electrically connected to a data signal line, so that the two pixel electrodes are floating. This is because a scanning signal line (e.g., the scanning signal line 16*a*, 16*c*, 16*e*, or 16*g* (see FIG. 21)) connected to a transistor connected to a corresponding data signal line is not selected. As described earlier, since the two pixel electrodes which are electrically connected are floating, electric potentials of the respective two pixel electrodes change to be substantially equal to each other in the each pixel. Namely, in a case where the pixel electrode 17*a* of a bright subpixel (positive polarity) and the pixel electrode 17*b* of a dark subpixel (positive polarity) are connected (short-circuited), the pixel electrode 17*a* has a lower electric potential and the pixel electrode 17*b* has a higher electric potential, so that each of these subpixels (positive polarity) becomes "intermediate" (an intermediate luminance between a bright luminance which is relatively high in luminance and a dark luminance which is relatively low in luminance). Meanwhile, in a case where the pixel electrode 17*c* of a bright subpixel (negative polarity) and the pixel electrode 17*d* of a dark subpixel (negative polarity) are connected, the pixel electrode 17*c* has a lower electric potential (effective voltage) and the pixel electrode 17*d* has a higher electric potential (effective voltage), so that each of these subpixels (negative polarity) becomes "intermediate". Similarly, in a case where the pixel electrode 17A of a dark subpixel (negative polarity) and the pixel electrode 17B of a bright subpixel (negative polarity) are connected, the pixel electrode 17A has a higher electric potential (effective voltage) and the pixel electrode 17B has a lower electric potential (effective voltage), so that each of these subpixels (negative polarity) becomes "intermediate".

Positive and negative polarities of the frame F3 are reverse to those of the frame F1. Accordingly, the subpixel including the pixel electrode 17*a* (negative polarity) becomes "bright", the subpixel including the pixel electrode 17*b* (negative polarity) becomes "dark", the subpixel including the pixel electrode 17*c* (positive polarity) becomes "bright", the subpixel including the pixel electrode 17*d* (positive polarity) becomes "dark", the subpixel including the pixel electrode 17A (positive polarity) becomes "dark", and the subpixel including the pixel electrode 17B (positive polarity) becomes "bright".

Positive and negative polarities of the frame F4 are reverse to those of the frame F2. Accordingly, each of the subpixel including the pixel electrode 17*a* (negative polarity) and the subpixel including the pixel electrode 17*b* (negative polarity) becomes "intermediate", each of the subpixel including the pixel electrode 17*c* (positive polarity) and the subpixel including the pixel electrode 17*d* (positive polarity) becomes "intermediate", and each of the subpixel including the pixel electrode 17A (positive polarity) and the subpixel including the pixel electrode 17B (positive polarity) becomes "intermediate".

Figure 23:
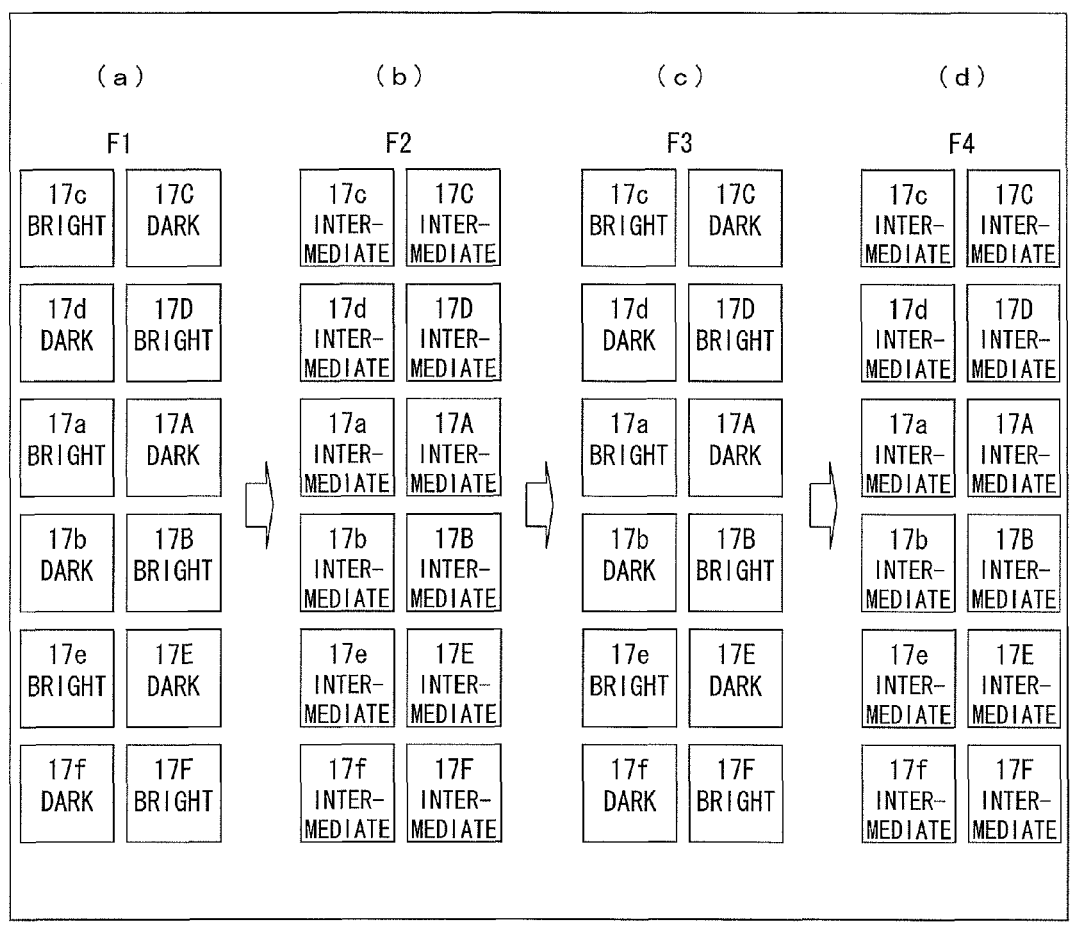
FIG. 23 schematically illustrates display states of respective frames in a case where the driving method of FIG. 22 is used.

In a case where the data signal lines 15*x*, 15*y*, 15X, and 15Y are driven in a liquid crystal display device including the liquid crystal panel 5*b* described above (see FIG. 22, for example), display states of the respective frames F1 through F4 are as illustrated in respective (a) through (d) of FIG. 23. An operation carried out in the frames F1 through F4 is repeated in subsequent frames. The arrangement prevents bright subpixels or dark subpixels from being juxtaposed to each other in the row direction. Therefore, uneven stripes in the row direction can be reduced.

As described earlier, the liquid crystal panel of the present invention is constituted by the pixel electrodes (17*a*, 17*c*, 17*e*, and 17*g*) each of which is connected to a corresponding one of the data signal lines (15*x* and 15*y*) via the respective first transistors (12*a*, 12*c*, 12*e*, and 12*g* in FIG. 21) and the pixel electrodes (17*b*, 17*d*, 17*f*, and 17*h*) which are capacitively-coupled to the respective pixel electrodes (17*a*, 17*c*, 17*e*, and 17*g*). The pixel electrodes (17*b*, 17*d*, 17*f*, and 17*h*) are connected to each other via the respective second transistors (12*b*, 12*d*, 12*f*, and 12*h* in FIG. 21). According to the driving method of the present invention, one pixel is formed of a bright subpixel and a dark subpixel in an odd-numbered frame (F1 or F3) by turning on a first transistor and supplying a data signal, whereas one pixel is formed of two intermediate subpixels in an even-numbered frame (F2 or F4) by turning on a second transistor and short-circuiting two pixel electrodes of each pixel. According to this, an input tone (halftone) is displayed by three types of changes in luminance (γ characteristics). This allows an improvement in viewing angle characteristic.

Note that according to the above description, processes are carried out in an odd-numbered frame and an even-numbered frame, respectively. Alternatively, one frame may be divided into a first half frame and a second half frame so that the process carried out in the odd-numbered frame is carried out in the first half frame and the process carried out in the even-numbered frame is carried out in the second half frame.

Note that according to the driving method of the present invention, a Vcom signal is supplied to all the pixel electrodes of one pixel at the beginning of each horizontal scanning period. Therefore, an electric potential of a pixel electrode can be reset to Vcom before a regular signal electric potential is written. According to this, an electric charge accumulated in the capacitively coupled pixel electrode can be discharged (refreshed). This can prevent (i) image sticking of a subpixel including a capacitively coupled pixel electrode and (ii) a deterioration in display quality.

Figure 24:
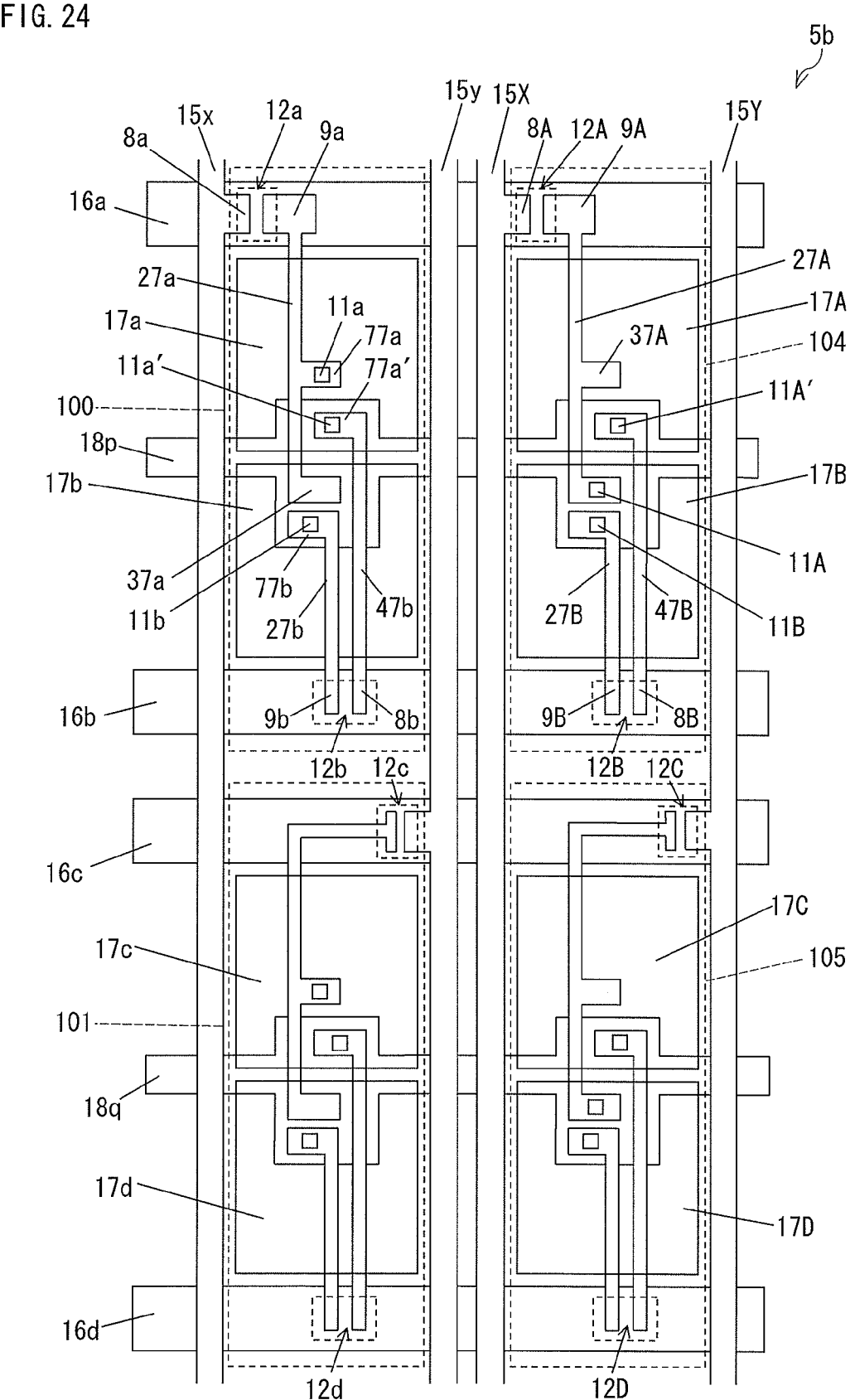
FIG. 24 is a plan view illustrating the arrangement of the liquid crystal panel 5b of FIG. 21.

FIG. 24 is a plan view illustrating a specific example of the liquid crystal panel 5*b* illustrated in FIG. 21. According to the liquid crystal panel 5*b* of FIG. 24, the data signal lines 15*x* and 15*y* are provided along the pixel 100 and the pixel 101, the data signal lines 15X and 15Y are provided along the pixel 104 and the pixel 105, a retention capacitor line 18*p* intersects the respective pixels 100 and 104, and a retention capacitor line 18*q* intersects the respective pixels 101 and 105.

Note here that the scanning signal line 16*a* is provided on one end side of the pixel 100, the scanning signal line 16*b* is provided on the other end side of the pixel 100, and the pixel electrodes 17*a* and 17*b* are provided in the column direction between the scanning signal lines 16*a* and 16*b* in plan view. Similarly, the scanning signal line 16*a* is provided on one end side of the pixel 104, the scanning signal line 16*b* is provided on the other end side of the pixel 104, and the pixel electrodes 17A and 17B are provided in the column direction between the scanning signal lines 16a and 16b in plan view.

Note also that the scanning signal line 16c is provided on one end side of the pixel 101, the scanning signal line 16d is provided on the other end side of the pixel 101, and the pixel electrodes 17c and 17d are provided in the column direction between the scanning signal lines 16c and 16d in plan view. Similarly, the scanning signal line 16c is provided on one end side of the pixel 105, the scanning signal line 16d is provided on the other end side of the pixel 105, and the pixel electrodes 17C and 17D are provided in the column direction between the scanning signal lines 16c and 16d in plan view.

According to the pixel 100, the transistor 12a has a source electrode 8a and a drain electrode 9a which are provided on the scanning signal line 16a, and the transistor 12b has a source electrode 8b and a drain electrode 9b which are provided on the scanning signal line 16b. The source electrode 8a is connected to the data signal line 15x. The drain electrode 9a is connected to a drain drawing line 27a. The drain drawing line 27a is connected to each of a contact electrode 77a and a coupling capacitor electrode 37a. The contact electrode 77a is connected to the pixel electrode 17a via a contact hole 11a, and the coupling capacitor electrode 37a overlaps the pixel electrode 17b via an interlayer insulating film. This defines a coupling capacitor Cab (see FIG. 21) between the pixel electrodes 17a and 17b.

The source electrode 8b of the transistor 12b is connected to a source drawing line 47b. The source drawing line 47b is connected to a contact electrode 77a'. The contact electrode 77a' is connected to the pixel electrode 17a via a contact hole 11a'. The drain electrode 9b is connected to a drain drawing line 27b. The drain drawing line 27b is connected to a contact electrode 77b. The contact electrode 77b is connected to the pixel electrode 17b via a contact hole 11b.

The coupling capacitor electrode 37a overlaps the retention capacitor line 18p via a gate insulating film. This defines a retention capacitor Cha (see FIG. 21) and defines a retention capacitor Chb (see FIG. 21) between the pixel electrode 17b and the retention capacitor line 18x.

According to the arrangement, in a case where the scanning signal line 16a is selected (and the scanning signal line 16b is not selected), the subpixel including the pixel electrode 17a becomes "bright", and the subpixel including the pixel electrode 17b becomes "dark". In a case where the scanning signal line 16b is selected (and the scanning signal line 16a is not selected), each of the subpixels becomes "intermediate".

According to the pixel 101 which is adjacent to the pixel 100 in the column direction, the pixel electrode 17c is connected to the data signal line 15y via the transistor 12c. The pixel 101 and the pixel 100 are identical in arrangement except for this point.

According to the pixel 104 which is adjacent to the pixel 100 in the row direction, a drain electrode 9A of a transistor 12A which is connected to the data signal line 15X is connected to the pixel electrode 17B via a contact hole 11A, and a coupling capacitor electrode 37A which is connected to a drain drawing line 27A drawn from the drain electrode 9A overlaps the pixel electrode 17A. The pixel 104 and the pixel 100 are identical in arrangement except for this point. According to the arrangement, in a case where the scanning signal line 16a is selected (and the scanning signal line 16b is not selected), the subpixel including the pixel electrode 17A becomes "dark", and the subpixel including the pixel electrode 17B becomes "bright". Meanwhile, in a case where the scanning signal line 16b is selected (and the scanning signal line 16a is not selected), each of the subpixels becomes "intermediate".

Third Embodiment

Figure 25:
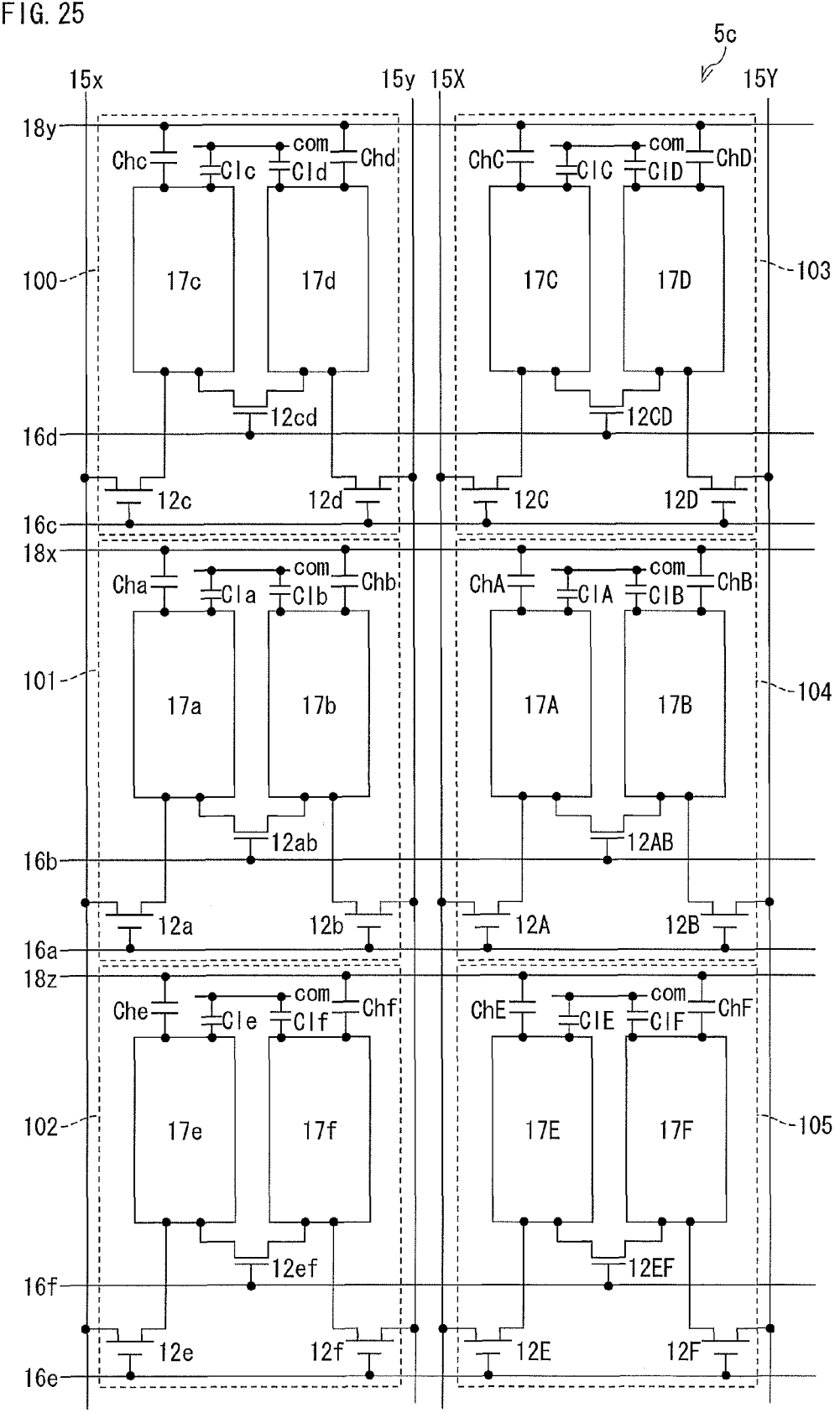
FIG. 25 is a circuit diagram illustrating an arrangement of a liquid crystal panel 5c in accordance with Third Embodiment.

FIG. 25 illustrates an arrangement of a liquid crystal panel 5c of Third Embodiment of the present invention. The liquid crystal panel 5c is arranged as follows: Two data signal lines and two scanning signal lines are provided so as to correspond to one pixel. Two pixel electrodes 17c and 17d provided in a pixel 100 and two pixel electrodes 17C and 17D provided in a pixel 103 are aligned in a row. Two pixel electrodes 17a and 17b provided in a pixel 101 and two pixel electrodes 17A and 17B provided in a pixel 104 are aligned in a row. Two pixel electrodes 17e and 17f provided in a pixel 102 and two pixel electrodes 17E and 17F provided in a pixel 105 are aligned in a row. The pixel electrodes 17c, 17a, and 17e are aligned in a column. The pixel electrodes 17d, 17b, and 17f are aligned in a column. The pixel electrodes 17C, 17A, and 17E are aligned in a column. The pixel electrodes 17D, 17B, and 17F are aligned in a column. A data signal line 15x is provided so as to correspond to the pixel electrodes 17c, 17a, and 17e. A data signal line 15y is provided so as to correspond to the pixel electrodes 17d, 17b, and 17f. A data signal line 15X is provided so as to correspond to the pixel electrodes 17C, 17A, and 17E. A data signal line 15Y is provided so as to correspond to the pixel electrodes 17D, 17B, and 17F.

Since the pixels are identical in structure, the following description mainly takes the pixel 101 as an example.

The pixel 101 is arranged as follows: The pixel electrode 17a (first pixel electrode) is connected to the data signal line 15x (first data signal line) via a transistor 12a (first transistor) which is connected to the scanning signal line 16a (first scanning signal line). The pixel electrode 17b (second pixel electrode) is connected to the data signal line 15y (second data signal line) via a transistor 12b (second transistor) which is connected to the scanning signal line 16a. The pixel electrodes 17a and 17b are connected to each other via a transistor 12ab (third transistor) which is connected to the scanning signal line 16b (second scanning signal line).

A retention capacitor Cha is defined between the pixel electrode 17a and the retention capacitor line 18x. A retention capacitor Chb is defined between the pixel electrode 17b and the retention capacitor line 18x. A liquid crystal capacitor Cla is defined between the pixel electrode 17a and the common electrode com. A liquid crystal capacitor Clb is defined between the pixel electrode 17b and the common electrode corn.

According to the arrangement, data signals are supplied to the respective pixel electrodes 17a and 17b from the respective data signal lines 15x and 15y which are different from each other. This allows the pixel electrodes 17a and 17b to differ in electric potential in the pixel 101. Accordingly, for example, a subpixel including the pixel electrode 17a can be "bright" and a subpixel including the pixel electrode 17b can be "dark". According to this, it is possible to make a pixel division type liquid crystal display device.

In a case where the scanning signal line 16a is not selected and the scanning signal line 16b is selected, the pixel electrodes 17a and 17b are electrically connected to each other via the transistor 12ab, and both the pixel electrodes 17a and 17b are floating. Therefore, electric potentials of the respective pixel electrodes 17a and 17b are averaged to be substantially equal. Namely, in a case where the pixel electrode 17a included in the bright subpixel and the pixel electrode 17b included in the dark subpixel are connected (short-circuited), the pixel electrode 17a has a lower potential (effective voltage), whereas the pixel electrode 17b has a higher electric potential (effective voltage). This causes each of the subpixels to be an intermediate subpixel. According to this, an input tone (halftone) can be displayed by three types of changes in luminance (γ characteristics). This allows an improvement in viewing angle characteristic.

The following description discusses a specific example of the liquid crystal panel 5c constituting a liquid crystal display device of the present embodiment and a driving method for driving the liquid crystal panel 5c.

Figure 26:
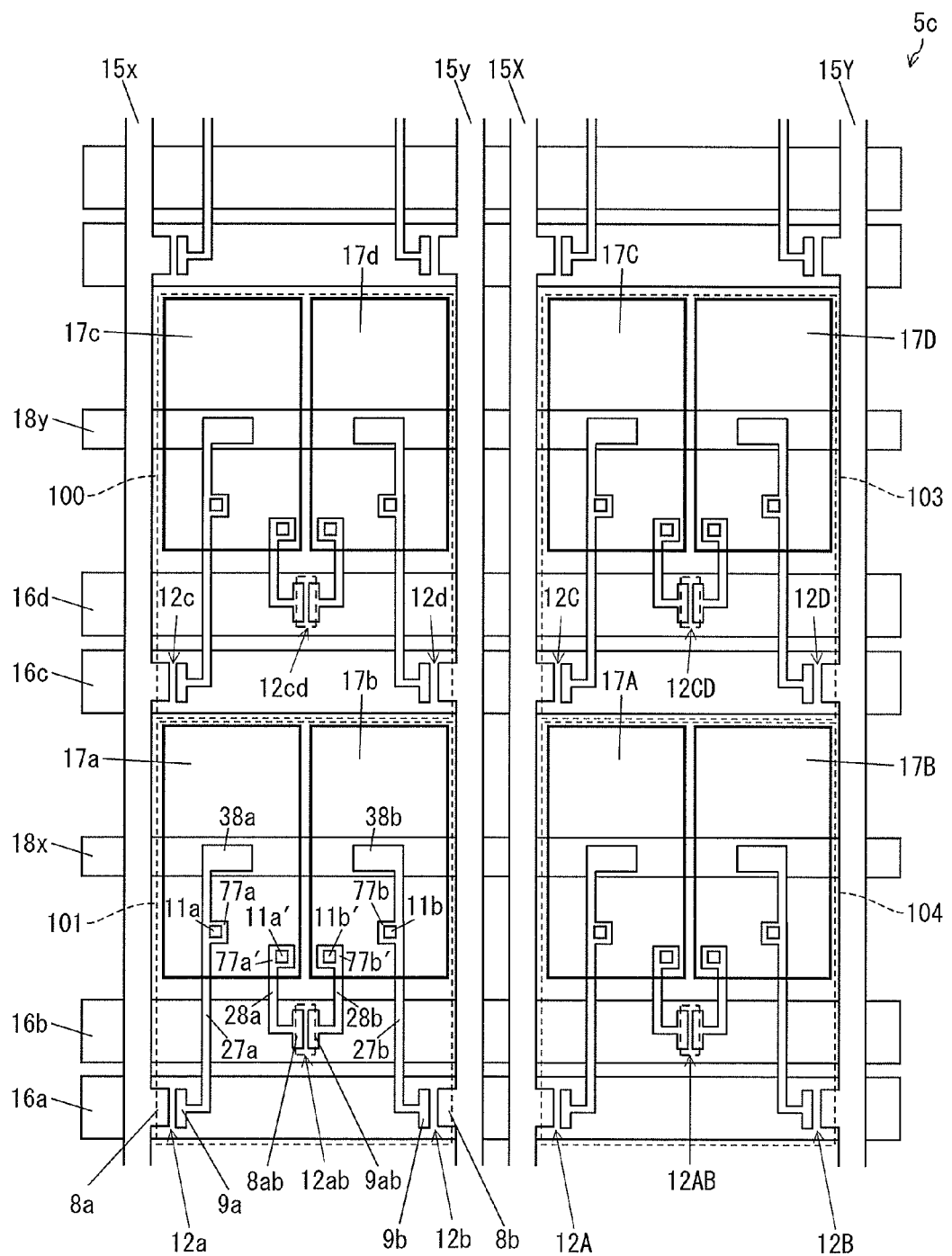
FIG. 26 is a plan view illustrating the arrangement of the liquid crystal panel 5c of FIG. 25.

FIG. 26 illustrates a specific example of the liquid crystal panel 5c. According to the liquid crystal panel 5c of FIG. 26, the data signal lines 15x and 15y are provided along the pixel 100 and the pixel 101, the data signal lines 15X and 15Y are provided along the pixel 103 and the pixel 104, a retention capacitor line 18y intersects the respective pixels 100 and 103, and a retention capacitor line 18x intersects the respective pixels 101 and 104.

Note here that the data signal line 15x is provided on one end side of the pixel 100, the data signal line 15y is provided on the other end side of the pixel 100, and the pixel electrodes 17c and 17d are provided in the row direction between the data signal lines 15x and 15y in plan view. Similarly, the data signal line 15X is provided on one end side of the pixel 103, the data signal line 15Y is provided on the other end side of the pixel 103, and the pixel electrodes 17C and 17D are provided in the row direction between the data signal lines 15X and 15Y in plan view. Note that the data signal lines 15y and 15X are provided so as to be adjacent to each other.

Note also that the data signal line 15x is provided on one end side of the pixel 101, the data signal line 15y is provided on the other end side of the pixel 101, and the pixel electrodes 17a and 17b are provided in the row direction between the data signal lines 15x and 15y in plan view. Similarly, the data signal line 15X is provided on one end side of the pixel 104, the data signal line 15Y is provided on the other end side of the pixel 104, and the pixel electrodes 17A and 17B are provided in the row direction between the data signal lines 15X and 15Y in plan view.

Note also that the scanning signal lines 16c and 16d are provided on one end side of the pixel 100, the scanning signal lines 16a and 16b are provided on one end side of the pixel 101, and the pixel electrodes 17a and 17b are provided in the row direction between the scanning signal lines 16b and 16c in plan view. Similarly, the scanning signal lines 16c and 16d are provided on one end side of the pixel 103, the scanning signal lines 16a and 16b are provided on one end side of the pixel 104, and the pixel electrodes 17A and 17B are provided in the row direction between the scanning signal lines 16b and 16c in plan view.

Note that the scanning signal line 16c may be provided on one end side of the pixel 100, the scanning signal line 16d may be provided on the other end side of the pixel 100, and the pixel electrodes 17c and 17d may be provided in the row direction between the scanning signal lines 16c and 16d. Similarly, the scanning signal line 16a may be provided on one end side of the pixel 101, the scanning signal line 16b may be provided on the other end side of the pixel 101, and the pixel electrodes 17a and 17b are provided in the row direction between the scanning signal lines 16a and 16b.

According to the pixel 101, the transistor 12a has a source electrode 8a and a drain electrode 9a which are provided on the scanning signal line 16a, the transistor 12b has a source electrode 8b and a drain electrode 9b which are provided on the scanning signal line 16a, and the transistor 12ab has a source electrode 8ab and a drain electrode 9ab which are provided on the scanning signal line 16b. The source electrode 8a is connected to the data signal line 15x. The drain electrode 9a is connected to a drain drawing line 27a. The drain drawing line 27a is connected to each of a contact electrode 77a and a retention capacitor electrode 38a. The contact electrode 77a is connected to the pixel electrode 17a via a contact hole 11a. The source electrode 8b is connected to the data signal line 15y. The drain electrode 9b is connected to a drain drawing line 27b. The drain drawing line 27b is connected to each of a contact electrode 77b and a retention capacitor electrode 38b. The contact electrode 77b is connected to the pixel electrode 17b via a contact hole 11b.

The source electrode 8ab of the transistor 12ab is connected to a source drawing line 28a. The source drawing line 28a is connected to a contact electrode 77a'. The contact electrode 77a' is connected to the pixel electrode 17a via a contact hole 11a'. The drain electrode 9ab is connected to a drain drawing line 28b. The drain drawing line 28b is connected to a contact electrode 77b'. The contact electrode 77b' is connected to the pixel electrode 17b via a contact hole 11b'.

The retention capacitor electrode 38a overlaps the retention capacitor line 18x via a gate insulating film. This defines much of the retention capacitor Cha (see FIG. 25). The retention capacitor electrode 38b overlaps the retention capacitor line 18x via the gate insulating film. This defines much of the retention capacitor Chb (see FIG. 25).

According to the arrangement, in a case where the scanning signal line 16a is selected (and the scanning signal line 16b is not selected), the subpixel including the pixel electrode 17a becomes "bright", and the subpixel including the pixel electrode 17b becomes "dark". In a case where the scanning signal line 16b is selected (and the scanning signal line 16a is not selected), each of the subpixels becomes "intermediate".

(Driving Method for Driving Liquid Crystal Display Device)

Figure 27:
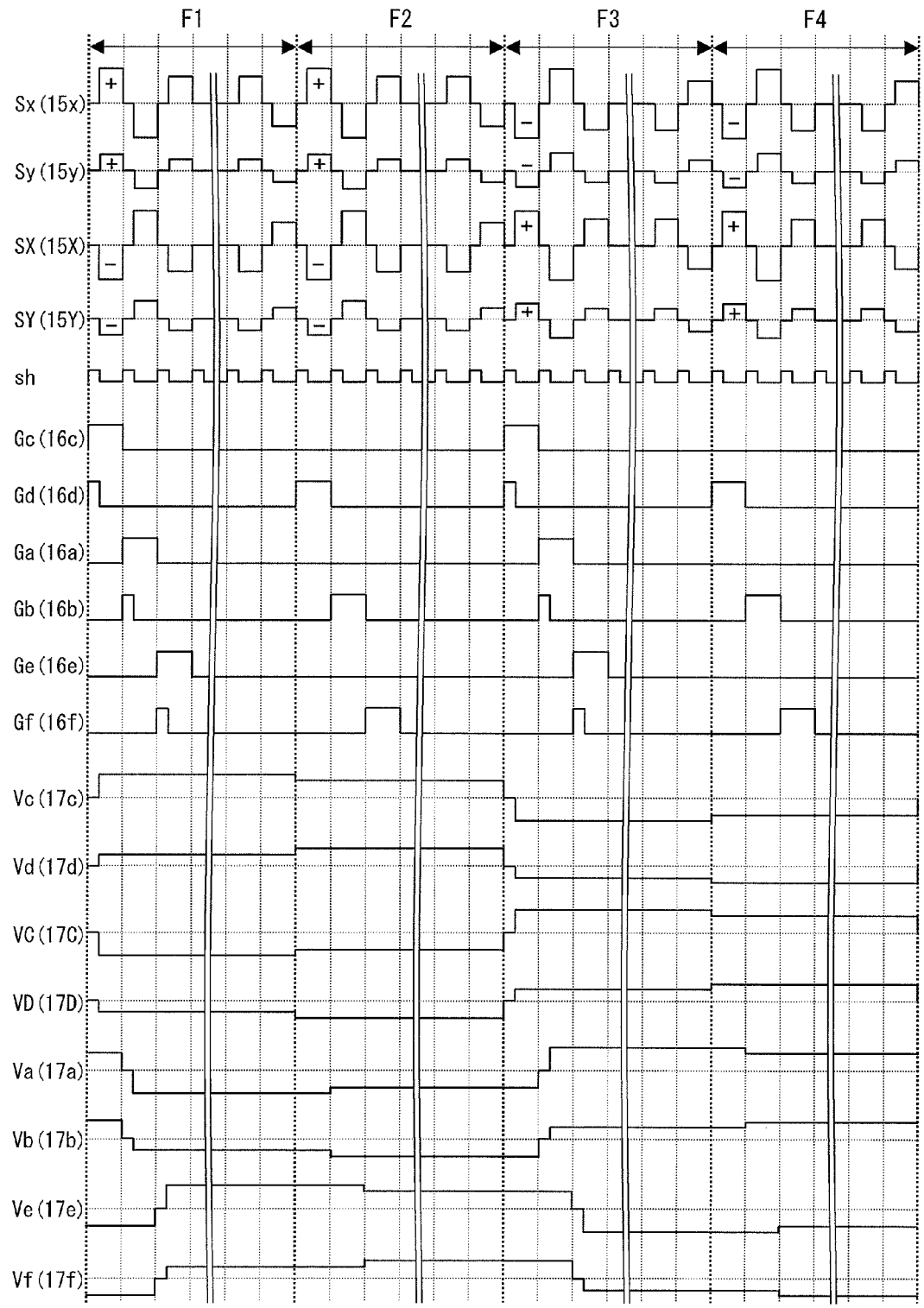
FIG. 27 is a timing chart showing a driving method for driving a liquid crystal display device including the liquid crystal panel 5c.

FIG. 27 is a timing chart showing a method for driving a liquid crystal display device of the present invention including the liquid crystal panel 5c of FIG. 25. Note that Sx, Sy, SX, and SY refer to signal electric potentials to be supplied to respective four adjacent data signal lines (e.g., 15x, 15y, 15X, and 15Y), Ga through Gf refer to gate on pulse signals to be supplied to respective scanning signal lines 16a through 16f, and Vc, Vd, VC, VD, Va, Vb, Ve, and Vf refer to electric potentials of respective pixel electrodes 17c, 17d, 17C, 17D, 17a, 17b, 17e, and 17f, and sh refers to a charge sharing signal. Note also that in a period in which the charge sharing signal is active ("H"), all the data signal lines are short-circuited to each other and identical electric potentials are supplied from an outside to all the respective data signal lines, so that charge sharing is carried out. Note that charge sharing does not need to be carried out in the present invention and is appropriately employed.

According to the driving method, a polarity of a data signal to be supplied to a data signal line is reversed every two frame periods (see FIG. 27). In addition, in an identical horizontal scanning period (H), data signals of identical polarities are supplied to respective two data signal lines (15x and 15y or 15X and 15Y), and data signals of reversed polarities are supplied to respective two adjacent data signal lines (15y and 15X), so that charge sharing is carried out at the beginning of each horizontal scanning period.

Specifically, in case of consecutive frames F1 through F4, in the frame F1, each set of two upper and lower scanning signal lines corresponding to one pixel is sequentially selected (for example, (i) the scanning signal lines 16c and 16d, (ii) the scanning signal lines 16a and 16b, and (iii) the scanning signal lines 16e and 16f are sequentially selected (see FIG. 25)). To one (e.g., the data signal line 15x) of two adjacent data signal lines, a signal electric potential of a positive polarity is supplied in a first horizontal scanning period (for example, containing a writing period of the pixel electrode 17c), a signal electric potential of a negative polarity is supplied in a second horizontal scanning period (for example, containing a writing period of the pixel electrode 17a), and a signal electric potential of a positive polarity is supplied in a third horizontal scanning period (for example, containing a writing period of the pixel electrode 17e). To the other (e.g., the data signal line 15y) of the two adjacent data signal lines, a signal electric potential of a positive polarity is supplied in the first horizontal scanning period (for example, containing a writing period of the pixel electrode 17d), a signal electric potential of a negative polarity is supplied in the second horizontal scanning period (for example, containing a writing period of the pixel electrode 17b), and a signal electric potential of a positive polarity is supplied in the third horizontal scanning period (for example, containing a writing period of the pixel electrode 17f). Note here that a signal electric potential to be supplied to one (e.g., the data signal line 15x) of two adjacent data signal lines is set to be higher in effective voltage than a signal electric potential to be supplied to the other (e.g., the data signal line 15y) of the two adjacent data signal lines.

To one (e.g., the data signal line 15X) of two adjacent data signal lines, a signal electric potential of a negative polarity is supplied in a first horizontal scanning period (for example, containing a writing period of the pixel electrode 17C), a signal electric potential of a positive polarity is supplied in a second horizontal scanning period (for example, containing a writing period of the pixel electrode 17A), and a signal electric potential of a negative polarity is supplied in a third horizontal scanning period (for example, containing a writing period of the pixel electrode 17E). To the other (e.g., the data signal line 15Y) of the two adjacent data signal lines, a signal electric potential of a negative polarity is supplied in the first horizontal scanning period (for example, containing a writing period of the pixel electrode 17D), a signal electric potential of a positive polarity is supplied in the second horizontal scanning period (for example, containing a writing period of the pixel electrode 17B), and a signal electric potential of a negative polarity is supplied in the third horizontal scanning period (for example, containing a writing period of the pixel electrode 17F). Note here that a signal electric potential to be supplied to one (e.g., the data signal line 15X) of two adjacent data signal lines is set to be higher in effective voltage than a signal electric potential to be supplied to the other (e.g., the data signal line 15Y) of the two adjacent data signal lines.

Note that a charge sharing electric potential (Vcom) is supplied at the beginning of each of the horizontal scanning periods.

As described earlier, different signal electric potentials are supplied, from respective data signal lines which are different from each other, to respective pixel electrodes provided in one pixel. Accordingly, in each pixel, a bright pixel which is relatively high in luminance and a dark luminance which is relatively low in luminance can be constituted with respect to an input tone (halftone). For example, in a case where driving is carried out as shown in FIG. 27, a subpixel including the pixel electrode 17c (positive polarity) becomes "bright", a subpixel including the pixel electrode 17d (positive polarity) becomes "dark", a subpixel including the pixel electrode 17C (negative polarity) becomes "bright", a subpixel including the pixel electrode 17D (negative polarity) becomes "dark", a subpixel including the pixel electrode 17a (negative polarity) becomes "bright", and a subpixel including the pixel electrode 17b (negative polarity) becomes "dark".

In the frame F2, out of two upper and lower scanning signal lines corresponding to one pixel, a scanning signal line connected to a transistor for electrically connecting pixel electrodes of the one pixel is sequentially selected (for example, the scanning signal line 16d, the scanning signal line 16b, and the scanning signal line 16f are sequentially selected (see FIG. 25)). According to this, in a case where the scanning signal line 16d is selected, the pixel electrode 17c and the pixel electrode 17d of the pixel 100 are electrically connected, and the pixel electrode 17C and the pixel electrode 17D of the pixel 103 are electrically connected. In a case where the scanning signal line 16b is selected, the pixel electrode 17a and the pixel electrode 17b of the pixel 101 are electrically connected, and the pixel electrode 17A and the pixel electrode 17B of the pixel 104 are electrically connected. In a case where the scanning signal line 16f is selected, the pixel electrode 17e and the pixel electrode 17f of the pixel 102 are electrically connected, and the pixel electrode 17E and the pixel electrode 17F of the pixel 105 are electrically connected.

In the frame F2, neither of two pixel electrodes of each pixel is electrically connected to a data signal line, so that the two pixel electrodes are floating. This is because a scanning signal line (e.g., the scanning signal line 16c, 16a, or 16e (see FIG. 25)) connected to a transistor connected to a corresponding data signal line is not selected. As described earlier, since the two pixel electrodes which are electrically connected are floating, electric potentials of the respective two pixel electrodes change to be substantially equal to each other in the each pixel. Namely, in a case where the pixel electrode 17c of a bright subpixel (positive polarity) and the pixel electrode 17d of a dark subpixel (positive polarity) are connected (short-circuited), the pixel electrode 17c has a lower electric potential and the pixel electrode 17d has a higher electric potential, so that each of these subpixels (positive polarity) becomes "intermediate". Meanwhile, in a case where the pixel electrode 17C of a bright subpixel (negative polarity) and the pixel electrode 17D of a dark subpixel (negative polarity) are connected, the pixel electrode 17C has a lower electric potential (effective voltage) and the pixel electrode 17D has a higher electric potential (effective voltage), so that each of these subpixels (negative polarity) becomes "intermediate". Similarly, in a case where the pixel electrode 17a of a bright subpixel (negative polarity) and the pixel electrode 17b of a dark subpixel (negative polarity) are connected, the pixel electrode 17a has a lower electric potential (effective voltage) and the pixel electrode 17b has a higher electric potential (effective voltage), so that each of these subpixels (negative polarity) becomes "intermediate".

Positive and negative polarities of the frame F3 are reverse to those of the frame F1. Accordingly, the subpixel including the pixel electrode 17c (negative polarity) becomes "bright", the subpixel including the pixel electrode 17d (negative polarity) becomes "dark", the subpixel including the pixel electrode 17C (positive polarity) becomes "bright", the subpixel including the pixel electrode 17D (positive polarity) becomes "dark", the subpixel including the pixel electrode 17a (positive polarity) becomes "bright", and the subpixel including the pixel electrode 17b (positive polarity) becomes "dark".

Positive and negative polarities of the frame F4 are reverse to those of the frame F2. Accordingly, each of the subpixel including the pixel electrode 17c (negative polarity) and the subpixel including the pixel electrode 17d (negative polarity) becomes "intermediate", each of the subpixel including the pixel electrode 17C (positive polarity) and the subpixel including the pixel electrode 17D (positive polarity) becomes "intermediate", and each of the subpixel including the pixel electrode 17a (positive polarity) and the subpixel including the pixel electrode 17b (positive polarity) becomes "intermediate".

Figure 28:
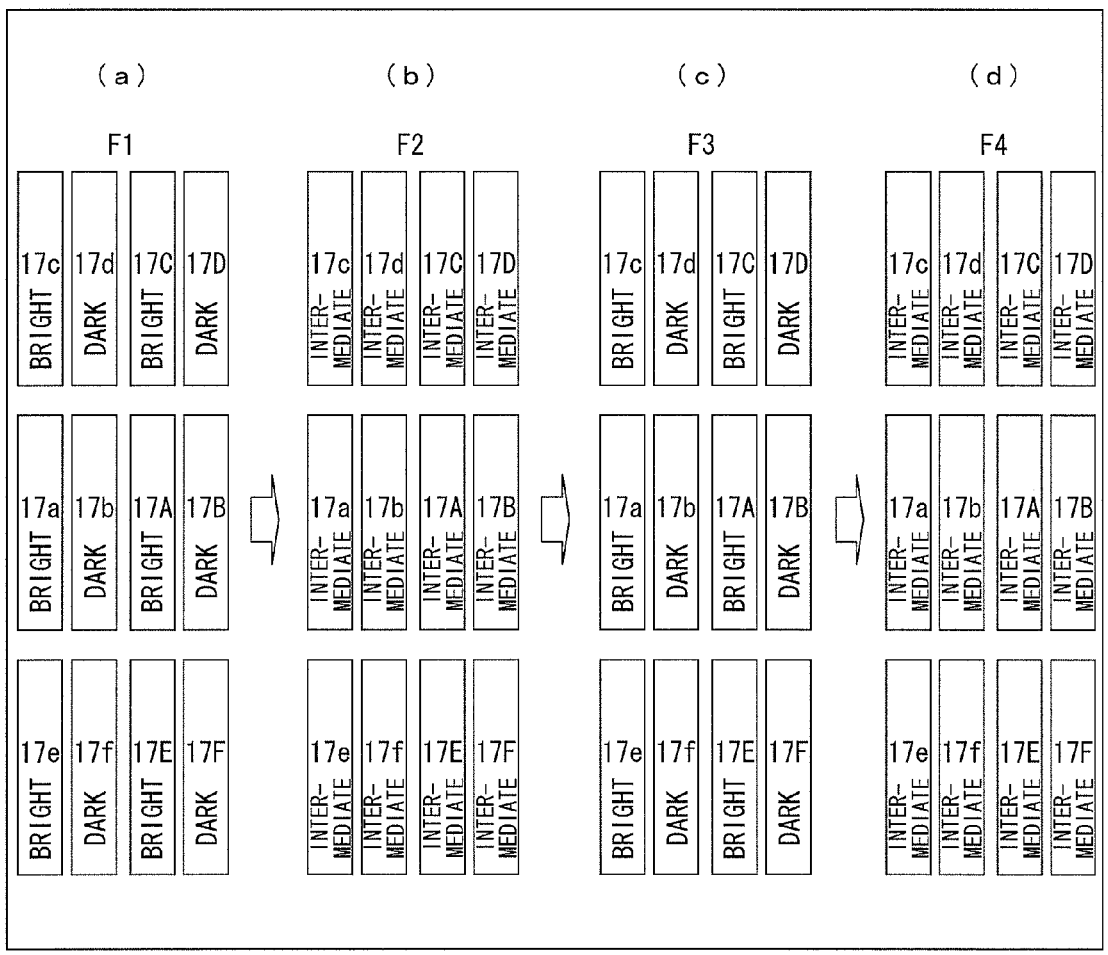
FIG. 28 schematically illustrates display states of respective frames in a case where the driving method of FIG. 27 is used.

In a case where the data signal lines 15x, 15y, 15X, and 15Y are driven in a liquid crystal display device including the liquid crystal panel 5c described above (see FIG. 27, for example), display states of the respective frames F1 through F4 are as illustrated in respective (a) through (d) of FIG. 28. An operation carried out in the frames F1 through F4 is repeated in subsequent frames.

As described earlier, the liquid crystal panel of the present invention is constituted by the pixel electrode (17a) and the pixel electrode (17b). The pixel electrode (17a) is connected to a first data signal line (15x) via the transistor (12a) which is connected to a first scanning signal line (the scanning signal line 16a in the pixel 101 of FIG. 26). The pixel electrode (17b) is connected to a second data signal line (15y) via the transistor (12b) which is connected to the first scanning signal line (16a). The pixel electrodes (17a and 17b) are connected to each other via the transistor (12ab) which is connected to a second scanning signal line (16b). Therefore, according to the driving method of the present invention, in an odd-numbered frame (F1 or F3), the first scanning signal line (16a) is selected and different data signals are supplied to the respective pixel electrodes, so that a bright subpixel and a dark subpixel are formed in one pixel. Meanwhile, in an even-numbered frame (F2 or F4), the second scanning signal line (16b) is selected and the pixel electrodes are short-circuited, so that two intermediate subpixels are formed in one pixel. According to this, an input tone (halftone) is displayed by three types of changes in luminance (γ characteristics). This allows an improvement in viewing angle characteristic.

Note that according to the above description, processes are carried out in an odd-numbered frame and an even-numbered frame, respectively. Alternatively, one frame may be divided into a first half frame and a second half frame so that the process carried out in the odd-numbered frame is carried out in the first half frame and the process carried out in the even-numbered frame is carried out in the second half frame.

Figure 29:
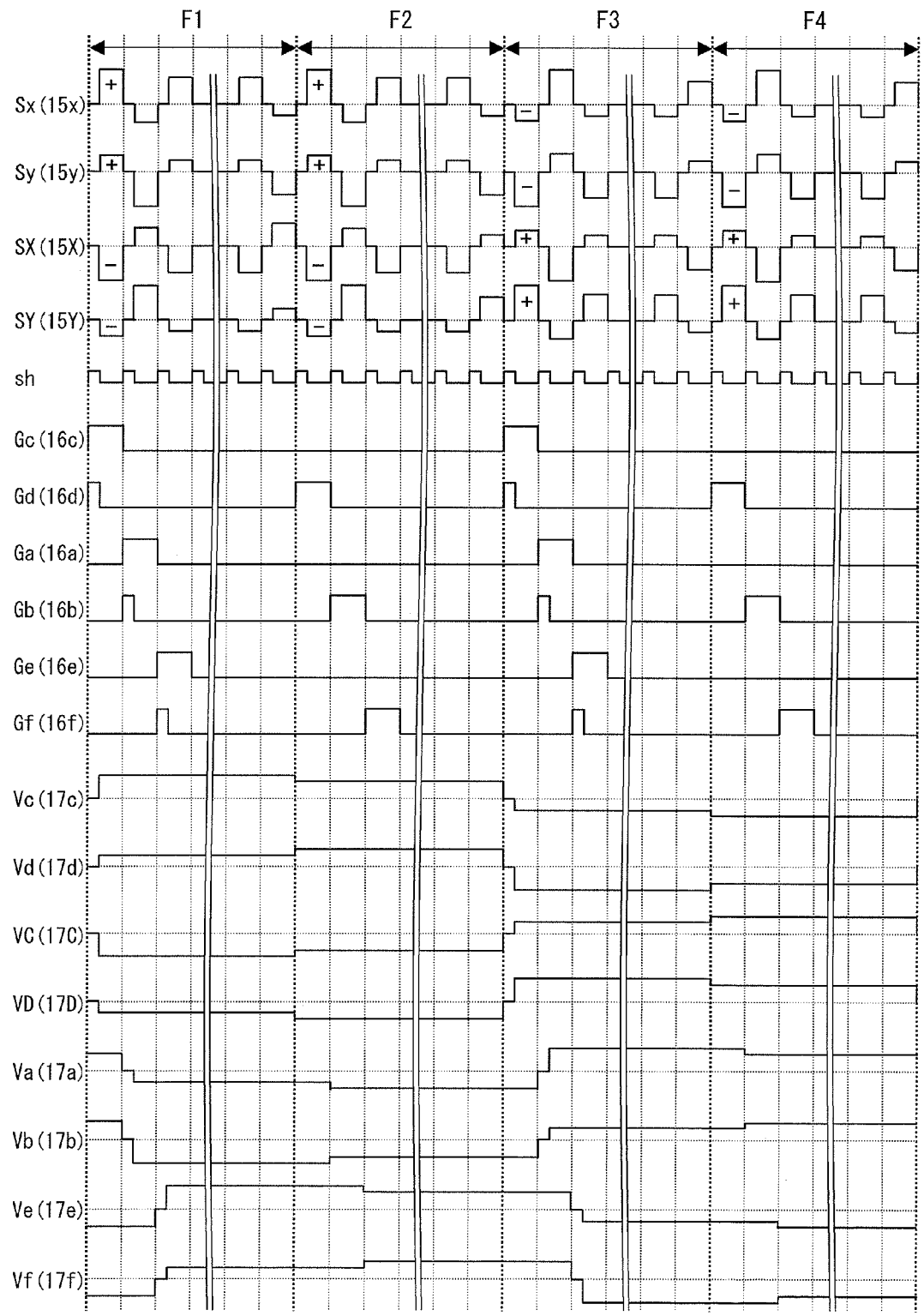
FIG. 29 is a timing chart showing another driving method for driving the liquid crystal display device including the liquid crystal panel 5c.

The driving method of FIG. 27 may be replaced with a driving method shown in FIG. 29. The driving method of FIG. 29 is different from the driving method of FIG. 27 in signal electric potential to be supplied to the respective data signal lines 15x, 15y, 15X, and 15Y. Specifically, in the frames F1 and F2, in a first horizontal scanning period (for example, containing a writing period of the pixel electrodes 17c and 17d), a signal electric potential to be supplied to one (e.g., the data signal line 15x) of two adjacent data signal lines is set to be higher in effective voltage than a signal electric potential to be supplied to the other (e.g., the data signal line 15y) of the two adjacent data signal lines. In a second horizontal scanning period (for example, containing a writing period of, the pixel electrodes 17a and 17b), a signal electric potential to be supplied to one (e.g., the data signal line 15x) of the two adjacent data signal lines is set to be lower in effective voltage than a signal electric potential to be supplied to the other (e.g., the data signal line 15y) of the two adjacent data signal lines. In a third horizontal scanning period (for example, containing a writing period of the pixel electrodes 17e and 17f), a signal electric potential to be supplied to one (e.g., the data signal line 15x) of the two adjacent data signal lines is set to be higher in effective voltage than a signal electric potential to be supplied to the other (e.g., the data signal line 15y) of the two adjacent data signal lines.

In the frames F3 and F4, in a first horizontal scanning period (for example, containing a writing period of the pixel electrodes 17c and 17d), a signal electric potential to be supplied to a first data signal line (e.g., the data signal line 15x) is set to be lower in effective voltage than a signal electric potential to be supplied to a second data signal line (e.g., the data signal line 15y). In a second horizontal scanning period (for example, containing a writing period of the pixel electrodes 17a and 17b), a signal electric potential to be supplied to the first data signal line (e.g., the data signal line 15x) is set to be higher in effective voltage than a signal electric potential to be supplied to the second data signal line (e.g., the data signal line 15y). In a third horizontal scanning period (for example, containing a writing period of the pixel electrodes 17e and 17f), a signal electric potential to be supplied to the first data signal line (e.g., the data signal line 15x) is set to be lower in effective voltage than a signal electric potential to be supplied to the second data signal line (e.g., the data signal line 15y).

Figure 30:
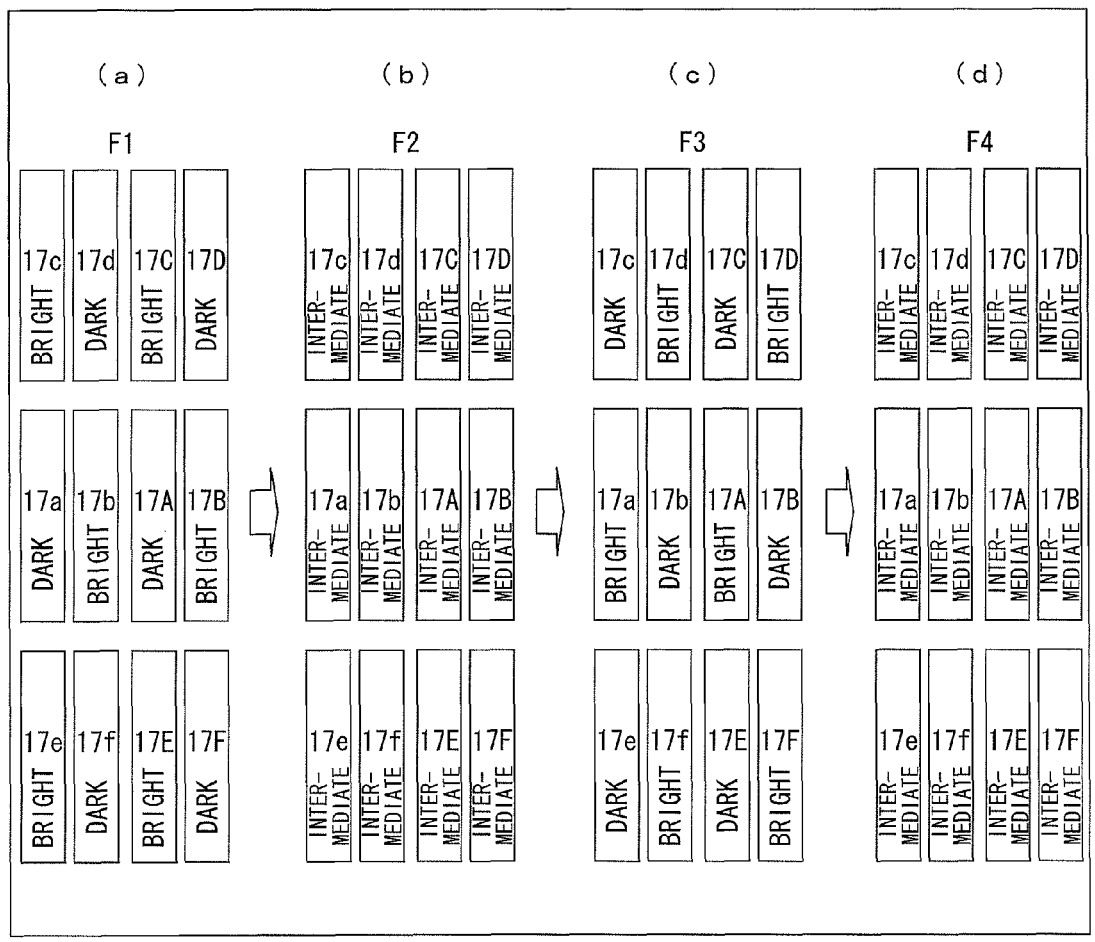
FIG. 30 schematically illustrates display states of respective frames in a case where the driving method of FIG. 29 is used.

According to this, in the frame F1, a subpixel including the pixel electrode 17c (positive polarity) becomes "bright", a subpixel including the pixel electrode 17d (positive polarity) becomes "dark", a subpixel including the pixel electrode 17C (negative polarity) becomes "bright", a subpixel including the pixel electrode 17D (negative polarity) becomes "dark", a subpixel including the pixel electrode 17a (negative polarity) becomes "dark", and a subpixel including the pixel electrode 17b (negative polarity) becomes "bright". In the frame F3, a subpixel including the pixel electrode 17c (negative polarity) becomes "dark", a subpixel including the pixel electrode 17d (negative polarity) becomes "bright", a subpixel including the pixel electrode 17C (positive polarity) becomes "dark", a subpixel including the pixel electrode 17D (positive polarity) becomes "bright", a subpixel including the pixel electrode 17a (positive polarity) becomes "bright", and a subpixel including the pixel electrode 17b (positive polarity) becomes "dark". Namely, display states of the respective frames F1 through F4 are as illustrated in respective (a) through (d) of FIG. 30. An operation carried out in the frames F1 through F4 is repeated in subsequent frames. According to the arrangement, bright subpixels and dark subpixels can be provided in a checkered pattern and the bright subpixels and the dark subpixels can be replaced with each other for each odd-numbered frame. This allows an improvement in display quality.

(Arrangement of Liquid Crystal Display Unit and Liquid Crystal Display Device)

Figure 31:
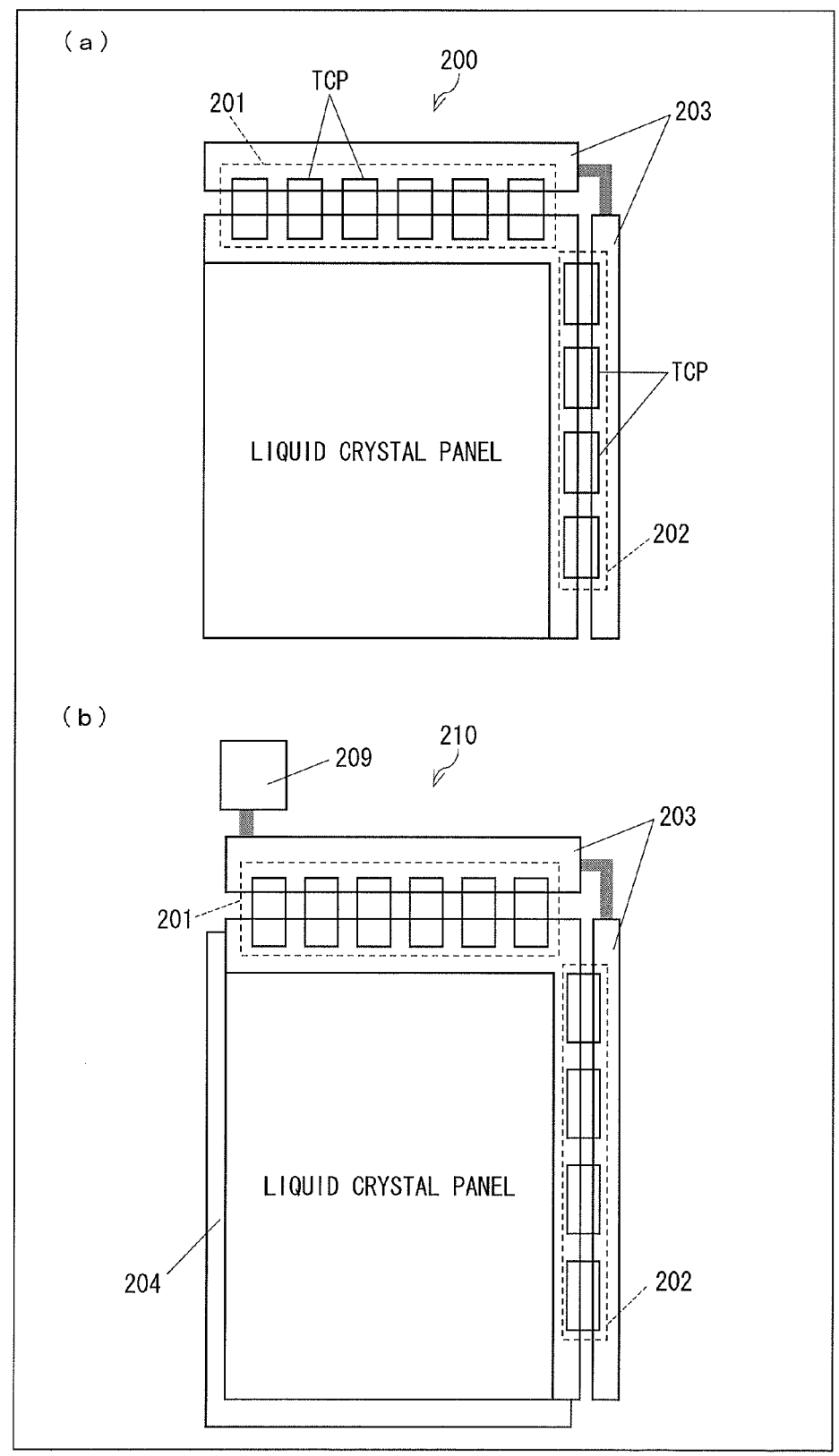
FIG. 31 schematically illustrates an arrangement of a liquid crystal display unit of the present invention and a liquid crystal display device of the present invention. (a) of FIG. 31 illustrates the arrangement of the liquid crystal display unit of the present invention, and (b) of FIG. 31 illustrates the arrangement of the liquid crystal display device of the present invention.

Finally, the following description discusses an arrangement example of a liquid crystal display unit and a liquid crystal display device of the present invention. According to each of the above embodiments, the liquid crystal display unit and the liquid crystal display device of the present invention are arranged as below. Namely, two polarization plates A and B are provided on respective sides of the liquid crystal panel (5a, 5b, or 5c) of the present invention so that polarization axes of the respective polarization plates A and B intersect at right angles. Note that optical compensation sheets or the like can be provided on the respective polarization plates according to need. Next, drivers (a gate driver 202 and a source driver 201) are connected (see (a) of FIG. 31). As an example, a connection of the drivers by a TCP (Tape Carrier Package) method is described here. First, an ACF (Anisotropy Conductive Film) is temporarily pressure-bonded on a terminal section of the liquid crystal panel. Subsequently, driver TCPs are punched out from a carrier tape and then positioned with respect to a panel terminal electrode, so as to be finally heated and pressure-bonded. Thereafter, (i) circuit boards 203 (PWB: Printed Wiring Boards) via which the driver TCPs are connected to one another and (ii) input terminals of the respective driver TCPs, are connected to one another via the ACF. This completes a liquid crystal display unit 200. Thereafter, a display control circuit 209 is connected to the drivers (201 and 202) of the liquid crystal display unit 200 via the respective circuit boards 203 so as to be integrated with an illumination device (a backlight unit) 204. A liquid crystal display device 210 is thus prepared (see (b) of FIG. 31).

Figure 32:
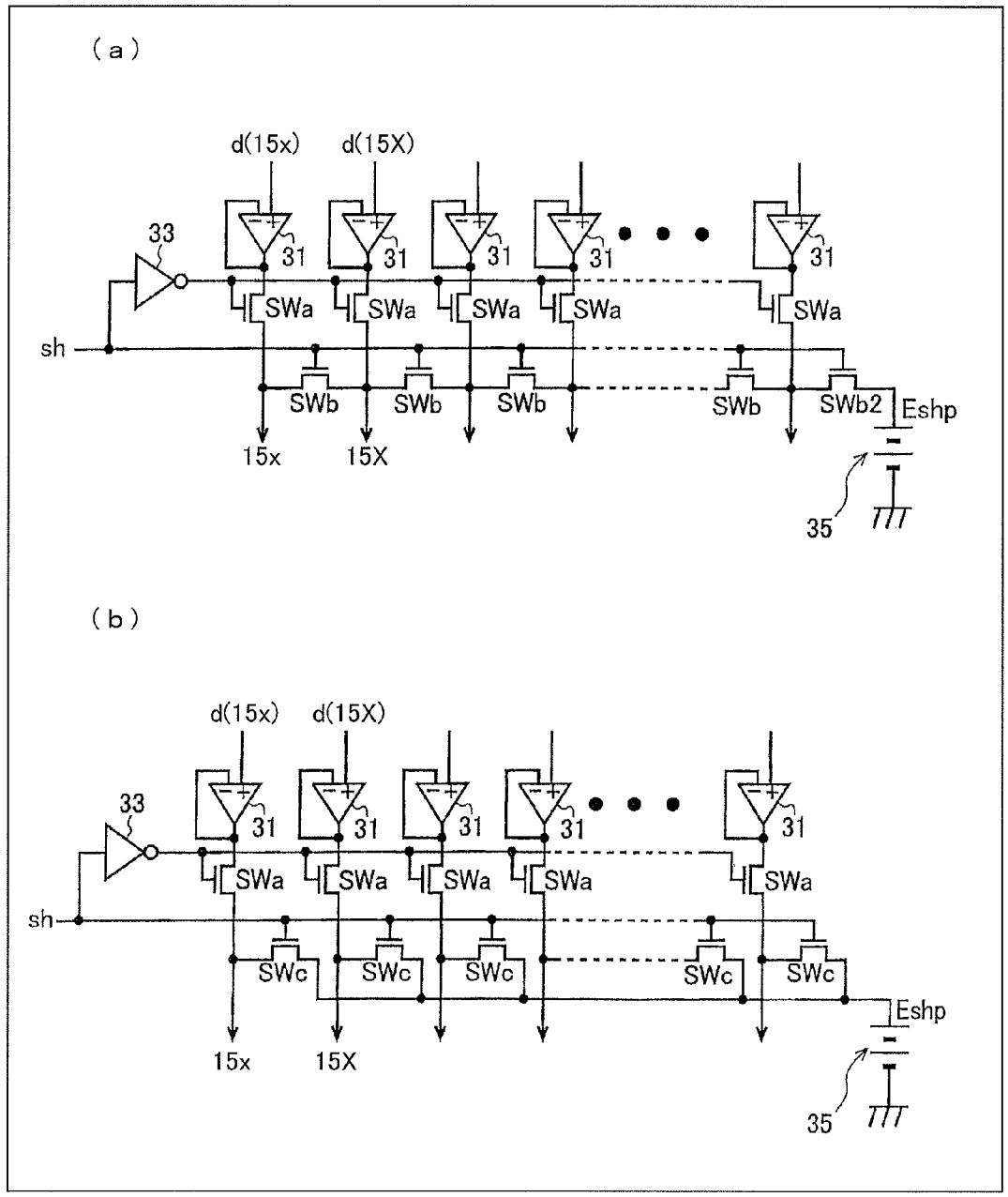
FIG. 32 has circuit diagrams each illustrating another arrangement of a source driver.

(a) of FIG. 32 illustrates how a source driver is arranged in a case a refresh period is provided in the liquid crystal display device of the present invention. In this case, buffers 31, data output switches SWa, and refresh switches SWb are provided in the source driver so as to correspond to respective data signal lines. A buffer 31 receives a corresponding piece of data d, and has an output which is connected to an output end to a corresponding data signal line via a corresponding data output switch SWa. Output ends which correspond to respective two adjacent data signal lines are connected to each other via a corresponding refresh switch SWb. Namely, the refresh switches SWb are connected in series and have respective one ends each of which is connected to a refresh electric potential supply source 35 (Vcom). Note here that a data output switch SWa receives, via its gate terminal, a charge sharing signal sh supplied thereto via an inverter 33 and a refresh switch SWb receives the charge sharing signal sh via its gate terminal.

Note that the source driver illustrated in (a) of FIG. 32 may be arranged as illustrated in (b) of FIG. 32. Namely, according to the arrangement illustrated in (b) of FIG. 32, each of refresh switches SWc is connected only to a corresponding data signal line and the refresh electric potential supply source 35 (Vcom) and the refresh switches SWc are not connected in series. Such an arrangement allows a refresh electric potential to be rapidly supplied to each of the data signal lines.

Figure 33:
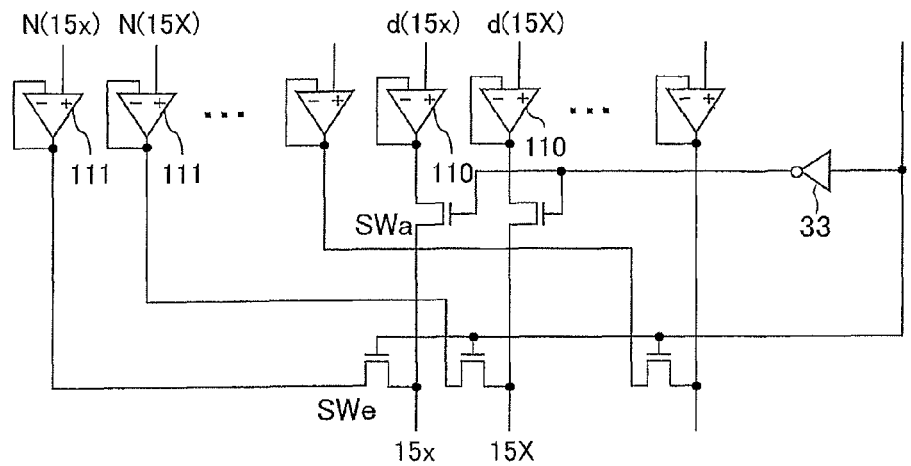
FIG. 33 is a circuit diagram illustrating a still another arrangement of the source driver.

Note here that though Vcom is supplied as a refresh electric potential in accordance with the above arrangement of the source driver, the refresh electric potential is not limited to this. For example, it is possible to find a suitable refresh electric potential based on (i) a level of a signal electric potential supplied to an identical data signal line in a previous horizontal scanning period followed by a current horizontal scanning period and (ii) a signal electric potential to be supplied to the identical data signal line in the current horizontal scanning period and to supply the suitable refresh electric potential thus found to the identical data signal line. FIG. 33 illustrates how the source driver is arranged in this case. According to the arrangement, data output buffers 110, refresh buffers 111, data output switches SWa, and refresh switches SWe are provided so as to correspond to respective data signal lines. A data output buffer 110 receives a corresponding piece of data d, and has an output which is connected, via a corresponding data output switch SWa, to an output end to a corresponding data signal line. A refresh buffer 111 receives a corresponding piece of non-image data N (data corresponding to a most suitable refresh electric potential determined based on (i) a level of a signal electric potential supplied in a previous horizontal scanning period followed by a current horizontal scanning period and (ii) a signal electric potential to be supplied in the current horizontal scanning period). The refresh buffer 111 has an output which is connected, via a corresponding refresh switch SWe, to an output end to a corresponding data signal line.

A "polarity of an electric potential" herein refers to High (positive) or Low (negative) with respect to an electric potential serving as a reference. Note here that an electric potential serving as a reference may be Vcom (a common electric potential) which is an electric potential of a common electrode (counter electrode) or may be any other electric potential.

Figure 34:
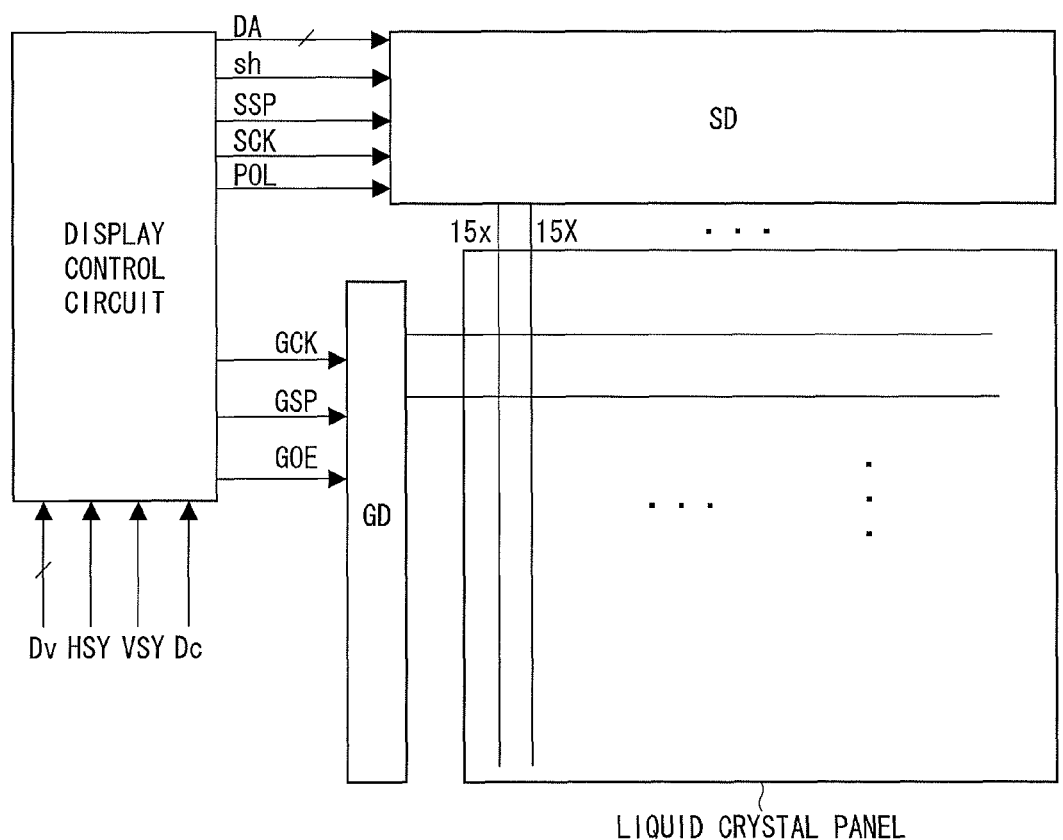
FIG. 34 is a block diagram illustrating an overall arrangement of the liquid crystal display device of the present invention.

FIG. 34 is a block diagram illustrating an arrangement of the liquid crystal display device of the present invention. The liquid crystal display device of the present invention includes a display section (liquid crystal panel), a source driver (SD), a gate driver (GD), and a display control circuit. The source driver drives data signal lines, the gate driver drives scanning signal lines, and the display control circuit controls the source driver and the gate driver.

The display control circuit receives, from an external signal source (e.g., a tuner), a digital video signal Dv indicative of an image to be displayed, a horizontal synchronization signal HSY and a vertical synchronization signal VSY which correspond to the digital video signal Dv, and a control signal Dc for controlling a display operation. In response to the digital video signal Dv, the horizontal synchronization signal HSY, the vertical synchronization signal VSY, and the control signal Dc thus received, the display control circuit generates and outputs, as signals for causing the display section to display an image indicated by the digital video signal Dv, the following signals: a data start pulse signal SSP; a data clock signal SCK; a charge sharing signal sh; a digital image signal DA indicative of the image to be displayed (i.e., a signal corresponding to the digital video signal Dv); a gate start pulse signal GSP; a gate clock signal GCK; and a gate driver output control signal (scanning signal output control signal) GOE.

More specifically, in the display control circuit, the digital video signal Dv is subjected to a timing adjustment, etc. in an internal memory, as needed. Then, the digital video signal Dv is supplied from the display control circuit as the digital image signal DA. The display control circuit generates the data clock signal SCK as a signal having pulses corresponding to respective pixels of the image indicated by the digital image signal DA. The display control circuit (i) generates, in response to the horizontal synchronization signal HSY, the data start pulse signal SSP as a signal which has a High level only for a predetermined period in each horizontal scanning period, (ii) generates, in response to the vertical synchronization signal VSY, the gate start pulse signal GSP as a signal which has an H level only for a predetermined period in each frame period (i.e., in each vertical scanning period), (iii) generates, in response to the horizontal synchronization signal HSY, the gate clock signal GCK, and (iv) generates the charge sharing signal sh and the gate driver output control signal GOE in response to the horizontal synchronization signal HSY and the control signal Dc.

Of signals thus generated in the display control circuit, the digital image signal DA, the charge sharing signal sh, a signal POL for controlling a polarity of a signal electric potential (data signal electric potential), the data start pulse signal SSP, and the data clock signal SCK are supplied from the display control circuit to the source driver. The gate start pulse signal GSP, the gate clock signal GCK, and the gate driver output control signal GOE are supplied from the display control circuit to the gate driver.

In response to the digital image signal DA, the data clock signal SCK, the charge sharing signal sh, the data start pulse signal SSP, and the polarity inversion signal POL, the source driver sequentially generates, in each horizontal scanning period, analog electric potentials (signal electric potentials) corresponding to respective pixel values of the image indicated by the digital image signal DA for each of the scanning signal lines. The data signals thus generated are supplied from the source driver to the data signal lines (e.g., 15x and 15X).

In response to the gate start pulse signal GSP, the gate clock signal GCK, and the gate driver output control signal GOE, the gate driver generates gate ON pulse signals, and supplies the gate ON pulse signals to the respective scanning signal lines. This causes the scanning signal lines to be selectively driven.

Thus, the source driver drives the data signal lines of the display section (liquid crystal panel) while the gate driver drives the scanning signal lines of the display section. This causes a signal electric potential to be written from a data signal line to a pixel electrode, via a transistor (TFT) connected with a selected scanning signal line. This causes a voltage to be applied to a liquid crystal layer corresponding to each of subpixels, so that a transmitted amount of light emitted from a backlight is controlled. As a result, the image indicated by the digital video signal Dv is displayed by each of the subpixels.

Figure 35:
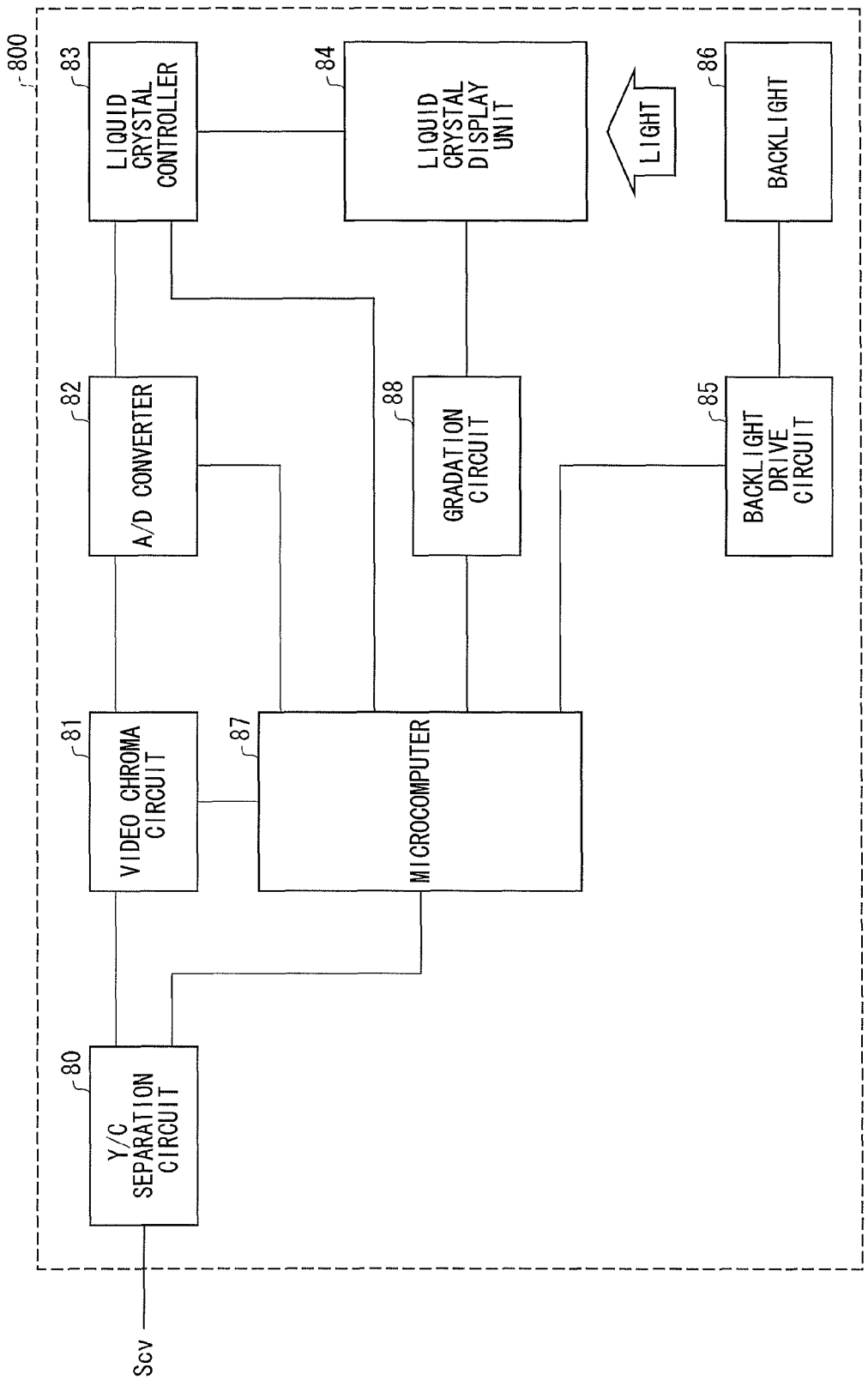
FIG. 35 is a block diagram illustrating a function of the liquid crystal display device of the present invention.

The following describes an example of how a television receiver, to which the liquid crystal display device of the present invention is applied, is arranged. FIG. 35 is a block diagram illustrating an arrangement of a liquid crystal display device 800 for use in a television receiver. The liquid crystal display device 800 includes a liquid crystal display unit 84, an Y/C separation circuit 80, a video chroma circuit 81, an A/D converter 82, a liquid crystal controller 83, a backlight drive circuit 85, a backlight 86, a microcomputer 87, and a gradation circuit 88. The liquid crystal display unit 84 includes a liquid crystal panel, and a source driver and a gate driver which are provided for driving the liquid crystal panel.

According to the liquid crystal display device 800, a composite color video signal Scv which is a television signal is externally supplied to the Y/C separation circuit 80, which separates the composite color video signal Scv into a luminance signal and a color signal. The luminance signal and the color signal are converted by the video chroma circuit 81 into analog RGB signals corresponding to respective three primary colors of light. The analog RGB signals are further converted by the A/D converter 82 into respective digital RGB signals. The digital RGB signals are supplied to the liquid crystal controller 83. In the Y/C separation circuit 80, a horizontal synchronization signal and a vertical synchronization signal are also extracted from the composite color video signal Scv, so as to be also supplied to the liquid crystal controller 83 via the microcomputer 87.

The digital RGB signals and a timing signal which varies depending on the horizontal synchronization signal and the vertical synchronization signal are supplied, at a predetermined timing, from the liquid crystal controller 83 to the liquid crystal display unit 84. The gradation circuit 88 generates gradation electric potentials for the respective three primary colors R, G, and B for color image display. Their gradation electric potentials are also supplied to the liquid crystal display unit 84. In response to the digital RGB signals, the timing signal, and the gradation electric potentials, the liquid crystal display unit 84 generates drive signals (data signals=signal electric potentials, scanning signals, etc.) by use of a source driver, a gate driver, etc. of the liquid crystal display unit 84. In response to the drive signals, a color image is displayed on the liquid crystal panel of the liquid crystal display unit 84. In order to cause the liquid crystal display unit 84 to display an image, it is necessary to emit light from behind the liquid crystal panel in the liquid crystal display unit 84. In the liquid crystal display device 800, the backlight drive circuit 85 drives the backlight 86 under control of the microcomputer 87. This causes a back surface of the liquid crystal panel to be irradiated with light. Control of an entire system, including this process, is carried out by the microcomputer 87. It is possible to use, as an externally-supplied video signal (composite color video signal), not only a video signal which is in conformity with television broadcast but also a video signal of an image captured by a camera, a video signal supplied via the Internet, etc. Thus, the liquid crystal display device 800 can display images in accordance with various video signals.

Figure 36:
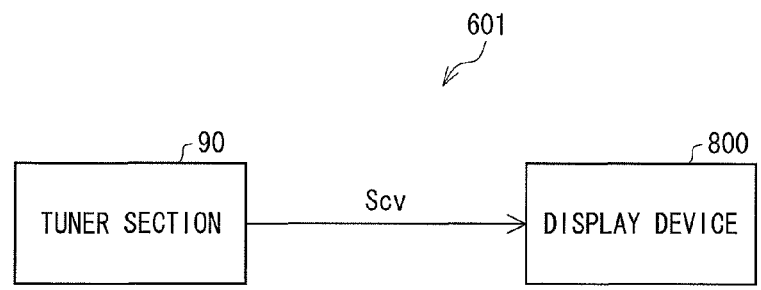
FIG. 36 is a block diagram illustrating a function of a television receiver of the present invention.

In a case where the liquid crystal display device 800 displays an image which is in conformity with television broadcast, a tuner section 90 is connected with the liquid crystal display device 800 as illustrated in FIG. 36. Thus, a television receiver 601 of the present invention is realized. The tuner section 90 selects, among airwaves (high-frequency signals) received via an antenna (not illustrated), a signal of a channel to be received, converts the signal into an intermediate frequency signal, and then demodulates the intermediate frequency signal. Thus, the composite color video signal Scv is extracted from the intermediate frequency signal as a television signal. The composite color video signal Scv is supplied to the liquid crystal display device 800, as described above. Then, the liquid crystal display device 800 displays an image in accordance with the composite color video signal Scv.

Figure 37:
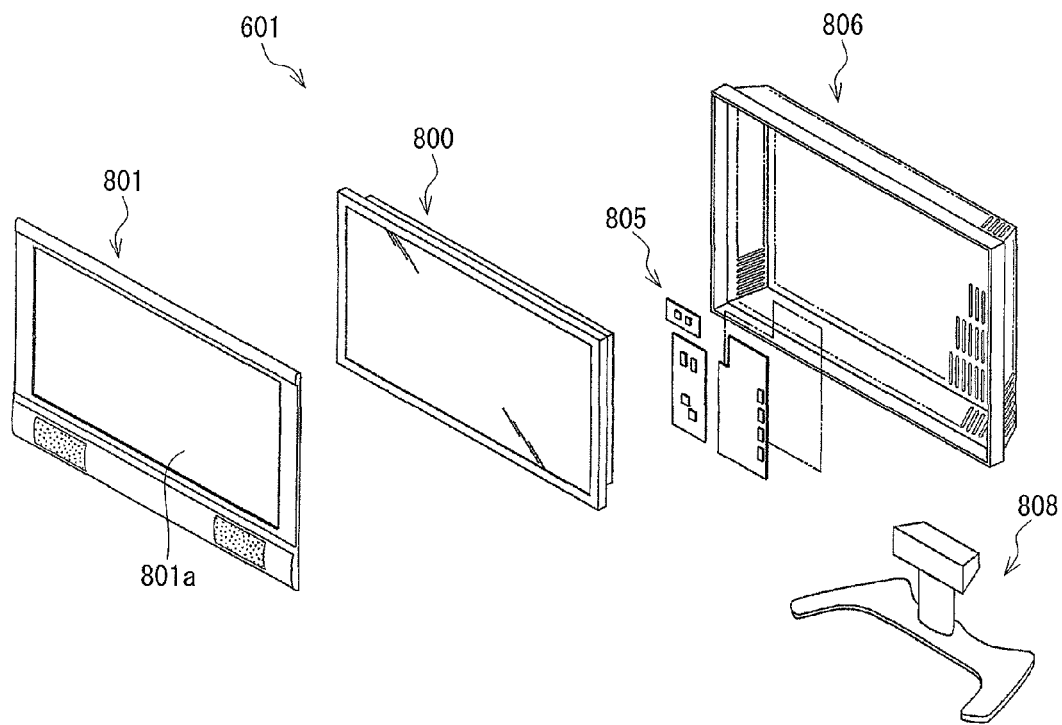
FIG. 37 is an exploded perspective view illustrating an arrangement of the television receiver of the present invention.
Figure 38:
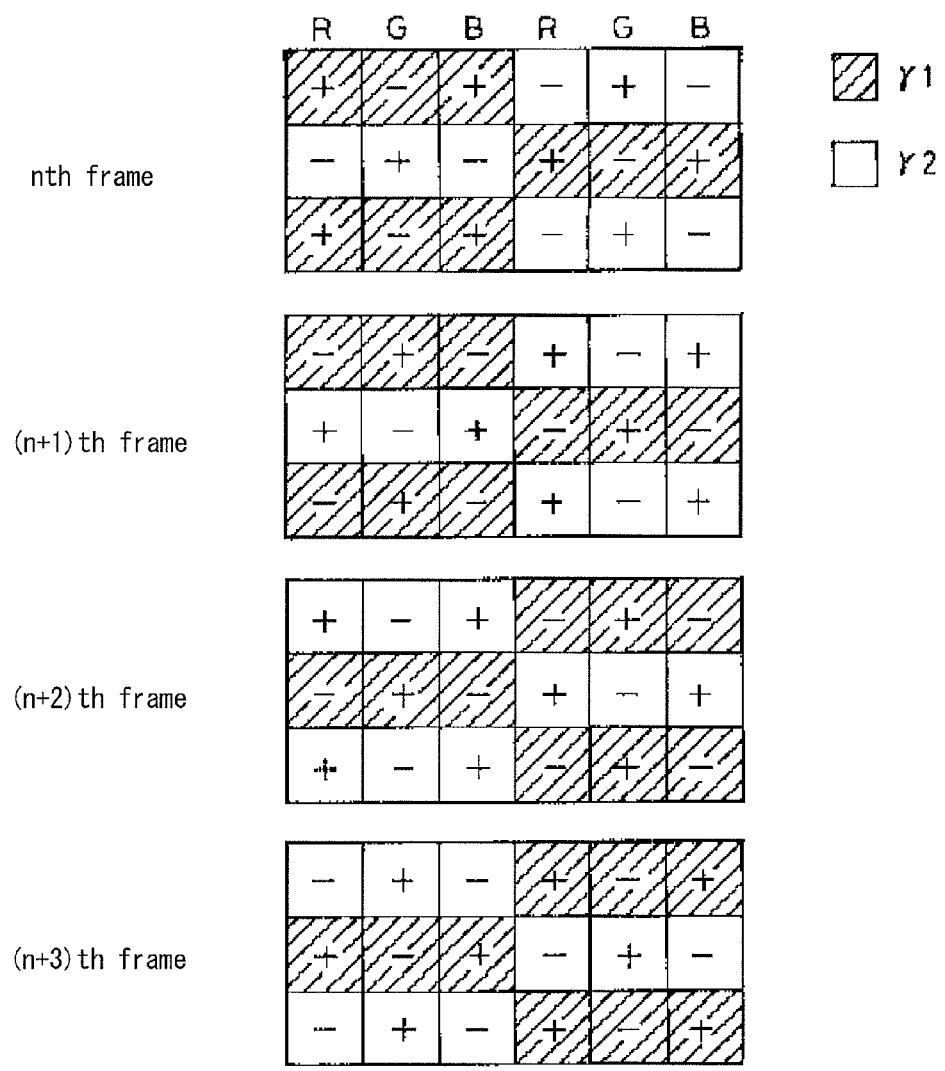
FIG. 38 is a plan view illustrating an arrangement of a conventional liquid crystal panel.

FIG. 37 is an exploded perspective view illustrating one arrangement example of the television receiver of the present invention. As illustrated in FIG. 37, the television receiver 601 of the present invention includes, as its components, a first housing 801 and a second housing 806, in addition to the liquid crystal display apparatus 800. The television receiver is arranged such that the liquid crystal display apparatus 800 is sandwiched between and enwrapped by the first housing 801 and the second housing 806. The first housing 801 has an opening 801a through which an image to be displayed by the liquid crystal display apparatus 800 passes. The second housing 806 is a member for covering a backside of the liquid crystal display apparatus 800. The second housing 806 includes an operation circuit 805 for operating the liquid crystal display apparatus 800. In addition, a supporting member 808 is provided to a lower part of the second housing 806.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

An active matrix substrate of the present invention and a liquid crystal panel including the active matrix substrate are suitable for a liquid crystal television, for example.

REFERENCE SIGNS LIST

5a•5b•5c Liquid crystal panel
11a•11a'•11b•11b' Contact hole
12a-12h•12A-12H Transistor
12ab•12cd•12ef•12AB•12CD•12EF Transistor
15x•15y•15X•15Y Data signal line
16a-16h Scanning signal line
17a-17h Pixel electrode
17A-17H Pixel electrode
18x-18z•18p-18s Retention capacitor line
17a'-17f' Pixel electrode
21 Organic gate insulating film
22 Inorganic gate insulating film
24 Semiconductor layer
25 Inorganic interlayer insulating film
26 Organic interlayer insulating film
37a Coupling capacitor electrode
38a•38b Retention capacitor electrode
77a•77a'•77b•77b' Contact electrode
84 Liquid crystal display unit
100-105 Pixel
601 Television receiver 800 Liquid crystal display device
C100-C105 Coupling capacitor

The invention claimed is:

1. A liquid crystal display device, comprising:
pixels that are provided in a row direction and a column direction in which data signal lines extend, the pixels each including a plurality of pixel electrodes,
in each of the pixels, in an nth frame, at least one of the plurality of pixel electrodes being electrically connected to a corresponding data signal line, and in an (n+1)th frame, the plurality of pixel electrodes being electrically connected to each other and being electrically disconnected from the corresponding data signal line,
wherein the each of the pixels is constituted by a plurality of subpixels, and the plurality of subpixels include respective pixel electrodes; and
in the nth frame, the plurality of subpixels display respective different luminances, and in the (n+1)th frame, the plurality of subpixels display respective identical luminances.

2. The liquid crystal display device as set forth in claim 1, wherein:
first scanning signal lines and second scanning signal lines are provided so as to correspond to respective pixel rows; and
in the each of the pixels, in the nth frame, the at least one of the plurality of pixel electrodes is electrically connected to the corresponding data signal line in a case where a corresponding first scanning signal line is selected, and in the (n+1)th frame, the plurality of pixel electrodes are electrically connected to each other in a case where a corresponding second scanning signal line is selected.

3. The liquid crystal display device as set forth in claim 1, wherein:
first scanning signal lines and second scanning signal lines are provided so as to correspond to respective pixel rows;
in the each of the pixels, (i) a first transistor connected to each of the corresponding data signal line and a corresponding first scanning signal line, (ii) a second transistor connected to a corresponding second scanning signal line, and (iii) a first pixel electrode and a second pixel electrode are provided;
the first pixel electrode is electrically connected to the corresponding data signal line via the first transistor; and
the second pixel electrode is connected to the first pixel electrode via a capacitor, and is electrically connected to the first pixel electrode via the second transistor.

4. The liquid crystal display device as set forth in claim 3, wherein:
in the nth frame, the corresponding first scanning signal line is selected; and
in the (n+1)th frame, the corresponding second scanning signal line is selected.

5. The liquid crystal display device as set forth in claim 1, wherein:
the pixels are provided in the row direction and the column direction, the pixels each including a first pixel electrode and a second pixel electrode which are connected via a capacitor;
first data signal lines and second data signal lines are provided so as to correspond to respective pixel columns, and first scanning signal lines and second scanning signal lines are provided so as to correspond to respective pixel rows;
in the each of the pixels, (i) a first transistor connected to a corresponding first scanning signal line and (ii) a second transistor connected to a corresponding second scanning signal line are provided;
the first pixel electrode is connected to the second pixel electrode via the capacitor, and is electrically connected to the second pixel electrode via the second transistor; and
in one of two pixels of the pixels, the two pixels being adjacent to each other in the column direction, the first pixel electrode is electrically connected to a corresponding first data signal line via the first transistor, and in the other of the two pixels, the first pixel electrode is electrically connected to a corresponding second data signal line via the first transistor.

6. The liquid crystal display device as set forth in claim 5, wherein in the nth frame, each set of two of the first scanning signal lines, the two being adjacent to each other in the column direction, is sequentially selected, and in the (n+1)th frame, each set of two of the second scanning signal lines, the two being adjacent to each other in the column direction, is sequentially selected.

7. The liquid crystal display device as set forth in claim 5, wherein data signals whose polarities are reverse to each other are supplied to the corresponding first data signal line and the corresponding second data signal line, respectively.

8. The liquid crystal display device as set forth in claim 1, wherein:
the pixels are provided in the row direction and the column direction, the pixels each including a first pixel electrode and a second pixel electrode;
first data signal lines and second data signal lines are provided so as to correspond to respective pixel columns, and first scanning signal lines and second scanning signal lines are provided so as to correspond to respective pixel rows;
in the each of the pixels, (i) a first transistor and a second transistor each connected to a corresponding first scanning signal line and (ii) a third transistor connected to a corresponding second scanning signal line are provided;
the first pixel electrode is electrically connected to the corresponding first data signal line via the first transistor, and the second pixel electrode is electrically connected to the corresponding second data signal line via the second transistor; and
the first pixel electrode and the second pixel electrode are electrically connected to each other via the third transistor.

9. The liquid crystal display device as set forth in claim 8, wherein in the each of the pixels, in the nth frame, the corresponding first scanning signal line is selected, and in the (n+1)th frame, the corresponding second scanning signal line is selected.

10. The liquid crystal display device as set forth in claim 8, wherein data signals whose polarities are identical and which are different from each other in electric potential are supplied to the corresponding first data signal line and the corresponding second data signal line, respectively.

11. The liquid crystal display device as set forth in claim 1, wherein a polarity of a data signal to be supplied to an identical data signal line is reversed every two frames.

12. A television receiver comprising:
a liquid crystal display device recited in claim 1; and
a tuner section for receiving a television broadcast.

13. A method for displaying a liquid crystal display device including: pixels that are provided in a row direction and a column direction in which data signal lines extend, the pixels each being constituted by a plurality of subpixels including respective pixel electrodes, said method comprising the step of:

in each of the pixels, in an nth frame, causing the plurality of subpixels to be different from each other in display luminance by supplying data signal electric potentials to the respective pixel electrodes included in the respective plurality of subpixels, and in an (n+1)th frame, causing the plurality of subpixels to be substantially equal to each other in display luminance by electrically connecting the pixel electrodes included in the respective plurality of subpixels.

14. A liquid crystal display device, comprising:

pixels that are provided in a row direction and a column direction in which data signal lines extend, the pixels each including a plurality of pixel electrodes, in each of the pixels, in an nth frame, at least one of the plurality of pixel electrodes being electrically connected to a corresponding data signal line, and in an (n+1)th frame, the plurality of pixel electrodes being electrically connected to each other and being electrically disconnected from the corresponding data signal line, wherein the pixels are provided in the row direction and the column direction, the pixels each including a first pixel electrode and a second pixel electrode which are connected via a capacitor;

first data signal lines and second data signal lines are provided so as to correspond to respective pixel columns, and first scanning signal lines and second scanning signal lines are provided so as to correspond to respective pixel rows;

in the each of the pixels, (i) a first transistor connected to a corresponding first scanning signal line and (ii) a second transistor connected to a corresponding second scanning signal line are provided;

the first pixel electrode is connected to the second pixel electrode via the capacitor, and is electrically connected to the second pixel electrode via the second transistor;

in one of two pixels of the pixels, the two pixels being adjacent to each other in the column direction, the first pixel electrode is electrically connected to a corresponding first data signal line via the first transistor, and in the other of the two pixels, the first pixel electrode is electrically connected to a corresponding second data signal line via the first transistor; and in the nth frame, each set of two of the first scanning signal lines, the two being adjacent to each other in the column direction, is sequentially selected, and in the (n+1)th frame, each set of two of the second scanning signal lines, the two being adjacent to each other in the column direction, is sequentially selected.

* * * * *